(12) United States Patent
Athmanathan Panneer Selvam et al.

(10) Patent No.: US 12,249,001 B2
(45) Date of Patent: Mar. 11, 2025

(54) DYNAMICALLY ADJUSTING A POOL OF TRANSPORTATION PROVIDER DEVICES IN A PRIORITIZED-DISPATCH MODE USING AVAILABILITY INDICATORS

(71) Applicant: Lyft, Inc., San Francisco, CA (US)

(72) Inventors: Praveen Athmanathan Panneer Selvam, Sunnyvale, CA (US); David Elijah Alpern Boehm, Hoboken, NJ (US); Davide Crapis, San Francisco, CA (US); Ramon Dario Iglesias, San Francisco, CA (US); Varun Kashyap Krishnan, San Diego, CA (US); Derek William Salama, San Francisco, CA (US); Shashi Kant Sharma, Redwood City, CA (US); Xiaoling Charlene Zhou, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 825 days.

(21) Appl. No.: 17/100,147

(22) Filed: Nov. 20, 2020

(65) Prior Publication Data

US 2022/0164912 A1    May 26, 2022

(51) Int. Cl.
*G06Q 50/40* (2024.01)
*G06N 5/04* (2023.01)
(Continued)

(52) U.S. Cl.
CPC .............. *G06Q 50/40* (2024.01); *G06N 5/04* (2013.01); *G06N 20/00* (2019.01);
(Continued)

(58) Field of Classification Search
CPC .... H04L 67/12; G06Q 50/40; G06Q 30/0205; G06Q 10/06312; G06N 5/04; G06N 20/00
See application file for complete search history.

(56) References Cited

U.S. PATENT DOCUMENTS

2015/0161564 A1* 6/2015 Sweeney .......... G06Q 10/08355
                                                                 705/338
2019/0026671 A1* 1/2019 Al Falasi .......... G01C 21/3438
(Continued)

OTHER PUBLICATIONS

Banerjee, Siddhartha and Riquelme, Carlos and Johari, Ramesh, Pricing in Ride-Share Platforms: A Queueing-Theoretic Approach (Feb. 10, 2015). Available at SSRN: https://ssrn.com/abstract=2568258 or http://dx.doi.org/10.2139/ssrn.2568258.
(Continued)

*Primary Examiner* — Deirdre D Hatcher
(74) *Attorney, Agent, or Firm* — Keller Preece PLLC

(57) ABSTRACT

The present application discloses systems, methods, and computer-readable media that can dynamically control a number of provider devices operating in a prioritized-dispatch mode by determining a range of prioritized-dispatch-mode slots for a target time based on differences between value metrics received by provider devices operating in multiple dispatch modes and sending availability nudges to provider devices based on the range of prioritized-dispatch-mode slots. For instance, the disclosed systems can generate a threshold-noticeable-value difference between historical value metrics received by provider devices while operating in a prioritized-dispatch mode and in a basic-dispatch mode. Based on the threshold-noticeable-value difference, the disclosed systems determine a range of slots for the prioritized-dispatch mode during a target time period for a geographic area. Based on the determined range of slots, the disclosed systems can transmit prioritized-mode-availability indicators to provider devices to indicate varying levels of availability of the prioritized-dispatch mode for the geographic area.

20 Claims, 11 Drawing Sheets

(51) Int. Cl.
    *G06N 20/00*       (2019.01)
    *G06Q 10/0631*    (2023.01)
    *G06Q 30/0204*    (2023.01)
    *H04L 67/12*       (2022.01)

(52) U.S. Cl.
    CPC ... *G06Q 10/06312* (2013.01); *G06Q 30/0205* (2013.01); *H04L 67/12* (2013.01)

(56) References Cited

U.S. PATENT DOCUMENTS

2020/0126175 A1\* 4/2020 Fong .............. G06Q 10/063112
2020/0151624 A1\* 5/2020 Sierra .................... G06Q 50/40

OTHER PUBLICATIONS

Ivo Adan and Jacques Resing; "Queueing Systems"; Mar. 26, 2015; Department of Mathematics and Computing Science; Eindhoven University of Technology; https://www.win.tue.nl/~iadan/queueing.pdf.

\* cited by examiner

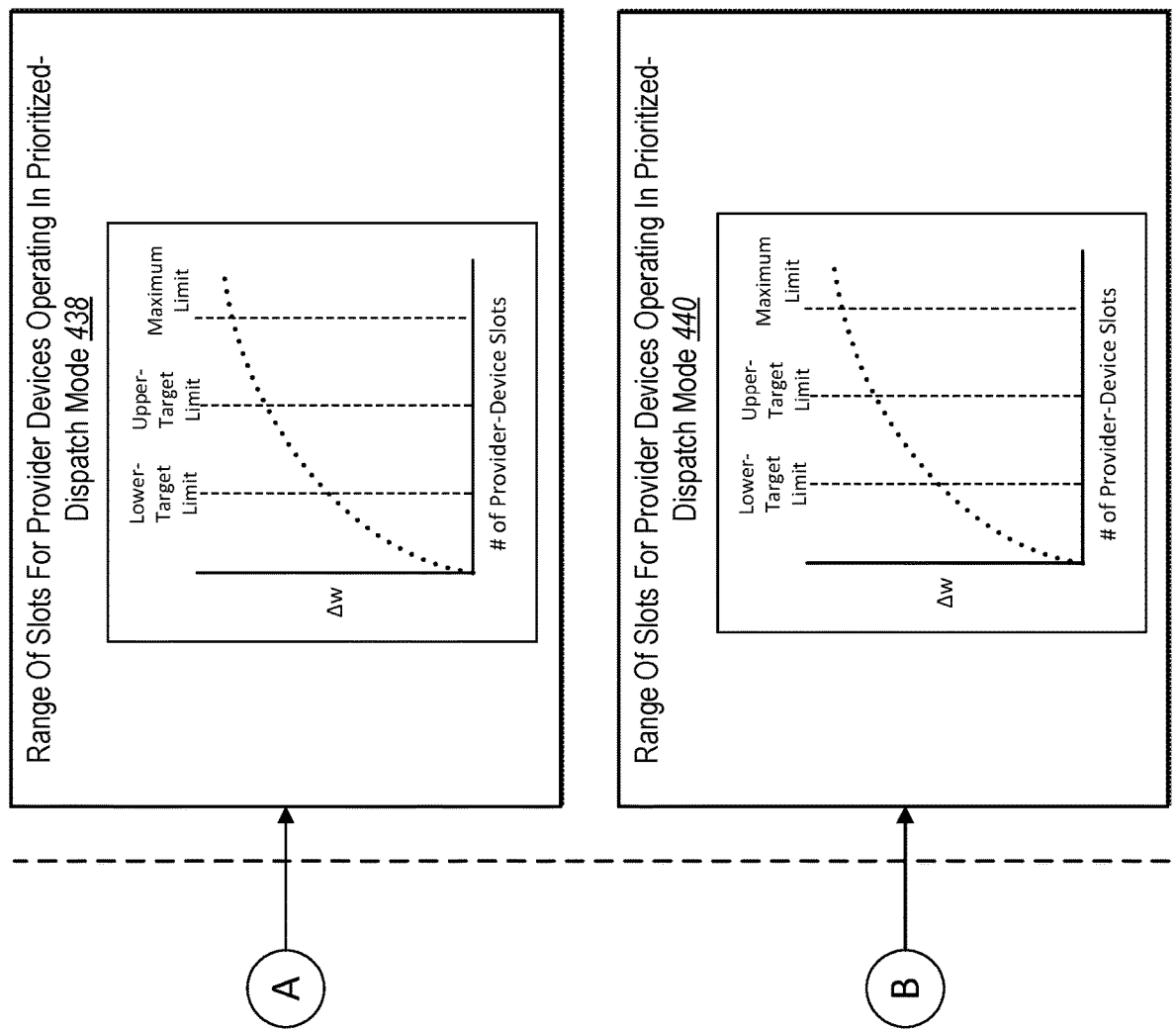

DYNAMICALLY ADJUSTING A POOL OF TRANSPORTATION PROVIDER DEVICES IN A PRIORITIZED-DISPATCH MODE USING AVAILABILITY INDICATORS

BACKGROUND

In recent years, ride sharing systems have increasingly utilized web and mobile applications to manage real-time on-demand transportation requests from requester devices. For example, ride sharing systems can match provider devices with requester devices to provide transportation across a variety of geographic locations. This often involves communications from a ride sharing system via web or mobile applications on a provider device and a requester device that coordinate various aspects of a transportation service (e.g., a pickup location, a drop-off location). In addition, many ride sharing systems can manage real-time on demand transportation requests between thousands or millions of provider devices and requester devices at numerous geographic regions. Although conventional ride sharing systems attempt to intelligently select transportation providers for transportation requests to satisfy real-time transportation, such conventional systems face a number of shortcomings. For instance, conventional ride sharing systems cannot efficiently determine a number of transportation providers to introduce within a geographic area, accurately match transportation requests to transportation providers, or easily adapt in real time within a large, complex system of transportation requests and transportation providers.

SUMMARY

This disclosure describes one or more embodiments of methods, non-transitory computer-readable media, and systems that solve the foregoing problems in addition to providing other benefits. In particular, the disclosed systems can dynamically control a number of provider devices operating in a prioritized-dispatch mode by determining a range of prioritized-dispatch-mode slots for a target time based on differences between value metrics received by provider devices operating in multiple dispatch modes and sending various availability nudges (or other indicators) to provider devices based on the range of prioritized-dispatch-mode slots. For instance, the disclosed systems can generate a threshold-noticeable-value difference between value metrics in a prioritized-dispatch mode and value metrics in a basic-dispatch mode based on historical provider devices receiving different value metrics while operating in either dispatch mode. Based on the threshold-noticeable-value difference, the disclosed systems can determine a range of slots for provider devices to operate in the prioritized-dispatch mode during a target time period (e.g., in real time or near-real time) for a geographic area. In some cases, the disclosed systems further account for estimated prioritized-value metrics and estimated counterfactual-value metrics at the target time period to determine such a range of slots. Based on the determined range of prioritized-dispatch-mode slots for the target time period, the disclosed systems can transmit prioritized-mode-availability indicators to provider devices to indicate varying levels of availability (or unavailability) of the prioritized-dispatch mode for the geographic area.

BRIEF DESCRIPTION OF THE DRAWINGS

The detailed description refers to the accompanying drawings in which:

FIGS. 4A and 4B illustrate a diagram of a provider-dispatch-control system determining a range of prioritized-dispatch-mode slots in accordance with one or more embodiments.

DETAILED DESCRIPTION

Figure 1:
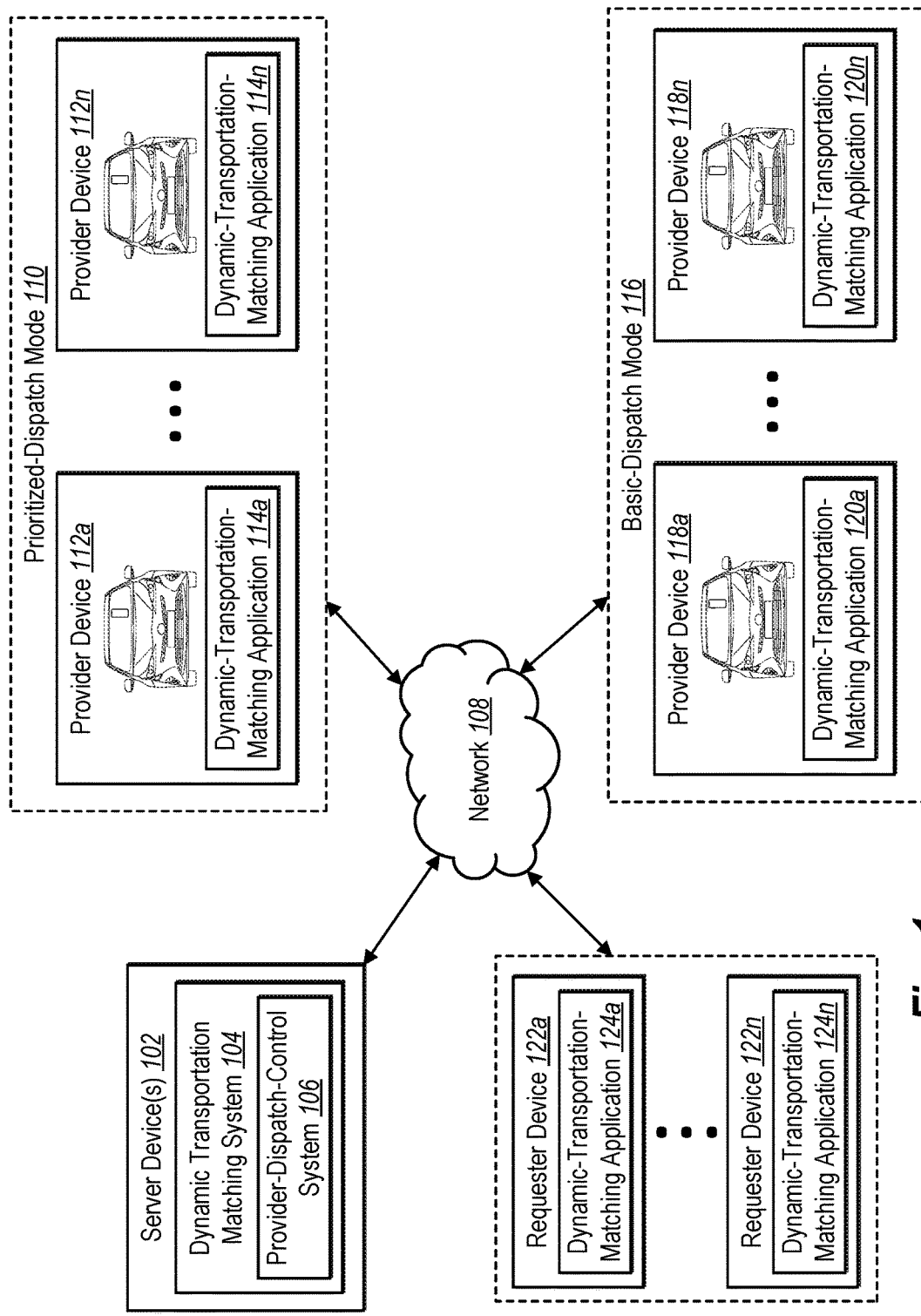
FIG. 1 illustrates a block diagram of an environment for implementing a provider-dispatch-control system in accordance with one or more embodiments.

This disclosure describes a provider-dispatch-control system that can dynamically control a number of provider devices engaged in a prioritized-dispatch mode using a provider application for a target time period and geographic area by (i) determining a range of prioritized-dispatch-mode slots from a threshold-noticeable-value difference between value metrics for the prioritized-dispatch mode and value metrics for a basic-dispatch mode and (ii) sending provider devices various availability indicators based on the range of prioritized-dispatch-mode slots. For instance, the provider-dispatch-control system can identify historical prioritized-value metrics received by provider devices operating in a prioritized-dispatch mode and historical basic-value metrics received by provider devices operating in a basic-dispatch mode. Subsequently, the provider-dispatch-control system can utilize both historical value metrics to generate a threshold-noticeable-value difference between value metrics for the prioritized-dispatch mode and value metrics for the basic-dispatch mode for a target time period. Based on the threshold-noticeable-value difference, the provider-dispatch-control system can determine a range of prioritized-dispatch-mode slots during the target time period for the geographic area.

To control the pool of provider devices in the prioritized-dispatch mode, in certain implementations, the providerdispatch-control system transmits a prioritized-mode-availability indicator to provider devices based on the range of prioritized-dispatch-mode slots. For example, the prioritized-mode-availability indicators can nudge provider devices to enter or not enter the prioritized-dispatch mode or can deactivate the prioritized-dispatch mode for additional provider devices.

As mentioned above, the provider-dispatch-control system can identify historical value metrics corresponding to a prioritized-dispatch mode and a basic-dispatch mode to generate a threshold-noticeable-value difference for a target time period. In some instances, the provider-dispatch-control system identifies a set of prioritized-dispatch-provider devices that received prioritized-value metrics while operating in a prioritized-dispatch mode in one or more previous time periods. In addition, the provider-dispatch-control system can also identify a set of basic-dispatch provider devices that received basic-value metrics while operating in a basic-dispatch mode in the one or more previous time periods. Then, the provider-dispatch-control system can use the prioritized-value metrics received by the set of prioritized-dispatch-provider devices and the basic-value metrics received by the set of basic-dispatch-provider devices to generate a threshold-noticeable-value difference for value metrics between the prioritized-dispatch mode and the basic-dispatch mode. In certain embodiments, the provider-dispatch-control system determines a minimum-detectable-effect value (as the threshold-noticeable-value difference) based on a distribution of value-metric differences between the historical prioritized-value metrics and the historical basic-value metrics.

Using the generated threshold-noticeable-value difference for the target time period, the provider-dispatch-control system can determine a range of prioritized-dispatch-mode slots for the target time period. More specifically, the provider-dispatch-control system can, for the target time period, estimate value metrics for the prioritized-dispatch mode and determine a range of prioritized-dispatch-mode slots based on the estimated value metrics. To determine the range of prioritized-dispatch-mode slots, for example, the provider-dispatch-control system can compare an estimated prioritized-value metric (e.g., average estimated earnings received by a provider device while operating in a prioritized-dispatch mode) and an estimated counterfactual-value metric (e.g., average estimated earnings received by a provider device if each provider device were to operate in the basic-dispatch mode).

As just suggested, the provider-dispatch-control system can estimate a prioritized-value metric to be received by a prioritized-dispatch-provider device operating in a prioritized-dispatch mode during the target time period for a predicted number of prioritized-dispatch-provider devices. To estimate the prioritized-value metric, in some instances, the provider-dispatch-control system utilizes a cannibalization factor that reflects a probability of a provider device operating in a prioritized-dispatch mode being selected for a transportation request over a provider device operating in a basic-dispatch mode. Furthermore, the provider-dispatch-control system can also estimate a counterfactual-value metric that represents a value metric that would have been received by a provider device if each provider device were to operate in a basic-dispatch mode during the target time period (e.g., in absence of the prioritized-dispatch mode). Subsequently, the provider-dispatch-control system can determine a maximum limit of prioritized-dispatch-mode slots using a value-metric difference between the estimated prioritized-value metric and the estimated counterfactual-value metric and comparing the value-metric difference to the threshold-noticeable-value difference. As explained further below, in certain instances, the provider-dispatch-control system can also utilize a provider-device-metrics maximization approach and/or a queueing-model approach to determine the range of prioritized-dispatch-mode slots.

Upon determining the range of prioritized-dispatch-mode slots for the target time period, the provider-dispatch-control system can transmit a prioritized-mode-availability indicator to provider devices based on the range of prioritized-dispatch-mode slots. For example, the provider-dispatch-control system can determine a range of prioritized-dispatch-mode slots that includes an upper-target-limit, a lower-target-limit, and a maximum limit of provider-device slots. Furthermore, the provider-dispatch-control system can (via a dispatch controller) determine that a number of active provider devices operating in the prioritized-dispatch mode satisfies the upper-target-limit and transmit a prioritized-mode-availability indicator that advises provider devices to not enter the prioritized-dispatch mode. Additionally, the provider-dispatch-control system can also determine that the number of active provider devices does not satisfy the lower-target-limit and transmit a prioritized-mode-availability indicator that advises provider devices to enter the prioritized-dispatch mode. Moreover, the provider-dispatch-control system can determine that the number of active provider devices satisfies the maximum limit and transmit a prioritized-mode-availability indicator to deactivate the prioritized-dispatch mode on additional provider devices.

As mentioned above, conventional ride sharing systems often face a number of disadvantages, especially with regard to efficiency, accuracy, and flexibility. For example, conventional ride sharing systems often utilize complex, computationally expensive models to determine the number of provider devices to introduce into a geographic area to fulfill transportation requests. For instance, a ride sharing system can apply complex machine-learning models (e.g., Monte Carlo algorithms, neural networks for deep reinforcement learning, or other reinforcement learning models) to analyze the number provider devices to place within a geographic area to accurately fulfill transportation requests. In analyzing thousands or tens of thousands of provider devices in real time, this approach requires significant computational resources and bandwidth to utilize such complex models to repeatedly analyze the number provider devices to introduce within a prioritized-dispatch mode.

Furthermore, many conventional systems also generate inaccurate and inefficient allocations of provider devices across geographic areas. In particular, conventional systems oftentimes rely on a singular group of provider devices with similar dispatch conditions that can result in suboptimal or inaccurate matches between provider devices and requester devices. For instance, due to reliance on a singular group of provider devices with similar dispatch conditions, conventional systems often times determine impractical or inefficient destinations for provider devices, unnecessary idle time for provider devices, long wait times for requester devices, and excessive cancellations of digital transportation requests. These inaccuracies often lead to increased computer processing and bandwidth usage due to idle provider devices and waiting requester devices repeatedly querying servers for transportation-request matches, cancellations, re-matches, provider device locations, and/or other digital status updates.

In addition to inaccurate and inefficient transportation-request matching, conventional ride sharing systems often apply inflexible and rigid computing models to match providers with requesters. For instance, many conventional systems use computing models with rigid heuristics (or rules) that decide the number of provider devices to introduce into a geographic area to fulfill transportation requests. Such rigid heuristics often fail to adapt in real time when circumstances in regard to the number of provider devices (or number of transportation requests) within a geographic area change. In addition to having rigid heuristics, many conventional systems decide the number of provider devices to introduce to fulfill transportation requests under a uniform set of dispatch rules for the provider devices. Indeed, conventional systems often cannot account for the efficiencies (or inefficiencies) caused by introducing provider devices to fulfill transportation requests with different sets of dispatch rules for the provider devices. Accordingly, conventional systems often use conventional heuristics because some existing computing models cannot adapt in real time to quickly and efficiently notify an accurate number of provider devices to fulfill transportation requests in a geographic area (especially when the provider devices may operate with varying dispatch rules).

As suggested above, the disclosed provider-dispatch-control system provides several advantages and benefits over conventional ride sharing systems. For instance, the provider-dispatch-control system uses a computing model that more efficiently controls the flow of (and communicates with) provider devices across application modes and adjusts vehicle flow into or out of geographic areas compared to many conventional systems. More specifically, the provider-dispatch-control system can remain computationally efficient while analyzing thousands or tens of thousands of provider devices in real time to dynamically control a number of provider devices operating in either a prioritized-dispatch mode or a basic-dispatch mode in a geographic area.

Indeed, unlike many conventional systems and/or alternative approaches that utilize complex machine learning models, the provider-dispatch-control system can utilize a lightweight computational model that (i) estimates value metrics for a threshold-noticeable-value difference between value metrics for a provider-dispatch mode and a basic-dispatch mode in real time and (ii) determines a range of prioritized-dispatch-mode slots within a geographic area. The provider-dispatch-control system can utilize the lightweight computational model for a threshold-noticeable-value difference (in real time) to determine a range of prioritized-dispatch-mode slots for a geographic area with little processing power or time compared to more complex machine-learning models. As explained below with respect to FIGS. 4A-4B, for instance, the provider-dispatch-control system can utilize either a threshold-noticeable-value difference preservation approach or a provider-device-metrics maximization approach as such lightweight computational models.

In addition to improved computational efficiency, the provider-dispatch-control system utilizes a more flexible and dynamic computing model for transmitting data indicators to granularly control the number of provider devices introduced within dispatch modes relative to conventional systems. Unlike conventional systems that utilize rigid heuristics (or rules) to determine a number of provider devices for a geographic area, the provider-dispatch-control system determines a range of slots for provider devices operating in a prioritized-dispatch mode. By determining a range of slots that accounts for comparisons between estimated value metrics of varying dispatch modes and a threshold-noticeable-value difference, the provider-dispatch-control system can more granularly determine availability and provide access to the dispatch mode for provider devices. In addition, by utilizing estimated value metrics based on real time data with an efficient lightweight computational model that compares estimated value metrics to a threshold-noticeable-value difference, the provider-dispatch-control system can also adapt in real time to quickly and efficiently notify an accurate number of provider devices to enter (or not enter) a prioritized-dispatch mode. In contrast to conventional systems that utilize uniform dispatch rules, the provider-dispatch-control system can estimate prioritized-value metrics using a cannibalization factor to determine a range of prioritized-dispatch-mode slots for prioritized-dispatch-provider devices that operate concurrently with basic-dispatch-provider devices—while accounting for efficiencies (or inefficiencies) caused by the concurrent operation of the dispatch modes with the varying dispatch rules.

Beyond flexible and granular control of dispatch modes, in some embodiments, the provider-dispatch-control system also efficiently configures graphical user interfaces of provider devices to activate or deactivate a prioritized-dispatch mode on the provider devices (e.g., configure provider-device-application modes across multiple provider devices). In particular, in one or more embodiments, the provider-dispatch-control system can adaptively configure graphical user interfaces displayed on the provider devices by adding or removing selectable options to join a prioritized-dispatch mode based on a comparison between a real time number of active provider devices in the prioritized-dispatch mode (via a dispatch controller) and a determined maximum limit of a range of prioritized-dispatch mode slots. To add or remove such selectable options, in some embodiments, the provider-dispatch-control system sends availability indicators to the provider devices to trigger such devices to activate or deactivate selectable options for a prioritized-dispatch mode. By doing so, the provider-dispatch-control system quickly and efficiently enables access (or removes access) to a prioritized-dispatch mode in real time through an adaptive configuration of selectable options displayed on graphical user interfaces of the provider devices.

In addition to improved computational efficiency and dynamically activating (or deactivating) dispatch modes, the provider-dispatch-control system also improves other efficiencies and accuracies of allocations of provider devices across geographic areas. For instance, in contrast to many conventional systems that rely on uniform dispatch conditions, the provider-dispatch-control system can apply different rules (or metrics) to different sets of provider devices to more efficiently and accurately dispatch provider devices for transportation requests. By determining an accurate number of provider devices for a prioritized-dispatch mode and utilizing availability indicators to control access to the prioritized-dispatch mode, for instance, the provider-dispatch-control system can ensure constantly efficient transportation request matching. More specifically, the provider-dispatch-control system can dispatch provider devices to more efficient destinations, reduce idle times for provider devices, reduce requester device wait times, and reduce digital cancellations by utilizing availability indicators to control access to the prioritized-dispatch mode such that bottlenecks are avoided for provider devise in the prioritized-dispatch mode. In turn, this results in reduced processing and bandwidth on a dynamic transportation matching system because provider devices and requester devices submit fewer queries for transportation request matches, cancellations, re-matches, locations, and/or other digital status updates.

As indicated by the foregoing discussions, the present disclosure utilizes a variety of terms to describe features and advantages of the provider-dispatch-control system. For example, as used herein, the term "dispatch mode" (sometimes referred to as "transportation dispatch mode") refers to a category or classification of provider devices. In particular, a dispatch mode refers to a classification utilized to dispatch provider devices utilizing a unique algorithm, weight, or score. For example, the provider-dispatch-control system can apply unique algorithms, weights, or scores in dispatching provider devices in different dispatch modes. The provider-dispatch-control system can also provide unique application functionality, user interfaces, or access privileges to provider devices assigned to a particular dispatch mode. Thus, a dispatch mode can also refer to the unique application functions, interfaces, and privileges provided to a particular class of provider devices.

For example, a dispatch mode can include, but is not limited to, a prioritized-dispatch mode or basic-dispatch mode. As used herein, the term "prioritized-dispatch mode" (sometimes referred to as "prioritized-transportation-dispatch mode") refers to a dispatch mode that is prioritized relative to another dispatch mode (e.g., a basic-dispatch mode) for transportation requests. For example, provider devices assigned to a prioritized-dispatch mode can be prioritized over other provider devices corresponding to another dispatch mode (e.g., to achieve an increased provider device utilization and/or value metric). To illustrate, the provider-dispatch-control system can prioritize provider devices corresponding to a prioritized-dispatch mode in selecting provider devices to match with transportation requests of requester devices over provider devices corresponding to a basic-dispatch mode. In some cases, the terms "power mode" or "priority mode" are interchangeable with the term "prioritized-dispatch mode" as used herein.

Furthermore, the term "basic-dispatch mode" (sometimes referred to as "basic-transportation-dispatch mode") refers to a dispatch mode that is not prioritized relative to a prioritized-dispatch mode for transportation requests. For instance, provider devices assigned to a basic-dispatch mode can be assigned to transportation requests without prioritization (and with a basic-dispatch-mode rate). In one or more embodiments, the provider-dispatch-control system selects provider devices from a basic-dispatch mode for a transportation request when a provider device from a prioritized-dispatch mode is unavailable.

In addition, as used herein, the term "prioritized-dispatch-provider device" refers to a provider device corresponding to (or operating within) a prioritized-dispatch mode. Furthermore, as used herein, the term "basic-dispatch-provider device" refers to a provider device corresponding to (or operating within) a basic-dispatch mode.

As used herein, the term "value metric" refers to a measured benefit, result, or incentive. In particular, the term "value metric" can refer to a measured value or benefit corresponding to an outcome from a provider device fulfilling a transportation request. For instance, a value metric can include, but is not limited to, a conversion metric, a measure of revenue (e.g., a monetary value corresponding to a fulfilled transportation request), a number of transportation requests fulfilled, or a utilization metric (e.g., a measure of time that a provider device is actively fulfilling transportation requests). For example, a value metric can include a measure of revenue resulting from a provider device fulfilling a transportation request. In addition, a value metric can include a measure value or benefit (e.g., a measure of revenue) from various numbers of provider devices fulfilling various numbers of transportation requests. Moreover, as used herein, the term "historic-value metric" refers to a value metric that corresponds to a historical outcome from historical provider device activity (e.g., an observed value metric from a previous time).

In addition, as used herein, the term "prioritized-value metric" refers to a value metric received by (or otherwise corresponding to) a prioritized-dispatch-provider device that is operating within a prioritized-dispatch mode. In particular, the term "prioritized-value metric" can refer to a value metric received by a prioritized-dispatch-provider device fulfilling a transportation request while in a prioritized-dispatch mode. Indeed, the provider-dispatch-control system can determine a prioritized-value metric by applying a prioritized-dispatch-mode rate to a transportation request that is fulfilled by a prioritized-dispatch-provider device. Moreover, as used herein, the term "basic-value metric" refers to a value metric received by (or otherwise corresponding to) a basic-dispatch-provider device that is operating within a basic-dispatch mode. In some instances, the provider-dispatch-control system can determine a basic-value metric by applying a basic-dispatch-mode rate to a transportation request that is fulfilled by a basic-dispatch-provider device.

Furthermore, as used herein, the term "counterfactual-value metric" refers to a value metric received by one or more provider devices if each provider device were to operate in a basic-dispatch mode. In particular, the term "counterfactual-value metric" can refer to a value metric determined from provider devices that are considered to be operating in a basic-dispatch mode in a hypothetical circumstances—regardless of whether the provider devices are actually operating in the basic-dispatch mode or a prioritized-dispatch mode. For instance, the provider-dispatch-control system can apply a basic-dispatch-mode rate to transportation requests that are fulfilled by both basic-dispatch-provider devices and prioritized-dispatch-provider devices in a given geographic area for a given time period to determine a counterfactual-value metric in a hypothetical circumstance. Indeed, in one or more embodiments, the provider-dispatch-control system utilizes the counterfactual-value metric to represent a value metric corresponding to provider devices fulfilling transportation requests in the absence of a prioritized-value metric (e.g., in the absence of a prioritized-dispatch mode).

Furthermore, as used herein, the term "transportation request" refers to a request (e.g., from a requester or requester device) for transport by a transportation vehicle. In particular, a transportation request includes a request for a transportation vehicle to transport a requester or a group of individuals from one geographic area to another geographic area. A transportation request can include information, such as a pickup location, a destination location (e.g., a location to which the requester wishes to travel), a request location (e.g., a location from which the transportation request is initiated), location profile information, a requester rating, or a travel history.

As used herein, the term "dispatch-mode rate" refers to a measurement of a value metric in relation to fulfilling one or more transportation requests in a given dispatch mode. In particular, a dispatch-mode rate can refer to a modifier value that utilizes time spent actively fulfilling transportation requests and/or a distance travelled to fulfill transportation requests to determine a value metric received by a provider device for fulfilling the transportation requests. For instance, the dispatch-mode rate can include a measure of revenue (or compensation value) that is generated (or received) in response to a characteristic of a fulfilled transportation request (e.g., a transportation request time length, a transportation request distance length). Indeed, the dispatch-mode rate can include a measure of revenue per hour of actively fulfilling a transportation request.

As used herein, the term "compensation value" refers to a value assigned to a provider device for compensation to the transportation provider associated with the provider device. In particular, the term "compensation value" can refer to an amount of monetary compensation or a rate of monetary compensation allocated to a provider device for fulfilling one or more transportation requests. For example, a transportation provider compensation value can include a pay rate for a transportation provider corresponding to a provider device.

Furthermore, as used herein, the term "prioritized-dispatch-mode rate" refers to a dispatch-mode rate that corresponds to a prioritized-dispatch-provider device operating within a prioritized-dispatch mode. Additionally, as used herein, the term "basic-dispatch-mode rate" refers to a dispatch-mode rate that corresponds to a basic-dispatch-provider device operating within a basic-dispatch mode. In some instances, the provider-dispatch-control system can assign different dispatch-mode rates between the prioritized-dispatch-mode rate and the basic-dispatch-mode rate.

As further used herein, the term "threshold-noticeable-value difference" refers to a value-metric gap between value metrics corresponding to varying dispatch mode implementations. In particular, the term "threshold-noticeable-value difference" refers to a target value-metric gap to achieve between value metrics received by provider devices operating in a prioritized-dispatch mode and value metrics received by provider devices operating in another dispatch mode (e.g., a basic-dispatch mode or a counterfactual-value metric). In some instances, a threshold-noticeable-value difference includes a minimum-detectable-effect value that is determined from a distribution of historical value-metric differences (or mean historical noticeable-value differences) from historical value-metric differences identified between historical prioritized-value metrics corresponding to historical prioritized-dispatch-provider devices and historical basic-value metrics corresponding to historical basic-dispatch-provider devices. The provider-dispatch-control system determining a threshold-noticeable-value difference is described in greater detail below (e.g., in relation to FIG. 3).

As used herein, the term "slot" refers to an assignable opening within a dispatch mode for a provider device. In particular, the term "slot" refers to an assignable opening that can be utilized to determine a number of available (or filled) positions for provider devices within a dispatch mode. As an example, the provider-dispatch-control system can determine a range or a particular number (e.g., fifty) prioritized-dispatch-mode slots for the prioritized-dispatch mode and select a range or a particular number (e.g., fifty) provider devices for the prioritized-dispatch-mode slots.

In addition, as used herein, the term "range of slots" refers to a varying quantity of slots between numerical limits for provider-device slots. For instance, the provider-dispatch-control system can determine a range of prioritized-dispatch-mode slots to indicate a variety of target limits within the range of prioritized-dispatch-mode slots. For instance, the provider-dispatch-control system can determine a upper-target limit within the range of slots at which to indicate to send provider-device indications to not enter the prioritized-dispatch mode, a lower-target limit within the range of slots at which to send provider-device indications to enter the prioritized-dispatch mode (until the lower-target limit is satisfied), and a maximum limit within the range of slots at which to prohibit provider devices from entering the prioritized-dispatch mode.

As used herein, the term "prioritized-mode-availability indicator" refers to data indicating an availability (or unavailability) of a prioritized-dispatch mode or data activating (or deactivating) the prioritized-dispatch mode. In particular, the term "prioritized-mode-availability indicator" refers to data indicating an availability (or unavailability) or status of a prioritized-dispatch mode—or data activating (or deactivating) the prioritized-dispatch mode—based on a determined range of prioritized-dispatch-mode slots (and a number of active provider devices operating in a prioritized-dispatch mode). For instance, the prioritized-mode-availability indicator can include an indication that advises (or notifies) provider devices to not enter (or join) the prioritized-dispatch mode, an indication that advises (or notifies) provider devices to enter (or join) the prioritized-dispatch mode, or a deactivation of the prioritized-dispatch mode on additional provider devices (e.g., a notification or indication to prohibit entrance into the prioritized-dispatch mode, disabling a join option for the prioritized-dispatch mode).

As used herein, the term "cannibalization factor" refers to a value reflecting an effect of a provider device operating in a prioritized-dispatch mode concurrently with a basic-dispatch mode. In particular, the term "cannibalization factor" can refer to a value reflecting a probability of a provider device operating in a prioritized-dispatch mode being selected for a transportation request over a provider device operating in a basic-dispatch mode. In one or more embodiments, the provider-dispatch-control system utilizes the cannibalization factor to estimate a prioritized-value metric for prioritized-dispatch-provider devices operating in a prioritized-dispatch mode.

As further used herein, the term "utilization metric" (sometimes referred to as "provider device utilization metric") refers to a value that indicates one or more aspects of activity or efficiency corresponding to a provider device. In particular, the term "utilization metric" can include a time value corresponding to an activity or efficiency of a provider device. For example, a provider device utilization metric can include an idle-status time (P1 time) (e.g., a time spent without a passenger and not traveling to pick up a passenger), an in-transit-to-pickup-status time (P2 time), and/or an active-transport-status time (P3 time) (e.g., a time with a passenger in the vehicle) corresponding to a provider device or a set of provider devices.

For example, the provider-dispatch-control system can determine (or identify) an idle-status time (P1 time) for a provider device as an amount of time the provider device is waiting for a transportation request (e.g., not assigned a transportation request). In particular, the idle-status time can include an amount of time in which the provider device is idle and not fulfilling (or traveling to fulfill) a transportation request. The provider-dispatch-control system can identify an idle-status time that corresponds to various numbers of provider devices (e.g., individually or collectively) in a geographical area (in real time and/or from historical data).

Additionally, as used herein, the term "idle time" refers to a time during which a provider device is not actively fulfilling a transportation request. In particular, the term "idle time" can refer to a time in which a transportation vehicle corresponding to a provider device does not have an active transportation request and/or does not have a passenger in the transportation vehicle, but the provider device is online available to be matched with a requester device (e.g., by indicating availability for requests through a dynamic-transportation-matching application).

Furthermore, the provider-dispatch-control system can determine (or identify) an in-transit-to-pickup-status time (P2 time) for a provider device as an amount of time the provider device experiences travelling to a pickup location corresponding to a transportation request. More specifically, the provider-dispatch-control system can determine that a provider device is in an in-transit-to-pickup status when the provider device is assigned a transportation request, while the vehicle corresponding to the provider device travels to a pickup location for the transportation request, and until the provider device begins to actively fulfill the transportation request (e.g., the requester is in the vehicle corresponding to the provider device) and determine an amount of time the provider device was within this in-transit-to-pickup status as the in-transit-to-pickup-status time. Additionally, the provider-dispatch-control system can identify an in-transit-to-pickup-status time that corresponds to various numbers of provider devices (e.g., individually or collectively) in a geographical area (in real time and/or from historical data).

In addition, the provider-dispatch-control system can determine (or identify) an active-transport-status time (P3 time) for a provider device as an amount of time the provider device is actively fulfilling a transportation request. For instance, the provider-dispatch-control system can determine that a provider device is in an active-transport status when the provider device (via a vehicle associated with the provider device) is actively providing transportation to a requester to a destination location (of a transportation request) and can determine an amount of time the provider device is within this active-transport status as the active-transport-status time. The provider dispatch control system can also identify an active-transport-status time that corresponds to various numbers of provider devices (e.g., individually or collectively) in a geographical area (in real time and/or from historical data).

Turning now to the figures, FIG. 1 illustrates a schematic diagram of a system 100 (or environment) in which a provider-dispatch-control system 106 can operate in accordance with one or more embodiments. As shown in FIG. 1, the system 100 includes server device(s) 102 (which includes a dynamic transportation matching system 104 and the provider-dispatch-control system 106), provider devices 112a-112n (operating in a prioritized-dispatch mode 110), provider devices 118a-118n (operating in a basic-dispatch mode 116), requester devices 122a-122n, and a network 108. As further illustrated in FIG. 1, the server device(s) 102, the provider devices 112a-112n, the provider devices 118a-118n, and the requester devices 122a-122n can communicate via the network 108. Although FIG. 1 illustrates the provider-dispatch-control system 106 being implemented by a particular component and/or device within the system 100, the provider-dispatch-control system 106 can be implemented, in whole or in part, by other computing devices and/or components in the system 100.

As shown in FIG. 1, the server device(s) 102 can include the dynamic transportation matching system 104. In one or more embodiments, the dynamic transportation matching system 104 identifies one or more matches between transportation requests (e.g., including pickup locations and destination locations) for requester devices and provider devices. In particular, the dynamic transportation matching system 104 can provide transportation requests from requester devices to provider devices that fulfill the transportation requests (e.g., transport a requester associated with the requester device to a destination location). For instance, the dynamic transportation matching system 104 can utilize information corresponding to a transportation request (received from a requester device) and information corresponding to available provider devices to select a provider device for the transportation request. Then, the dynamic transportation matching system 104 can transmit the transportation request to a selected provider device to fulfill the transportation request.

As also shown in FIG. 1, the dynamic transportation matching system 104 further includes the provider-dispatch-control system 106. In some embodiments, the provider-dispatch-control system 106 can determine a range of prioritized-dispatch-mode slots to make available in a geographic area by using estimated value metrics and a threshold-noticeable-value difference based from historical value-metric differences. In addition, the provider-dispatch-control system 106 can utilize the range of prioritized-dispatch-mode slots with a dispatch controller to control a number of provider devices that are operating in a prioritized-dispatch mode within the geographic area. More specifically, the provider-dispatch-control system 106 can utilize varying prioritized-mode-availability indicators based on the range of prioritized-dispatch-mode slots to indicate whether to enter or not enter the prioritized-dispatch mode or a deactivation of the prioritized-dispatch mode for additional provider devices.

Furthermore, as shown in FIG. 1, the system 100 includes the provider devices 112a-112n and the provider devices 118a-118n. In some instances, the provider devices 112a-112n and the provider devices 118a-118n may include, but are not limited to, mobile devices (e.g., smartphones, tablets) or other type of computing devices, including those explained below with reference to FIGS. 9 and/or 10. Indeed, the provider devices 112a-112n and the provider devices 118a-118n can include computing devices associated with (and/or operated by) providers and/or transportation vehicles (e.g., transportation vehicles of providers or autonomous vehicles). Moreover, the system 100 can include a different number of provider devices.

In addition, as shown in FIG. 1, the provider devices 112a-112n and the provider devices 118a-118n include dynamic-transportation-matching applications 114a-114n and dynamic-transportation-matching applications 120a-120n, respectively. In some embodiments, the dynamic-transportation-matching applications 114a-114n and dynamic-transportation-matching applications 120a-120n can include instructions that (upon execution) cause the provider devices 112a-112n and the provider devices 118a-118n to perform various actions. Such instructions may cause a provider device to present dispatch instructions (e.g., via a graphical user interface displaying navigation information) for a vehicle associated with the provider device. Furthermore, such instructions may likewise cause a provider device to identify (or transmit) value metric data and/or utilization metric data of a provider device and/or present a graphical user interface to display notifications (or indications) associated to a prioritized-dispatch mode and/or to prioritized-mode-availability indicators.

As also illustrated in FIG. 1, the provider-dispatch-control system 106 can generate, assign, and manage varying transportation dispatch modes. For instance, as shown in FIG. 1, the provider-dispatch-control system 106 can establish the prioritized-dispatch mode 110 and the basic-dispatch mode 116. Furthermore, as illustrated in FIG. 1, the provider-dispatch-control system 106 can assign (or include) a number of provider devices in the prioritized-dispatch mode 110 and the basic-dispatch mode 116 (e.g., the provider devices 112*a*-112*n* are prioritized-dispatch-provider devices operating in the prioritized-dispatch mode 110 and the provider devices 118*a*-118*n* are basic-dispatch-provider devices operating in the basic-dispatch mode 116).

In certain instances, the provider-dispatch-control system 106 selects a provider device to fulfill a transportation request by selecting the provider device from among provider devices operating in the prioritized-dispatch mode 110 and the basic-dispatch mode 116. Indeed, the provider-dispatch-control system 106 can utilize a separate set of dispatch rules, heuristics, or metrics to select a provider device for the transportation request from among provider devices operating in the prioritized-dispatch mode 110 and the basic-dispatch mode 116. In some embodiments, the provider-dispatch-control system 106 can utilize prioritization metrics associated with the prioritized-dispatch mode 110 to determine whether to select a prioritized-dispatch-provider device for a transportation request over a basic-dispatch-provider device from the basic-dispatch mode 116. As an example, the provider-dispatch-control system 106 can utilize prioritization metrics to prioritize queueing of prioritized-dispatch-provider devices, avoid inefficient destination locations for prioritized-dispatch-provider devices, and/or analyze outcomes of sending a prioritized-dispatch-provider device to a destination location during the selection of a provider device for a transportation request. The provider-dispatch-control system 106 can select a provider device for a transportation request from between a prioritized-dispatch mode and a basic-dispatch mode as described by Sebastien Jean Francois Martin et al., Dispatching Provider Devices Utilizing Multi-outcome Transportation-Value Metrics and Dynamic Provider Device Modes, Application Ser. No. 16/985,650 (filed Aug. 5, 2020) (hereinafter "Martin"), the contents of which are hereby incorporated by reference in their entirety.

Moreover, as illustrated in FIG. 1, the system 100 includes the requester devices 122*a*-122*n*. For instance, the requester devices 122*a*-122*n* may include, but are not limited to, mobile devices (e.g., smartphones, tablets) or other types of computing devices, including those explained below with reference to FIGS. 9 and/or 10. Additionally, the requester devices 122*a*-122*n* can include computing devices associated with (and/or operated by) requesters for transportation requests (or other services). As also shown in FIG. 1, the requester devices 122*a*-122*n* include dynamic-transportation-matching applications 124*a*-124*n*, which can include instructions that (upon execution) cause the requester devices 122*a*-122*n* to perform various actions. For example, a requester can interact with a dynamic-transportation-matching application (from the dynamic-transportation-matching applications 124*a*-124*n*) on a requester device (from the requester devices 122*a*-122*n*) to transmit a transportation request to the provider-dispatch-control system 106 (via the network 108). Moreover, the system 100 can include a different number of requester devices.

In one or more embodiments, the provider devices 112*a*-112*n*, the provider devices 118*a*-118*n*, and the requester devices 122*a*-122*n* correspond to one or more user accounts (e.g., user accounts stored at the server device(s) 102). For example, a requester of a requester device can establish a requester account with login credentials and the provider of a provider device can establish a provider account with login credentials. These user accounts can include a variety of information regarding requesters/providers, including requester/provider information (e.g., name, telephone number), vehicle information (e.g., vehicle type, license plate number), device information (e.g., operating system, memory or processing capability), payment information, purchase history, transportation history. Different accounts can also include various privileges associated with requesters and providers (e.g., privileges to access certain functionality via the transportation matching application, to provide transportation services, to submit transportation requests). The dynamic transportation matching system 104 can manage the provider devices 112*a*-112*n*, the provider devices 118*a*-118*n*, and the requester devices 122*a*-122*n* based on appropriate privileges associated with the corresponding user accounts (e.g. provider accounts and/or requester accounts). Accordingly, providers and/or requesters can utilize multiple devices (e.g., multiple provider devices or multiple requester devices) with the appropriate privileges associated with the corresponding accounts.

The present disclosure utilizes provider devices and requester devices to refer to devices associated with these user accounts. Thus, in referring to a provider device or a requester device, the disclosure and the claims are not limited to communications with a specific device, but any device corresponding to an account of a particular user. Accordingly, in using the term provider device, this disclosure can refer to any computing device corresponding to a provider account. Similarly, in using the term requester device, this disclosure can refer to any computing device corresponding to a requester account.

Additionally, as shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIGS. 9 and/or 10. Furthermore, although FIG. 1 illustrates the server device(s) 102, the provider devices 112*a*-112*n*, the provider devices 118*a*-118*n*, and the requester devices 122*a*-122*n* communicating via the network 108, the various components of the system 100 can communicate and/or interact via other methods (e.g., the server device(s) 102, the provider devices 112*a*-112*n*, and the provider devices 118*a*-118*n* can communicate directly).

Figure 2:
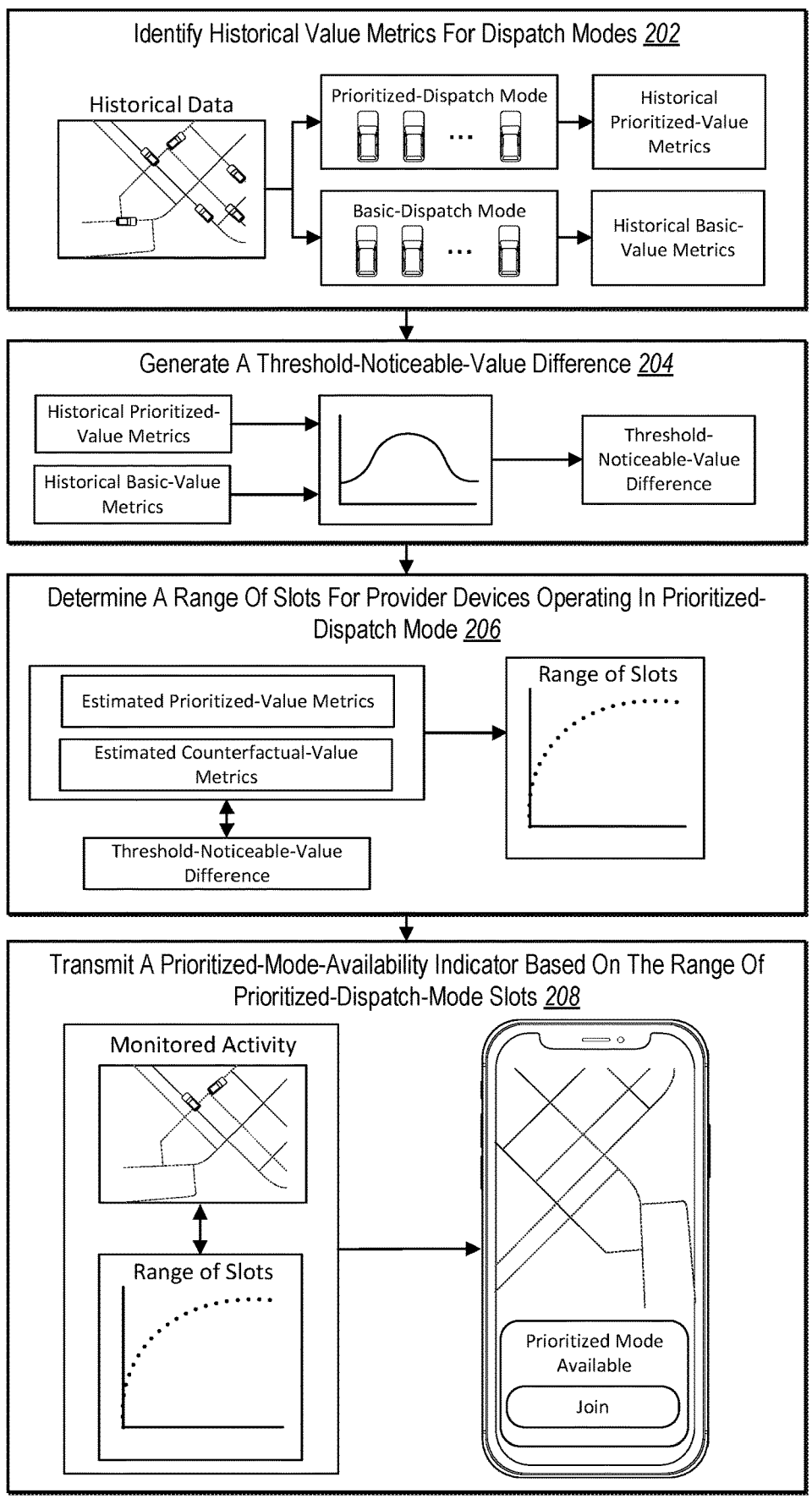
FIG. 2 illustrates an overview diagram of a provider-dispatch-control system transmitting a prioritized-mode-availability indicator based on a range of prioritized-dispatch-mode slots in accordance with one or more embodiments.

As mentioned above, the provider-dispatch-control system 106 can dynamically control a number of available prioritized-dispatch-mode slots based on a range of prioritized-dispatch-mode slots based on a threshold-noticeable-value difference for value metrics across dispatch modes. For instance, FIG. 2 illustrates an overview of the provider-dispatch-control system 106 dynamically controlling a number of available prioritized-dispatch-mode slots using a determined threshold-noticeable-value difference and estimated value metrics. Indeed, as illustrated in FIG. 2, the provider-dispatch-control system 106 can identify historical value metrics, generate a threshold-noticeable-value difference, determine a range of prioritized-dispatch-mode slots, and transmit prioritized-mode-availability indicators based on the range of slots.

As shown in FIG. 2, the provider-dispatch-control system 106 can identify historical value metrics for dispatch modes in an act 202. In particular, as illustrated in FIG. 2, the provider-dispatch-control system 106 can utilize historical data (e.g., from one or more previous time periods in a geographic area) to identify historical provider devices operating in a prioritized-dispatch mode and a basic-dispatch mode. Then, the provider-dispatch-control system 106 can utilize value metrics corresponding to the historical provider devices operating in the prioritized-dispatch mode and the basic-dispatch mode to identify historical prioritized-value metrics and historical-basic-value metrics from one or more previous time periods in a geographic area. This disclosure describes identifying historical value metrics for the prioritized-dispatch mode and the basic-dispatch mode further below (e.g., in relation to FIG. 3).

As further shown in FIG. 2, the provider-dispatch-control system 106 can generate a threshold-noticeable-value difference in an act 204. For instance, as shown in FIG. 2, the provider-dispatch-control system 106 can utilize historical value metrics corresponding to the different dispatch modes to generate a threshold-noticeable-value difference. For instance, the provider-dispatch-control system 106 can analyze value-metric differences that have occurred in one or more previous time periods based on the historical prioritized-value metrics and the historical basic-value metrics to determine a distribution of the value-metric differences. Moreover, the provider-dispatch-control system 106 can utilize the distribution of value-metric differences to generate a threshold-noticeable-value difference. This disclosure describes generating a threshold-noticeable-value difference further below (e.g., in relation to FIG. 3).

Moreover, as illustrated in FIG. 2, the provider-dispatch-control system 106 can determine a range of slots for provider devices operating in a prioritized-dispatch mode in an act 206. In particular, as shown in FIG. 2, the provider-dispatch-control system 106 can estimate prioritized-value metrics and counterfactual-value metrics for a target time period in a geographic area. Then, as shown in FIG. 2, the provider-dispatch-control system 106 can determine a range of prioritized-dispatch-mode slots for the target time period in the geographic area based on the estimated prioritized-value metrics, the estimated counterfactual-value metrics, and the threshold-noticeable-value difference. This disclosure describes determining a range of prioritized-dispatch-mode slots further below (e.g., in relation to FIGS. 4 and 5).

As further shown in FIG. 2, the provider-dispatch-control system 106 can transmit a prioritized-mode-availability indicator based on a determined range of prioritized-dispatch-mode slots in an act 208. For instance, as illustrated in FIG. 2, the provider-dispatch-control system 106 can monitor activity of provider devices in a geographic area to identify a number of active provider devices that are operating in a prioritized-dispatch mode in the geographic area. Then, as further shown in FIG. 2, the provider-dispatch-control system 106 can compare the number of active provider devices operating in the prioritized-dispatch mode with the range of prioritized-dispatch-mode slots. Based on the number of active provider devices operating in the prioritized-dispatch mode satisfying (or not satisfying) designated limits within the range of prioritized-dispatch-mode slots, the provider-dispatch-control system 106 can transmit a variety of prioritized-mode-availability indicators to a computing device with indications to enter or not enter the prioritized-dispatch mode or indications to deactivate the prioritized-dispatch mode for additional provider devices. This disclosure describes transmitting prioritized-mode-availability indicators based on a range of prioritized-dispatch-mode slots further below (e.g., in relation to FIG. 6).

Figure 3:
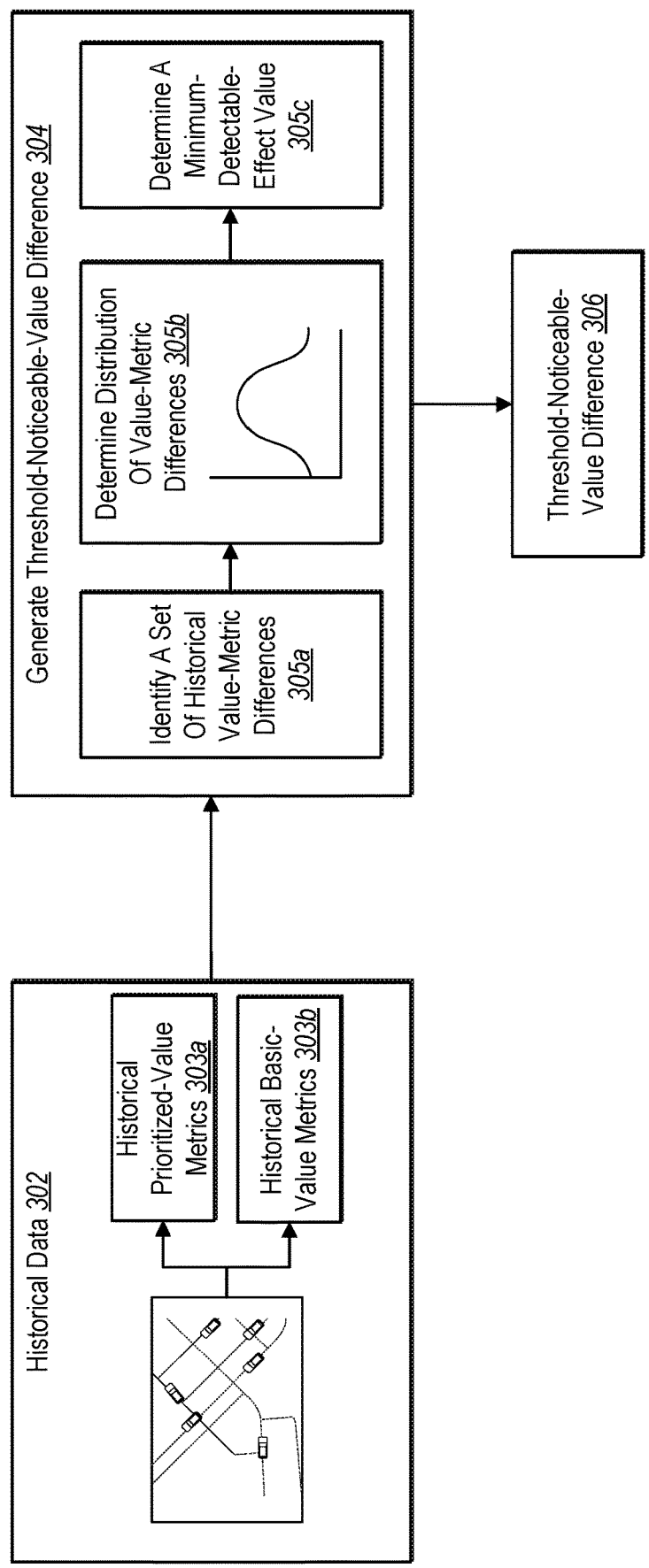
FIG. 3 illustrates a diagram of a provider-dispatch-control system generating a threshold-noticeable-value difference in accordance with one or more embodiments.

As mentioned above, the provider-dispatch-control system 106 can generate a threshold-noticeable-value difference between a prioritized-dispatch mode and a basic-dispatch mode. For instance, FIG. 3 illustrates the provider-dispatch-control system 106 generating a threshold-noticeable-value difference utilizing historical prioritized-value metrics and historical basic-value metrics. In particular, as shown in FIG. 3, the provider-dispatch-control system 106 identifies historical data 302 having historical prioritized-value metrics 303a and historical basic-value metrics 303b. Then, as shown in FIG. 3, the provider-dispatch-control system 106 utilizes the historical data 302 to generate a threshold-noticeable-value difference in an act 304.

More specifically, as shown in the act 304 of FIG. 3, the provider-dispatch-control system 106 utilizes the historical data 302 to identify a set of historical value-metric differences (in an act 305a) from the historical prioritized-value metrics 303a and the historical basic-value metrics 303b (e.g., for one or more previous periods of time). As previously mentioned, these value metrics reflect a measured value or benefit corresponding to one or more outcomes from one or more provider devices fulfilling a transportation request (e.g., a measure of revenue). Then, as shown in FIG. 3, the provider-dispatch-control system 106 can utilize the historical value-metric differences (from the act 305a) to determine a distribution of value-metric differences in the act 305b. Based on the distribution of value-metric differences (from the act 305a), the provider-dispatch-control system 106 generates a threshold-noticeable-value difference. For instance, as illustrated in FIG. 3, the provider-dispatch-control system 106 can (in the act 305c) determine a minimum-detectable-effect value from the distribution of value-metric differences (of the act 305a) as a threshold-noticeable-value difference 306.

In one or more embodiments, the provider-dispatch-control system 106 utilizes a threshold-noticeable-value difference (or a value-metric difference) to represent a gap between a value metric received by operating in one dispatch mode over another. For example, the threshold-noticeable-value difference can represent a gap between prioritized-value metrics received by prioritized-dispatch-provider devices operating in a prioritized-dispatch mode over basic-value metrics received by basic-dispatch-provider devices operating in a basic-dispatch mode. Furthermore, the provider-dispatch-control system 106 can generate a threshold-noticeable-value difference such that the value difference between the value metrics for the prioritized-dispatch mode and the basic-dispatch mode is statistically sufficient (i.e., noticeable) to introduce one or more prioritized-dispatch-provider devices in a geographic area.

As just mentioned, the provider-dispatch-control system 106 utilizes historical data to generate the threshold-noticeable-value difference (e.g., historical data 302). In some instances, the provider-dispatch-control system 106 utilizes historical data that corresponds to specified geographic area and/or a specified time period. Indeed, the provider-dispatch-control system 106 can utilize historical data that was monitored (or tracked) from one or more provider and/or requester devices during the specified time period (at the specified geographic area) and stored (or logged) within data storage corresponding to the dynamic transportation matching system 104. In one or more embodiments, the provider-dispatch-control system 106 can identify historical data that is logged (or stored) from historical provider and/or requester devices operating in a geographic area for a target time period (e.g., the geographic area in which the provider-dispatch-control system 106 is determining a range of prioritized-dispatch-mode slots).

A geographic area can include a (defined) zone within a region (e.g., a region in which the provider-dispatch-control system 106 operates and/or fulfills transportation requests). For instance, the geographic area can include a region that is defined by a zone and/or boundary (e.g., a boundary line of various shapes, a radius, a tessellation). In some embodiments, a geographic area refers to a geohash (including any level of geohash like a geohash5, a geohash6, etc.) or any combination of multiple geohashes (e.g., a neighborhood or region comprising multiple geohashes).

In certain embodiments, the provider-dispatch-control system 106 identifies (from historical data) provider devices that were active in a geographic area. In addition, the provider-dispatch-control system 106 can identify a corresponding dispatch mode for the historical provider devices. For instance, the provider-dispatch-control system 106 can identify a set of historical prioritized-dispatch-provider devices operating in a prioritized-dispatch mode in a geographic area and a set of historical basic-dispatch-provider devices operating in a basic-dispatch mode in the geographic area. Then, the provider-dispatch-control system 106 can identify historical data (e.g., historical provider device utilization metrics, historical value metrics) that corresponds to each of the dispatch modes (e.g., the historical prioritized-value metrics 303a and the historical basic-value metrics 303b).

As an example, the provider-dispatch-control system 106 can identify historical utilization metrics corresponding to historical provider devices operating in a given dispatch mode. As described above, the historical utilization metrics can include historical idle-status time, historical in-transit-to-pickup-status time, or historical active-transport-status time. In particular, the provider-dispatch-control system 106 can identify historical utilization metrics that correspond to different activity states of the provider devices. More specifically, the provider-dispatch-control system 106 can identify historical utilization metrics such as an amount of time that a provider device is in an idle state, an amount of time in an in-transit state (e.g., traveling to a pickup location), and/or an amount of time in an active-transport state (e.g., actively fulfilling a transportation request). As explained further below, the provider-dispatch-control system 106 can determine historical value metrics that were received by provider devices as a result of these historical utilization metrics. Moreover, as also explained below, the provider-dispatch-control system 106 can utilize the determined historical value metrics to identify historical value-metric differences (e.g., in the act 305a), to determine a normal distribution of the historical value-metric differences (e.g., in the act 305b), and utilize the normal distribution to determine a minimum-detectable-effect value (e.g., in the act 305c) as the threshold-noticeable-value difference 306.

Furthermore, the provider-dispatch-control system 106 can identify such historical utilization metrics (e.g., an idle-status time, an in-transit-to-pickup-status time, an active-transport-status time) for each dispatch mode. For instance, the provider-dispatch-control system 106 can identify historical idle-status times, historical in-transit-to-pickup-status times, and historical active-transport-status times corresponding to activity from historical prioritized-dispatch-provider devices that were operating within a prioritized-dispatch mode. Likewise, the provider-dispatch-control system 106 can also identify historical idle-status times, historical in-transit-to-pickup-status times, and historical active-transport-status times corresponding to activity from historical basic-dispatch-provider devices that were operating within a basic-dispatch mode.

As mentioned above, after or in addition to determining idle time, in-transit-to-pickup time, and active-transport time, the provider-dispatch-control system 106 can also identify historical value metrics for the dispatch modes. To identify (or determine) historical value metrics corresponding to a geographic area, the provider-dispatch-control system 106 can obtain logged (or tracked) value metrics data from the geographic area during one or more historical time periods. Additionally, the provider-dispatch-control system 106 can identify the historical logged (or tracked) value metrics data that correspond to different dispatch modes separately (e.g., historical prioritized-value metrics corresponding to historical prioritized-dispatch-provider devices and the historical basic-value metrics corresponding to historical-basic-dispatch-provider devices).

In certain embodiments, the provider-dispatch-control system 106 can determine historical value metrics for corresponding to a geographic area (for a dispatch mode) by utilizing identified historical utilization metrics (e.g., idle-status times, in-transit-to-pickup-status times, and active-transport-status times) for each dispatch mode. For instance, the provider-dispatch-control system 106 can identify historical utilization metrics for a given dispatch mode and utilize a dispatch-mode rate to determine a historical value metric for the dispatch mode. In relation to FIG. 3, the provider-dispatch-control system 106 utilizes the historical utilization metrics to determine the historical value metrics (under historical data 302) that are used to determine the threshold-noticeable-value difference 306. More specifically, the provider-dispatch-control system 106 can identify historical utilization metrics corresponding to historical prioritized-dispatch-provider devices of a prioritized-dispatch mode and apply a prioritized-dispatch-mode rate to the identified historical utilization metrics to determine the historical prioritized-value metrics (e.g., as historical prioritized-value metrics 303a and historical basic value metrics 303b).

Similarly, the provider-dispatch-control system 106 can identify historical utilization metrics corresponding to historical basic-dispatch-provider devices of a basic-dispatch mode and apply a basic-dispatch-mode rate to the identified historical utilization metrics to determine the historical basic-value metrics. As an example, the provider-dispatch-control system 106 can apply a prioritized-dispatch-mode rate to the active-transport-status time of historical prioritized-dispatch-provider devices to generate historical prioritized-value metrics (e.g., a measure of revenue that is generated by the amount of active-transport-status time at the prioritized-dispatch-mode rate).

As further shown in FIG. 3, the provider-dispatch-control system 106 can identify historical value-metric differences (e.g., in the act 305a). For instance, the provider-dispatch-control system 106 can utilize, for a historical time period, a historical prioritized-value metric (e.g., from historical prioritized-value metrics 303a) and a historical basic-value metric (e.g., from historical basic value metrics 303b) to identify (or determine) a historical value-metric difference. Indeed, the historical value-metric difference can include a gap between the historical prioritized-value metric and the historical basic-value metric. In some instances, the provider-dispatch-control system 106 determines a historical prioritized-value metric that was received per quantity of time (e.g., per hour) during the historical time period and also determined a historical basic-value metric that was received per quantity of time. Then, the provider-dispatch-control system 106 can identify (or determine) the historical value-metric difference as how much more or less (e.g., the difference) the prioritized-value metric (e.g., per quantity of time) was in comparison to the basic-value metric (e.g., per quantity of time). In one or more embodiments, the provider-dispatch-control system 106 identifies historical value-metric differences (e.g., as a set of historical value-metric differences in the act 305a) for multiple historical time periods in a geographic area based on historical prioritized-value metrics (e.g., from historical prioritized-value metrics 303*a*) and historical basic-value metrics (e.g., from historical basic value metrics 303*b*) during each of the multiple historical time periods.

As further suggested by FIG. 3, the provider-dispatch-control system 106 can utilize a statistical test with the historical value-metric differences to generate a threshold-noticeable-value difference. As an example, the provider-dispatch-control system 106 can determine (e.g., as shown in the act 305*b*) a normal distribution of the historical value-metric differences (e.g., between the historical prioritized-value metrics and the historical basic-value metrics) and utilize the normal distribution to determine (or calculate) a minimum-detectable-effect value (e.g., as shown in the act 305*c*). Indeed, in one or more embodiments, the provider-dispatch-control system 106 utilizes the determined minimum-detectable-effect value from the normal distribution based on the historical value-metric differences (from one or more time periods) as the threshold-noticeable-value difference (e.g., the threshold-noticeable-value difference 306).

In one or more embodiments, the provider-dispatch-control system 106 utilizes a single-sided-statistical test that identifies a noticeable-value difference despite variances in historical value-metric differences between historical prioritized-value metrics and historical basic-value metrics. For instance, the provider-dispatch-control system 106 can utilize (or define) a statistical p-value parameter (e.g., $p \in [0,1)$) and a false negative rate (e.g., $\beta \in [0,1)$) with value metrics (e.g., w) from historical time periods (e.g., a $m \in \aleph$ as a number of observed sessions of provider devices operating in the dispatch modes). In addition, the provider-dispatch-control system 106 can utilize (or define) a standard deviation of the value metrics (e.g., w) from the historical time periods (e.g., $m \in \aleph$) as $\sigma_w \in \Re^+$.

Subsequently, the provider-dispatch-control system 106 can utilize (or define) a true expected value-metric difference between prioritized-value metrics and counterfactual-value metrics (e.g., value metrics received by one or more provider devices if each provider device were to operate in a basic-dispatch mode) as $\Delta w \in \Re^+$. Further, the provider-dispatch-control system 106 can utilize (or define) an estimated mean difference between prioritized-value metrics and counterfactual-value metrics as $\Delta \hat{w} \in \Re$. Then, the provider-dispatch-control system 106 can determine a threshold-noticeable-value difference $\underline{\Delta w}$ as a (infimum) minimum-detectable-effect value (of a power $1-\beta$) from a distribution of historical value-metric differences (e.g., a normal distribution $\Phi$) by utilizing the following function:

$$\underline{\Delta w} = \inf \left\{ \Delta \hat{w} \in \mathbb{R}^+ : Pr\left( 1 - \Phi\left( \frac{\Delta \hat{w}}{\sigma_w \sqrt{\frac{2}{m}}} \right) \le p \right) > 1 - \beta \right\} \quad (1)$$

In one or more additional embodiments, the provider-dispatch-control system 106 can utilize a variety of statistical approaches to determine a threshold-noticeable-value difference from historical data. For instance, the provider-dispatch-control system 106 can analyze historical value-metric differences identified from historical data (as described above) by applying various statistical tests to the historical value-metric differences. As a further example, to determine a threshold-noticeable-value difference from historical data, the provider-dispatch-control system 106 can utilize a mean value-metric difference, a standard deviation of value-metric differences, a mode value-metric difference, and/or a median value-metric difference from set of value-metric differences identified between historical prioritized-value metrics and basic-value metrics from one or more historical time periods in a geographic area.

Furthermore, although one or more embodiments illustrate the provider-dispatch-control system 106 utilizing a statistical model to generate a threshold-noticeable-value difference, the provider-dispatch-control system 106 can also utilize a variety of other approaches to determine a threshold-noticeable-value difference. For instance, in certain instances, the provider-dispatch-control system 106 can utilize a user configured threshold-noticeable-value difference. More specifically, the provider-dispatch-control system 106 can provide a graphical user interface with input tools (e.g., a text box, value selector) to receive a user input (or selection) of a threshold-noticeable-value difference that a user selects based on based on historical prioritized-value metrics received by a set of prioritized-dispatch-provider devices and historical basic-value metrics received by a set of basic-dispatch-provider devices (e.g., for a previous time period and geographic area).

Figure 4A:
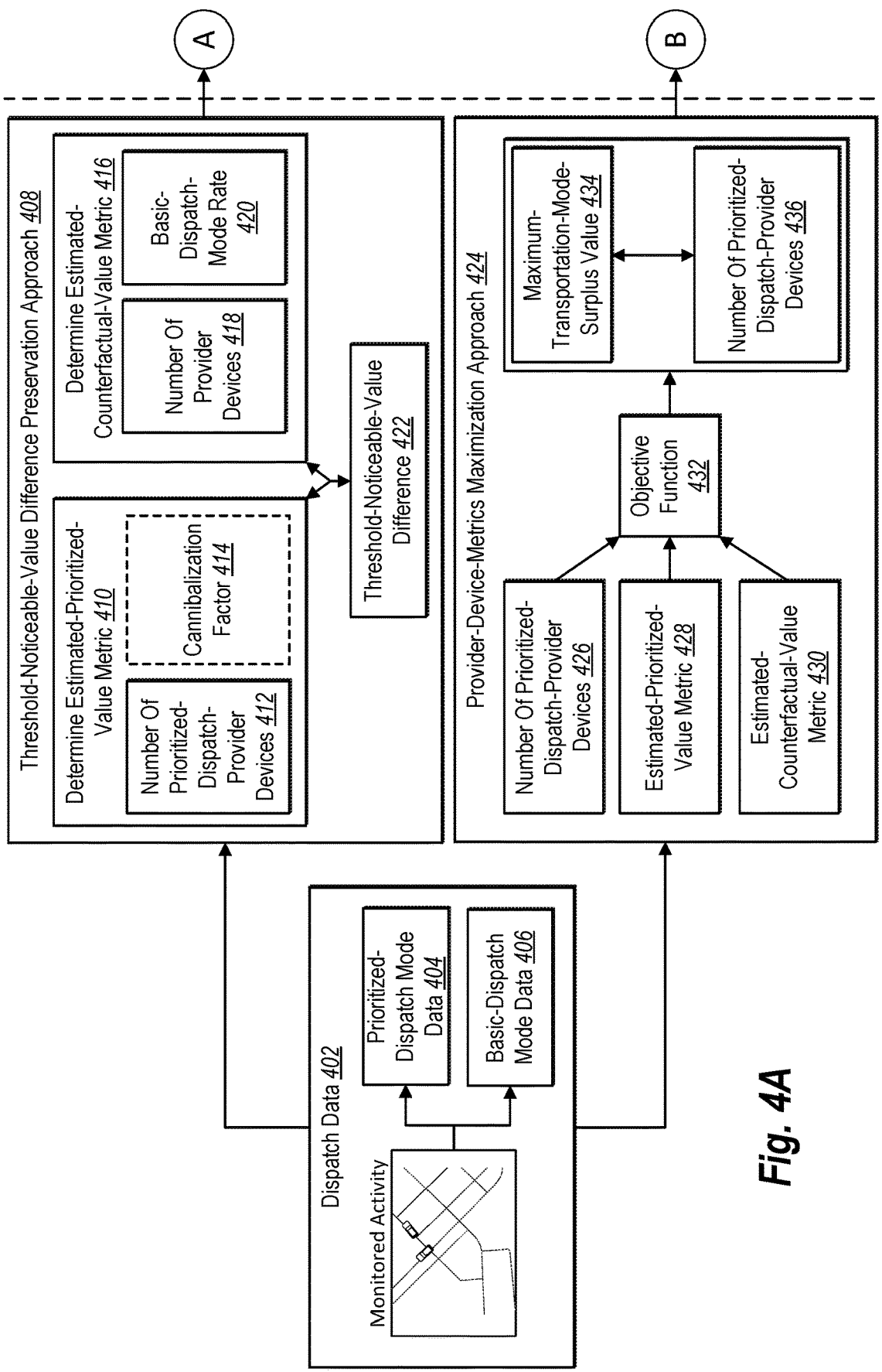

As mentioned above, the provider-dispatch-control system 106 can determine a range of slots for provider devices operating in a prioritized-dispatch mode. For instance, FIGS. 4A and 4B illustrate the provider-dispatch-control system 106 determining a range of prioritized-dispatch-mode slots for a target time period within a geographic area. In particular, as shown in FIG. 4A, the provider-dispatch-control system 106 identifies dispatch data 402 from monitored activity (e.g., in real time) of provider devices to obtain prioritized-dispatch mode data 404 and basic-dispatch mode data 406. Then, as further shown in FIG. 4A, the provider-dispatch-control system 106 can utilize the dispatch data 402 to determine a range of prioritized-dispatch-mode slots (e.g., a range of slots 438 or a range of slots 440 as shown in FIG. 4B) using a threshold-noticeable-value difference preservation approach (in an act 408) or a provider-device-metrics maximization approach (in an act 424). Indeed, as shown in FIG. 4B, the provider-dispatch-control system 106 can determine a range of slots 438 using the threshold-noticeable-value difference preservation approach (in the act 408) or a range of slots 440 using the provider-device-metrics maximization approach (in the act 424).

In one or more embodiments, the provider-dispatch-control system 106 identifies dispatch data to determine a range of prioritized-dispatch-mode slots (e.g., the dispatch data 402 from FIG. 4A). For instance, the dispatch data can include utilization metrics of provider devices, dispatch-mode rates, and/or value metrics corresponding to provider devices (or dispatch modes). In some embodiments, the provider-dispatch-control system 106 identifies the dispatch data by monitoring activities of one or more provider devices operating within the dynamic transportation matching system 104 in a geographic area.

In addition to monitoring provider devices, the provider-dispatch-control system 106 can receive (or identify) dispatch data for a target time period in a geographic area. For instance, the provider-dispatch-control system 106 can receive the dispatch data in real time from monitored activity (in a current time period as the target time period). In some embodiments, the provider-dispatch-control system 106 receives (or identifies) the dispatch data in snapshots during a sliding window of time intervals (e.g., once per 2 seconds, once per 2 minutes) in a moving time interval (e.g., an interval of 5 minutes, 10 minutes, half hour) within the target time period (e.g., in real time). For example, the provider-dispatch-control system 106 can receive the state of dispatch data (e.g., utilization metrics of provider devices, dispatch-mode rates, and/or value metrics) at each time interval within the target time period.

As part of identifying the dispatch data 402, in one or more embodiments, the provider-dispatch-control system 106 identifies or determines a moving average of dispatch data over aggregated dispatch data within a sliding window of time within a target time period. For instance, the provider-dispatch-control system 106 can utilize averaged dispatch data (e.g., average utilization metrics of provider devices, dispatch-mode rates, and/or value metrics) from dispatch data obtained within a given time interval. Indeed, the provider-dispatch-control system 106 can identify a moving average of aggregated dispatch data over the course of a time interval (e.g., the average dispatch data in the last 10 minutes from aggregated dispatch data that is received per 2 seconds). By doing so, the provider-dispatch-control system 106 can smooth dispatch data over time even when dispatch data fluctuates at each snapshot of collection. In some instances, the provider-dispatch-control system 106 can determine a time interval to utilize based on characteristics of a geographic area (e.g., the frequency of transportation requests, the provider device population, the number of data transmissions corresponding to a geographic area).

As further indicated by FIG. 4A, the provider-dispatch-control system 106 can identify the dispatch data 402 corresponding to individual dispatch modes from the monitored activity. For instance, the provider-dispatch-control system 106 can identify the prioritized-dispatch mode data 404 and the basic-dispatch mode data 406. To identify the dispatch data corresponding to the individual dispatch mode, the provider-dispatch-control system 106 can identify utilization metrics of provider devices, dispatch-mode rates, and/or value metrics corresponding to a specific dispatch mode. As an example, the provider-dispatch-control system 106 can identify (from monitored activity) utilization metrics of prioritized-dispatch-provider devices, prioritized-dispatch-mode rate, and/or prioritized value metrics within the geographic area.

To illustrate, the provider-dispatch-control system 106 can identify idle-status times, in-transit-to-pickup-status times, or active-transport-status times from the monitored activity of provider devices over a target time period as dispatch data. Furthermore, the provider-dispatch-control system 106 can identify idle-status times, in-transit-to-pickup-status times, or active-transport-status times specifically for prioritized-dispatch-provider devices operating in a prioritized-dispatch mode (within the geographic area) as prioritized-dispatch mode data. Likewise, the provider-dispatch-control system 106 can identify idle-status times, in-transit-to-pickup-status times, or active-transport-status times specifically for basic-dispatch-provider devices operating in a basic-dispatch mode (within the geographic area) as basic-dispatch mode data.

In addition, the provider-dispatch-control system 106 can identify dispatch-mode rates in the target time period as dispatch data. For instance, the provider-dispatch-control system 106 can identify a prioritized-dispatch-mode rate corresponding to the target time period as prioritized-dispatch mode data. Furthermore, the provider-dispatch-control system 106 can identify a basic-dispatch-mode rate corresponding to the target time period as basic-dispatch mode data. Indeed, the provider-dispatch-control system 106 can utilize the idle-status times, in-transit-to-pickup-status times, or active-transport-status times from the monitored activity of provider devices (from both a prioritized-dispatch mode and a basic-dispatch mode) as the dispatch data 402 with the prioritized-dispatch-mode rate and the basic-dispatch-mode rate over a target time period to determine estimated value metrics as described in FIG. 4A below.

As mentioned above and as shown in FIG. 4A, the provider-dispatch-control system 106 can utilize a threshold-noticeable-value difference preservation approach (in the act 408) to determine a range of prioritized-dispatch-mode slots. For instance, as shown in FIG. 4A, the provider-dispatch-control system 106 can determine estimated value metrics for a target time period and compare the differences between the estimated value metrics to a threshold-noticeable-value difference to determine a range of slots.

More specifically, as shown in FIG. 4A, the provider-dispatch-control system 106 determines an estimated-prioritized-value metric (in an act 410) using a (predicted) number of prioritized-dispatch-provider devices 412 and also determines an estimated-counterfactual-value metric (in an act 416). Then, the provider-dispatch-control system 106 can determine a value-metric difference between the estimated-prioritized-value metric (from the act 410) and the estimated-counterfactual-value metric (from the act 416).

As further shown in FIG. 4A, the provider-dispatch-control system 106 compares (i) the value-metric difference between the estimated-prioritized-value metric and the estimated-counterfactual-value metric to (ii) the threshold-noticeable-value difference 422 to determine a range of prioritized-dispatch-mode slots 438 shown in FIG. 4B. In some instances, the provider-dispatch-control system 106 identifies the largest number of prioritized-dispatch-provider devices 412 that results in a value-metric difference (based on the estimated-prioritized-value metric and estimated counterfactual-value metric) that satisfies the threshold-noticeable-value difference 422.

In reference to FIG. 4A, the provider-dispatch-control system 106 can determine an estimated-prioritized-value metric in an act 410 by utilizing a (predicted) number of prioritized-dispatch-provider devices 412 (e.g., selected during the preservation approach) to model the estimated-prioritized-value metric based on the dispatch data 402. Furthermore, the provider-dispatch-control system 106 can determine a cannibalization factor 414 that reflects a probability of a provider device operating in a prioritized-dispatch mode being selected for a transportation request over a provider device operating in a basic-dispatch mode. Then, the provider-dispatch-control system 106 can utilize the dispatch data 402, the cannibalization factor 414, and the number of prioritized-dispatch-provider devices 412 to determine the estimated-prioritized-value metric in an act 410.

As explained in the following paragraphs, the provider-dispatch-control system 106 determines a number of prioritized-dispatch-provider devices $N_\pi$ in function (16) that preserves a threshold-noticeable-value difference (from function (1)) according to a maximum slot limit for a range of slots. In particular, the provider-dispatch-control system 106 determines a transportation-request-demand increase $d_i$ from a cannibalization factor c as defined by functions (2)-(3) (for a number of newly added prioritized-dispatch-provider devices d). In addition, the provider-dispatch-control system 106 can determine a ratio (r) between an active-transport-status time and an in-transit-to-pickup-status time from the prioritized-dispatch-mode utilization metrics (P1, P2, P3)$_{t,\pi}$ as defined by functions (4)-(10). Then, the provider-dispatch-control system 106 determines an estimated basic-value metric ($w_\phi$) to be received by a basic-dispatch-provider device operating in a basic-dispatch mode during a target time period for a geographic area, an estimated prioritized-value metric ($w_\pi$) to be received by a prioritized-dispatch-provider device operating in a prioritized-dispatch mode during the target time period for the geographic area, and a counterfactual-value metric ($\bar{w}$) representing a value metric that would be received by a provider device if each provider device were to operate in the basic-dispatch mode during the target time period, as defined by functions (11)-(15). Finally, the provider-dispatch-control system 106 identifies a largest number of prioritized-dispatch-provider devices $N_\pi$ in function (16) that results in a difference between an estimated prioritized-value metric and an estimated counterfactual-value metric that preserves a threshold-noticeable-value difference (from function (1)).

Before turning to functions (1)-(16), however, this disclosure explains some background concepts to define utilization metrics for P1, P2, P3 followed by concepts to define a cannibalization factor c. For instance, the provider-dispatch-control system 106 can determine utilization metrics (in terms of idle-status times (P1 times), in-transit-to-pickup-status times (P2 times), or active-transport-status times (P3 times)) corresponding to a prioritized-dispatch mode ($\pi$) within a time interval (t) of a target time period (e.g., (P1, P2, P3)$_{t,\pi}$) from the monitored activity of the prioritized-dispatch mode data 404. In addition, the provider-dispatch-control system 106 can also determine utilization metrics corresponding to a basic-dispatch mode ($\pi$) within the time interval (t) of the target time period (e.g., (P1, P2, P3)$_{t,\pi}$) from the monitored activity of the basic-dispatch mode data 406. Furthermore, the provider-dispatch-control system 106 can also determine (from the dispatch data 402) a prioritized-dispatch-mode rate $R_\pi$ and a basic-dispatch-mode rate $R_\phi$.

Indeed, the provider-dispatch-control system 106 can utilize the utilization metrics corresponding to a prioritized-dispatch mode ($\pi$) and the utilization metrics corresponding to a basic-dispatch mode ($\phi$) to determine the estimated prioritized and counterfactual value metrics (under both the threshold-noticeable-value difference approach 408 and the provider-device-metrics maximization approach 424). In some embodiments, the provider-dispatch-control system 106 also determines, from one or more previous time periods, historical utilization metrics for the prioritized-dispatch mode ($\pi$) (e.g., (P1, P2, P3)$_{t-1,\pi}$) and historical utilization metrics for the basic-dispatch mode ($\phi$) (e.g., (P1, P2, P3)$_{t-1,\phi}$).

Moreover, as mentioned above, the provider-dispatch-control system 106 can determine a cannibalization factor c as set forth in function (2) below. To determine such a cannibalization factor c, the provider-dispatch-control system 106 can identify (or determine) a prioritized-dispatch bonus probability $d_b$ reflecting a likelihood of conversion from a basic-dispatch mode to a prioritized-dispatch mode (in accordance with one or more embodiments herein). The provider-dispatch-control system 106 can utilize the prioritized-dispatch bonus probability $d_b$ with a number of active provider devices within the target time period in the geographic area to determine the cannibalization factor c in function (2).

Additionally, the provider-dispatch-control system 106 can utilize monitored activity between prioritized-dispatch-provider devices and basic-dispatch-provider devices to determine a likelihood (e.g., probability) of a basic-dispatch provider device joining (or changing to) a prioritized-dispatch-provider device (e.g., joining a prioritized dispatch mode) as the prioritized-dispatch bonus probability $d_b$. In one or more embodiments, the provider-dispatch-control system 106 can identify the prioritized-dispatch bonus probability $d_b$ by identifying a conversion rate of basic-dispatch-provider devices converting to prioritized-dispatch-provider devices.

In one or more embodiments, the provider-dispatch-control system 106 utilizes a value for the cannibalization factor c that is inversely proportional to a number of prioritized-dispatch-provider devices. For instance, as the number of prioritized-dispatch-provider devices increases, the cannibalization factor c decreases (e.g., a lesser likelihood of a provider device operating in a prioritized-dispatch mode being selected for a transportation request over a provider device operating in a basic-dispatch mode). The provider-dispatch-control system 106 also can scale the cannibalization factor c proportionally with the prioritized-dispatch bonus probability $d_b$.

In some embodiments, the provider-dispatch-control system 106 can determine the cannibalization factor c based on the prioritized-dispatch bonus probability $d_b$, a number of basic-dispatch-provider devices within a target time period, and a total number of provider devices utilizing the following function:

$$c = d_b \frac{\text{Basic Dispatch Provider Devices}}{\text{Total Provider Devices}} \qquad (2)$$

As indicated by FIG. 4A, in some embodiments, the provider-dispatch-control system 106 determines the cannibalization factor c as the cannibalization factor 414 according to the function above and utilizes the cannibalization factor 414 to determine the estimated-prioritized-value metric (of the act 410). In particular, the provider-dispatch-control system 106 can characterize the effect of adding a provider device to a prioritized-dispatch mode. For instance, the provider-dispatch-control system 106 can define a transportation-request demand increase $d_i$ for a given dispatch mode i as a combination of the cannibalization factor c (from function (2)) and a number of newly added prioritized-dispatch-provider devices d in accordance with the following function:

$$d_i = c \cdot d \qquad (3)$$

Furthermore, the provider-dispatch-control system 106 can determine a ratio (r) between an active-transport-status time and an in-transit-to-pickup-status time for a prioritized-dispatch mode (i.e., a P3 versus P2 time ratio). In particular, the provider-dispatch-control system 106 can determine a ratio (r) between an active-transport-status time and an in-transit-to-pickup-status time from the prioritized-dispatch-mode utilization metrics (P1, P2, P3)$_{t,\pi}$ using the following function:

$$r = P3_\pi / (P2_\pi + P3_\pi) \qquad (4)$$

Then, the provider-dispatch-control system 106 can estimate basic-dispatch-mode utilization metrics for a target time period using the modelled demand increase $d_i$ (based on a cannibalization factor c) from functions (2) and (3) with the newly added prioritized-dispatch-provider devices d and the ratio (r) between the active-transport-status time and the in-transit-to-pickup-status time of the prioritized-dispatch-mode from function (4) in combination with observed basic-dispatch-mode utilization metrics (from monitored activity). For instance, the provider-dispatch-control system 106 can determine an estimated idle-status time (P1$_\phi$) corresponding to the basic-dispatch mode using an observed idle-status time ($P1_{\phi,obs}$) for the basic-dispatch mode by using the following function:

$$P1_\phi = P1_{\phi,obs} + d_i - d \quad (5)$$

In addition, the provider-dispatch-control system 106 can determine an estimated in-transit-to-pickup-status time ($P2_\phi$) corresponding to the basic-dispatch mode using an observed in-transit-to-pickup time ($P2_{\phi,obs}$) for the basic-dispatch mode by using the following function:

$$P2_\phi = P2_{\phi,obs} + d_i * (1-r) \quad (6)$$

Moreover, the provider-dispatch-control system 106 can determine an estimated active-transport-status time ($P3_\phi$) corresponding to the basic-dispatch mode using an observed active-transport-status time ($P3_{\phi,obs}$) for the basic-dispatch mode by using the following function:

$$P3_\phi = P3_{\phi,obs} - d_i * r \quad (7)$$

In addition, the provider-dispatch-control system 106 can also determine estimated prioritized-dispatch-mode utilization metrics for a target time period based on observed prioritized-dispatch-mode utilization metrics (from monitored activity), the modelled demand increase $d_i$ (based on a cannibalization factor c) from functions (2) and (3) with the newly added prioritized-dispatch-provider devices d and the ratio (r) between the active-transport-status time and the in-transit-to-pickup-status time from the function (4). For example, the provider-dispatch-control system 106 can determine an estimated idle-status time ($P1_\pi$) corresponding to the prioritized-dispatch mode using an observed idle-status time ($P1_{\pi,obs}$) for the prioritized-dispatch mode by using the following function:

$$P1_\pi = P1_{\pi,obs} + d - d_i \quad (8)$$

Additionally, the provider-dispatch-control system 106 can determine an estimated in-transit-to-pickup-status time ($P2_\pi$) corresponding to the prioritized-dispatch mode using an observed in-transit-to-pickup-status time ($P2_{\pi,obs}$) for the prioritized-dispatch mode by using the following function:

$$P2_\pi = P2_{\pi,obs} + d_i * (1-r) \quad (9)$$

Furthermore, the provider-dispatch-control system 106 can determine an estimated active-transport-status time ($P3_\pi$) corresponding to the prioritized-dispatch mode using an observed active-transport-status time ($P3_{\pi,obs}$) for the prioritized-dispatch mode by using the following function:

$$P3_\pi = P3_{\pi,obs} + d_i * r \quad (10)$$

Subsequently, the provider-dispatch-control system 106 can determine estimated value metrics for the dispatch modes (for the target time period). For example, the provider-dispatch-control system 106 can determine estimated value metrics for the respective dispatch modes (in functions (11)-(14)) by utilizing the estimated utilization metrics for the prioritized-dispatch mode (from the functions (8)-(10)) and the estimated basic-dispatch mode (from the functions (5)-(7)). Additionally, in some instances, the provider-dispatch-control system 106 utilizes a predicted number of prioritized-dispatch-provider devices within the target time period to determine estimated value metrics for the dispatch modes (in functions (11)-(14)).

To illustrate, the provider-dispatch-control system 106 can determine an estimated basic-value metric (in the functions (11) or (12) below) for a prioritized-dispatch-provider device (operating in a basic-dispatch mode) using estimated utilization metrics corresponding to the basic-dispatch mode (as described above in functions (5)-(7)). To determine the estimated basic-value metric in a target time period and geographic area, the provider-dispatch-control system 106 can utilize a predicted number of prioritized-dispatch-provider devices, a basic-dispatch-mode rate, and the estimated basic-dispatch mode utilization metrics (as described above).

For instance, in terms of notation from variables from functions (5)-(7) above, the provider-dispatch-control system 106 can utilize a predicted number of prioritized-dispatch-provider devices ($N_\pi$), the estimated basic-dispatch-mode utilization metrics ($P1_\phi$, $P2_\phi$, and $P3_\phi$), and a basic-dispatch-mode rate ($\hat{R}_\phi$) to determine an estimated basic-value metric ($w_\phi$) for a basic-dispatch-provider device from a basic-dispatch mode distribution function $g_\phi$ having a mean pi using the following function:

$$w_\phi = g_\phi(N_\phi + d; \mu) = \hat{R}_\phi \frac{P3_\phi}{P1_\phi + P2_\phi + P3'_\phi} \quad (11)$$

To expand on function (11), the provider-dispatch-control system 106 can determine the estimated basic-value metric ($w_\phi$) for a basic-dispatch-provider device with the variables of functions (5)-(7) using the following function:

$$w_\phi = g_\phi(N_\phi + d; \mu) = \hat{R}_\phi \frac{(P3_{\phi,obs} - d_i * r)}{(P1_{\phi,obs} + d_i - d) + (P2_{\phi,obs} - d_i * (1-r)) + (P3_{\phi,obs} - d_i * r)'} \quad (12)$$

Furthermore, the provider-dispatch-control system 106 can determine an estimated-prioritized-value metric for a prioritized-dispatch-provider device (operating in a prioritized-dispatch mode) using estimated utilization metrics corresponding to the prioritized-dispatch mode (as described above in relation to 410 in FIG. 4A). In some embodiments, the provider-dispatch-control system 106 can utilize a predicted number of prioritized-dispatch-provider devices, a prioritized-dispatch-mode rate, and the estimated prioritized-dispatch mode utilization metrics (as described above in functions (8)-(10)) to determine an estimated prioritized-value metric (in functions (13) or (14)) in a target time period and geographic area. For example, the provider-dispatch-control system 106 can utilize a predicted number of prioritized-dispatch-provider devices ($N_\pi$), the estimated prioritized-dispatch-mode utilization metrics ($P1_\pi$, $P2_\pi$, and $P3_\pi$) from functions (8)-(10), and a prioritized-dispatch-mode rate ($\hat{R}_\pi$) to determine an estimated prioritized-value metric ($w_\pi$) for a prioritized-dispatch-provider device from a prioritized-dispatch mode distribution function $g_\pi$ having a mean $\mu$ using the following function:

$$w_\pi = g_\pi(N_\pi + d; \mu) = \hat{R}_\pi \frac{P3_\pi}{P1_\pi + P2_\pi + P3'_\pi} \quad (13)$$

To expand on function (13), the provider-dispatch-control system 106 can determine the estimated prioritized-value metric ($w_\pi$) for a prioritized-dispatch-provider device with the variables of functions (8)-(10) using the following function:

$$w_\pi = g_\pi(N_\pi + d; \mu) = \hat{R}_\pi \frac{(P3_{\pi,obs} - d_i * r)}{(P1_{\pi,obs} + d_i - d) + (P2_{\pi,obs} - d_i * (1 - r)) + (P3_{\pi,obs} - d_i * r)'} \quad (14)$$

In one or more embodiments, in reference to the above functions (11)-(14), the provider-dispatch-control system 106 utilizes a dispatch-mode-value-metric distribution $g_1$ that is learned from one or more estimated value metrics for the dispatch mode. For instance, the provider-dispatch-control system 106 can model the estimated value metrics across varying time periods and/or varying scenarios (e.g., various numbers of provider devices in a dispatch mode) to generate a dispatch-mode-value-metric distribution $g_i$. In certain instances, the provider-dispatch-control system 106 can utilize the various estimated value metrics with a machine learning model to determine the dispatch-mode-value-metric distribution $g_i$. By doing so, the provider-dispatch-control system 106 can generate a basic-dispatch mode distribution function $g_\phi$ and a prioritized-dispatch mode distribution function $g_\pi$.

As also shown in FIG. 4A, the provider-dispatch-control system 106 determines an estimated counterfactual-value metric (in the act 416). As previously mentioned, the provider-dispatch-control system 106 can determine an estimated counterfactual-value metric that represents a value metric that would be received by a provider device if each provider device were to operate in a basic-dispatch mode ruing a target time period (e.g., in the absence of a prioritized-dispatch mode). As illustrated in FIG. 4A, the provider-dispatch-control system 106 utilizes a number of provider devices 418 (that are active during the target time period) with a basic-dispatch-mode rate 420 to determine the estimated counterfactual-value metric (in the act 416). In certain instances, the provider-dispatch-control system 106 can model value metrics from provider devices in a target time period by determining (or predicting) the behavior of provider devices if the provider devices were operating in a basic-dispatch mode with a basic-dispatch-mode rate (e.g., in only a basic-dispatch mode without a prioritized-dispatch mode).

To illustrate, in some instances, the provider-dispatch-control system 106 utilizes an average value metric (of a provider device) across a total number of provider devices in a target time period and geographic area as the estimated counterfactual-value metric. For instance, in terms of notation from variables from the functions (7) and (10) above, the provider-dispatch-control system 106 can utilize estimated active-transport-status times corresponding to both the prioritized-dispatch mode ($P3_\pi$) and the basic-dispatch mode ($P3_\phi$) with a basic-dispatch-mode rate to determine the estimated counterfactual-value metric in a target time period and geographic area. More specifically, in one or more embodiments, the provider-dispatch-control system 106 utilizes estimated active-transport-status times corresponding to a prioritized-dispatch mode ($P3_\pi$) from function (10), estimated active-transport-status times corresponding to a basic-dispatch mode ($P3_\phi$) from function (7), a total number of active provider devices (N), and a basic-dispatch-mode rate $\hat{R}_\phi$ to determine a counterfactual-value metric ($\bar{w}$) using the following function:

$$\bar{w} = \hat{R}_\phi \frac{P3_\pi + P3_\phi}{N} \quad (15)$$

In one or more embodiments, the provider-dispatch-control system 106 can determine estimated prioritized-value metrics, estimated basic-value metrics, and/or estimated counterfactual-value metrics utilizing a machine learning model. For instance, the provider-dispatch-control system 106 can train a machine learning model to determine estimated the various value metrics from dispatch data received in a target time period.

For instance, the provider-dispatch-control system 106 can utilize historical dispatch data (e.g., utilization metrics from one or more previous time periods) and corresponding actual resulting value metrics as ground truth data to train a machine learning model to estimate the various value metrics from dispatch data received in a target time period (e.g., back propagation). Then, the provider-dispatch-control system 106 can utilize the machine learning model to determine estimated prioritized-value metrics, estimated basic-value metrics, and/or estimated counterfactual-value metrics by inputting dispatch data received for a target time period. Indeed, the provider-dispatch-control system 106 can utilize machine learning models such as, but not limited to, a machine learning model that applies a stochastic gradient descent, linear regression models, random forest regression models, or long short-term memory (LSTM) based recurrent neural networks), convolutional neural network models, Sequential Monte Carlo ("SMC") methods, Monte Carlo simulations, such as Markov chain Monte Carlo ("MCMC") or Hidden Markov Models ("HMI").

As further shown in FIG. 4A, the provider-dispatch-control system 106 can determine a range of prioritized-dispatch-mode slots 438 (from FIG. 4B) based on the threshold-noticeable-value difference 422. In particular, as shown in FIG. 4A, the provider-dispatch-control system 106 can determine the range of slots 438 (from FIG. 4B) for provider devices operating in the prioritized-dispatch mode based on the threshold-noticeable-value difference 422, the determined estimated-prioritized-value metric (from the act 410), and the determined estimated-counterfactual-value metric (from the act 416). More specifically, the provider-dispatch-control system 106 determines a value-metric difference between the estimated prioritized value metric (from the act 410) and the estimated counterfactual-value metric (from the act 416) and compares the value-metric difference to the threshold-noticeable-value difference 422 to determine the range of slots 438 (from FIG. 4B).

As previously mentioned, to determine the range of slots 438 (from FIG. 4B), the provider-dispatch-control system 106 can identify a predicted number of prioritized-dispatch-provider devices 412 that results in value-metric differences (from the estimated prioritized-value metric of the act 410 and the estimated counterfactual-value metric of the act 416) that satisfies the threshold-noticeable-value difference 422. For example, the provider-dispatch-control system 106 can adjust the (predicted) number of prioritized-dispatch-provider devices 412 until the value-metric difference between the re-estimated-prioritized-value metric (based on the adjusted number of prioritized-dispatch-provider devices 412) and the estimated-counterfactual-value metric satisfies the threshold-noticeable-value difference 422. Finally, the provider-dispatch-control system 106 can utilize the number of prioritized-dispatch-provider devices 412 that result in estimated value-metric difference that satisfy the threshold-noticeable-value difference 422 to determine a range of prioritized-dispatch-mode slots 438 (e.g., as shown in FIG. 4B).

To illustrate, in terms of notation from variables from the functions (13) and (15) above, the provider-dispatch-control system 106 can identify a predicted number of prioritized-dispatch-provider devices that still preserves a threshold-noticeable-value difference (e.g., a threshold-noticeable-value difference as described above). In particular, the provider-dispatch-control system 106 can determine a value-metric difference between an estimated prioritized-value metric ($w_\pi$) from function (13) and an estimated counter-factual-value metric ($\overline{w}$) from function (15) for a given number of prioritized-dispatch-provider devices ($N_\pi$). Then, to determine a maximum limit of provider-device slots $\delta_w$ for a range of prioritized-dispatch-mode slots, the provider-dispatch-control system 106 can identify the largest (supremum) number of prioritized-dispatch-provider devices ($N_\pi$) that results in a value-metric difference that preserves a threshold-noticeable-value difference $\underline{\Delta w}$ using the following function:

$$\delta_w = sup\{N_\pi \in [0, N] : w_\pi - \overline{w} > \underline{\Delta w}\} \quad (16)$$

Indeed, the provider-dispatch-control system 106 can utilize the maximum limit of slots $\delta_w$ to define (or create) an upper bound for the range of prioritized-dispatch-mode slots (e.g., the range of slots 438 from FIG. 4B).

In reference to FIG. 4B, the provider-dispatch-control system 106 can utilize the maximum limit of slots $\delta_w$ (from function (16)) to determine the range of slots for provider devices operating in the prioritized-dispatch mode 438. In particular, the provider-dispatch-control system 106 can utilize the determined maximum limit of slots (as described above) to define (or create) an upper bound for the range of prioritized-dispatch-mode slots 438. As also shown in FIG. 4B, the provider-dispatch-control system 106 can determine the range of slots 438 to indicate a number of prioritized-dispatch-provider devices that can operate in a prioritized-dispatch mode within a target time period and in a geographic area.

As further illustrated in in FIG. 4B, the provider-dispatch-control system 106 can also determine a variety of other limits within the range of prioritized-dispatch-mode slots 438. In one or more embodiments, the provider-dispatch-control system 106 can utilize a variety of limits within the range of prioritized-dispatch-mode slots 438 to implement varying rules for inviting, limiting, and/or prohibiting access to a prioritized-dispatch mode via prioritized-mode-availability indicators. In certain instances, the provider-dispatch-control system 106 utilizes a variety of limits to define an amount of prioritized-dispatch provider devices that result in a given effect on an estimated value-metrics difference between prioritized-dispatch-provider devices and basic-dispatch-provider devices (e.g., a difference in revenue received for a prioritized-dispatch-provider device over a basic-dispatch-provider device).

For instance, in reference to FIG. 4B, the provider-dispatch-control system 106 can identify the maximum limit in the range of slots 438 as the number of prioritized-dispatch-provider devices at which to prohibit additional provider devices from entering the prioritized-dispatch mode. Moreover, as shown in FIG. 4B, the provider-dispatch-control system 106 can identify an upper-target limit in the range of slots 438 as the number of prioritized-dispatch-provider devices at which to send provider-device indications to not enter the prioritized-dispatch mode during the target time period. In addition, as illustrated in FIG. 4B, the provider-dispatch-control system 106 can identify a lower-target limit in the range of slots 438 as the number of prioritized-dispatch-provider devices at which to send provider-device indications to enter the prioritized-dispatch mode during the target time period. This disclosure describes transmitting prioritized-mode-availability indicators based on these limits of the range of prioritized-dispatch-mode slots further below (e.g., in relation to FIG. 6).

Furthermore, the provider-dispatch-control system 106 can utilize a variety of approaches to define limits within a range of prioritized-dispatch-mode slots. For instance, the provider-dispatch-control system 106 can utilize a user configured deviation (e.g., based on a division, percentage) to define limits within a range of prioritized-dispatch-mode slots. For instance, the provider-dispatch-control system 106 can identify a user configured deviation that specifies to set limits at a threshold division value (e.g., into three parts). Then, the provider-dispatch-control system 106 can set the lower-target limit in a first division (e.g., the left most partition) and can set the upper-target limit in a second division (e.g., the middle partition) relative to a determined maximum limit of slots.

As an example of determining such limits, if the maximum limit of slots represents 90 prioritized-dispatch-provider devices, the provider-dispatch-control system 106 can set the lower-target limit as 30 prioritized-dispatch-provider devices and the upper-target limit as 60 prioritized-dispatch-provider devices (when the identified user configured deviation specifies a division into thirds). In some instances, the provider-dispatch-control system 106 utilizes one or more standard deviations from a determined maximum limit of slots to identify the upper-target limit and the lower-target limit of the range of slots.

As indicated above, in some embodiments, the provider-dispatch-control system 106 can determine limits of the provider-dispatch-control system 106 based on the threshold-noticeable-value difference. As an example, the provider-dispatch-control system 106 can determine a lower-target limit for a range of prioritized-dispatch-mode slots by identifying the smallest (infimum) number of prioritized-dispatch-provider devices ($N_\pi$) that results in a value-metric difference (as described above) that still preserves a threshold-noticeable-value difference. Then, the provider-dispatch-control system 106 can utilize a mid-point between the determined lower-target limit and the determined maximum limit of slots as the upper-target limit.

As further illustrated in FIG. 4A, in certain implementations, the provider-dispatch-control system 106 utilizes the provider-device-metrics maximization approach (in the act 424) to determine the range of prioritized-dispatch-mode slots 440 (from FIG. 4B). In particular, the provider-dispatch-control system 106 can identify a number of prioritized-dispatch-provider devices to introduce in a target time period (within a geographic area) that maximizes a transportation-mode-surplus value. For instance, as shown in FIG. 4A, the provider-dispatch-control system 106 can utilize a number of prioritized-dispatch-provider devices 426, an estimated-prioritized-value metric 428, and an estimated-counterfactual-value metric 430 within objective function 432 to determine a maximum-transportation-mode-surplus value 434 and a corresponding number of prioritized-dispatch-provider devices 436. Then, as illustrated in FIGS. 4A and 4B, the provider-dispatch-control system 106 can utilize the number of prioritized-dispatch-provider devices 436 (as a maximum slot limit) to determine the range of prioritized-dispatch-mode slots 440.

In one or more embodiments, as used herein, the term "transportation-mode-surplus value" (referred to as a "transportation-mode-value improvement metric" in Martin) refers to a benefit, advantage, profit, or value associated with dispatching a provider device associated with a particular dispatch mode over another dispatch mode. In particular, the term "transportation-mode-surplus value" can refer to a relative difference in value or benefit (e.g., a value metric or utilization metric) associated with dispatching a prioritized-dispatch-provider device associated with a prioritized-dispatch mode and a basic-dispatch-provider device associated with the basic-dispatch mode. For example, the transportation-mode-surplus value can reflect a difference in value resulting from dispatching a prioritized-dispatch-provider device from the prioritized-dispatch mode (having a prioritized-dispatch-mode rate) in comparison to dispatching a basic-dispatch-provider device from the basic-dispatch mode (having a basic-dispatch-mode rate). Similarly, a transportation-mode-surplus value can reflect a difference in efficiency (e.g., the number of transportation requests one or more provider devices fulfill within an interval of time), provider device utilization metrics (e.g., active-transport-status times), or anticipated retention resulting from dispatching a prioritized-dispatch-provider device from the prioritized-dispatch mode.

Indeed, in some instances, the provider-dispatch-control system 106 utilizes a varying number of prioritized-dispatch-provider devices to determine and maximize an estimated transportation-mode-surplus value (e.g., via the objective function 432). To illustrate, the provider-dispatch-control system 106 can define a varying number of prioritized-dispatch-provider-devices $N_p$ as a function of both (i) a probability of prioritized-dispatch-provider device being able to join the prioritized-dispatch mode ($\alpha$) and (ii) a prioritized-value metric $w_p$ (e.g., historical average prioritized-value metric). In addition, the provider-dispatch-control system 106 can define a counterfactual-value metric $\overline{w}$ (e.g., historical average counterfactual-value metric), a total-value metric R (e.g., revenue) collected by the dynamic transportation matching system 104 (from the estimated value metrics), and a total-counterfactual-value metric $\overline{R}$ (e.g., counterfactual revenue) collected by the dynamic transportation matching system 104.

In the following paragraphs, this disclosure further explains the above-mentioned provider-device-metrics maximization approach shown in FIGS. 4A-4B in terms of various functions. As an overview of such functions, the provider-dispatch-control system 106 determines a transportation-mode-surplus value S defined in function (17) by determining, for a number of prioritized-dispatch-provider devices $N_p$, a prioritized-value metric $w_p$ (e.g., represented as $w_\pi(N_\pi)$ in function (21) below) and identifying a difference between the prioritized-value metric $w_p$ and a counterfactual-value metric $\overline{w}$ (e.g., represented as $\overline{w}(N)$ in function (21)). Then, the provider-dispatch-control system 106 identifies a number of prioritized-dispatch-provider devices $N_\pi$ (in function (21)) that maximizes the transportation-mode-surplus value S, as described in function (17).

Then, the provider-dispatch-control system 106 can utilize an objective function that identifies the number of prioritized-dispatch-provider devices $N_p$ that maximize the transportation-mode-surplus value S by using the following function:

$$S = E[N_p(\alpha)](w_p(\alpha) - \overline{w}) + R(\alpha) - \overline{R} \quad (17)$$

In some instances, the provider-dispatch-control system 106 utilizes the number of prioritized-dispatch-provider devices $N_p$ that maximize the transportation-mode-surplus value S as a maximum slot limit for a range of slots for provider devices operating in a prioritized-dispatch mode. In addition, in one or more embodiments, the provider-dispatch-control system 106 can determine a relative transportation-mode-surplus value by dividing the total-counterfactual-value metric $\overline{R}$ by the transportation-mode-surplus value for a varying number of prioritized-dispatch-provider devices to represent the relative transportation-mode-surplus value as a function of the varying number of prioritized-dispatch-provider devices. In some instances, the provider-dispatch-control system 106 utilizes the relative transportation-mode-surplus values with the varying number of prioritized-dispatch-provider devices to determine limits for the range of prioritized-dispatch-mode slots (e.g., the lower-target limit, the upper-target limit).

In some instances, the provider-dispatch-control system 106 utilizes a cannibalization factor with the provider-device-metrics maximization approach (of the act 424 in FIG. 4A) to determine a range of prioritized-dispatch-mode slots. More specifically, the provider-dispatch-control system 106 can utilize an objective function that accounts for a cannibalization factor to identify a number of prioritized-dispatch-provider devices to introduce in a target time period (within a geographic area) that maximizes a transportation-mode-surplus value (for the range of prioritized-dispatch-mode slots). In one or more embodiments, the provider-dispatch-control system 106 utilizes a cannibalization factor that reflects a probability of a provider device operating in the prioritized-dispatch mode being selected for a transportation request over a provider device operating in the basic-dispatch mode (as described above).

For instance, the provider-dispatch-control system 106 can identify current (e.g., from monitored activity in the target time period) utilization metrics for prioritized-dispatch-provider devices operating in a prioritized-dispatch mode and basic-dispatch-provider devices operating in a basic-dispatch mode. Then, the provider-dispatch-control system 106 can identify a maximized transportation-mode-surplus value (in terms of a difference between the amount of time prioritized-dispatch-provider devices will be in an active-transport-status time in comparison to the amount of time the provider devices would have been in an active-transport-status time in a counterfactual scenario). Indeed, the provider-dispatch-control system 106 can utilize total utilization metrics of both the prioritized-dispatch-provider devices and the basic-dispatch-provider devices as if the provider devices were operating in a basic-dispatch mode for the counterfactual scenario.

To illustrate, the provider-dispatch-control system 106 can define a cannibalization factor c and utilization metrics of operating prioritized-dispatch-provider devices as $P1_\pi$, $P2_\pi$, and $P3_\pi$. In addition, the provider-dispatch-control system 106 can define utilization metrics in a counterfactual scenario as $P1_{cf}, P2_{cf}$, and $P3_{cf}$. Then, for a varying (additional) number of prioritized-dispatch-provider devices d, to identify a number of prioritized-dispatch-provider devices to introduce in a target time period (within a geographic area) that maximizes a transportation-mode-surplus value, the provider-dispatch-control system 106 can utilize the following function:

$$Max\left[(P1 + P2 + P3)_\pi * \frac{(P3_\pi + d*c)}{(P1_\pi + d) + (P2_\pi + d*c) + (P3_\pi + d*c)} - \frac{P3_{cf}}{P1_{cf} + P2_{cf} + P3_{cf}}\right] \quad (18)$$

Then, the provider-dispatch-control system 106 can utilize the identified number of prioritized-dispatch-provider devices that maximize the above-mentioned function as a maximum limit of slots within a range of prioritized-dispatch-mode slots.

As an example of the provider-device-metrics maximization approach described above, the provider-dispatch-control system 106 can identify that 5 prioritized-dispatch-provider devices are in an idle status, 5 prioritized-dispatch-provider devices are in an in-transit-to-pickup status, and 10 prioritized-dispatch-provider devices are in an active-transport status (resulting in 50% of the prioritized-dispatch-provider devices being in an active-transport status). Furthermore, the provider-dispatch-control system 106 can identify that 10 basic-dispatch-provider devices are in an idle status, 5 basic-dispatch-provider devices are in an in-transit-to-pickup status, and 5 basic-dispatch-provider devices are in an active-transport status (resulting in 25% of the basic-dispatch-provider devices being in an active-transport status). Then, the provider-dispatch-control system 106 can determine that, in a counterfactual scenario, the average active-transport status utilization would be 37.5% (e.g., 15 total provider devices in an active-transport status over 40 total provider devices). In certain instances, the provider-dispatch-control system 106 can utilize such information to determine that a transportation-mode-surplus value of 12.5% of active-transport status utilization exists (between the prioritized-dispatch-mode and the counterfactual scenario). Furthermore, the provider-dispatch-control system 106 can utilize the 12.5% of active-transport status utilization with a prioritized-dispatch-mode rate and the total number of identified prioritized-dispatch-provider devices (above) to determine the transportation-mode-surplus value in terms of value metrics (as defined by function (19)).

Continuing the example above, the provider-dispatch-control system 106 can define a cannibalization factor as $$\frac{20}{40+d}$$

in which 20 is the total number of basic-dispatch-provider devices and 40 is the total number of provider devices (from the above-mentioned example). Then, the provider-dispatch-control system 106 can identify an optimal number of prioritized-dispatch-provider devices d to add for a maximized transportation-mode-surplus value by solving the function:

$$Max\left[(20+d)*40*\left(\frac{10+\frac{20}{40+d}*d}{20+d-2*\frac{20}{40+d}*d}-\frac{15}{40}\right)\right] \quad (19)$$

Subsequently, the provider-dispatch-control system 106 can utilize the identified number of prioritized-dispatch-provider devices that maximize the above-mentioned function as a maximum limit of slots within a range of prioritized-dispatch-mode slots.

As indicated above, in one or more embodiments, the provider-dispatch-control system 106 further utilizes estimated value metrics in the provider-device-metrics maximization approach (of the act 424 in FIG. 4A) to determine a range of prioritized-dispatch-mode slots. In particular, the provider-dispatch-control system 106 can determine estimated prioritized-value metrics for a number of prioritized-dispatch-provider devices and can determine estimated counterfactual-value metrics as described above (e.g., in relation to the threshold-noticeable-value difference preservation approach). Then, the provider-dispatch-control system 106 can identify a number of prioritized-dispatch-provider devices (for the range of slots) that maximizes a transportation-mode-surplus value (as a difference between the estimated prioritized-value metrics and the estimated counterfactual-value metrics).

To illustrate, the provider-dispatch-control system 106 can define a number of prioritized-dispatch-provider devices as $N_\pi$ and a total number of provider devices as the sum of $N_\pi$ and basic-dispatch-provider devices $N_\phi$. Then, the provider-dispatch-control system 106 can characterize the estimated prioritized-value metrics $w_\pi$ and the counterfactual-value metrics $\overline{w}(N)$ as a function of a distribution function $g_\theta$ (e.g., a learned distribution function) for a varying number of provider devices such that:

$$w_\pi(N) \sim g_\theta(\mu, N_\pi) \text{ and } \overline{w}(N) \sim g_\phi(\mu, N) \quad (20)$$

Then, to identify a number of prioritized-dispatch-provider devices $N_\pi$ to introduce in a target time period (within a geographic area) that maximizes a transportation-mode-surplus value (as described in function (17)), the provider-dispatch-control system 106 can utilize the following function:

$$\underset{N_\pi}{\text{maximize}} N_\pi(w_\pi(N_\pi) - \overline{w}(N)), \text{ subject to } N_\pi \leq N \quad (21)$$

In addition to determining a number of prioritized-dispatch-provider devices for maximization, the provider-dispatch-control system 106 can also utilize an expected transportation-mode-surplus value (from function (22) below) in place of an objective function to maximize the transportation-mode-surplus value to determine a variety of limits within a range of prioritized-dispatch-mode slots. For instance, the provider-dispatch-control system 106 can identify a maximum achievable transportation-mode-surplus value (as described below). Then, the provider-dispatch-control system 106 can determine a lower-target limit and an upper-target limit (in the functions (23)) by utilizing the maximum achievable transportation-mode-surplus value with an expected transportation-mode-surplus value (from the function 20).

In some embodiments, the provider-dispatch-control system 106 identifies a maximum achievable transportation-mode-surplus value by analyzing historical data (e.g., the highest achieved transportation-mode-surplus value achieved from various transportation-mode-surplus values observed in historical data). In particular, the provider-dispatch-control system 106 can identify historical data (as described above) for provider devices corresponding to a prioritized-dispatch mode and/or a basic-dispatch mode. Then, the provider-dispatch-control system 106 can determine transportation-mode-surplus values from the historical data and analyze these historical transportation-mode-surplus values to identify a maximum achievable transportation-mode-surplus value.

Moreover, the provider-dispatch-control system 106 can also determine an expected transportation-mode-surplus value data (e.g., the statistically expected transportation-mode-surplus value from evaluating various transportation-mode-surplus values observed in historical data). For instance, the provider-dispatch-control system 106 can utilize historical data to identify conditions that are similar to a target time period (in a geographic area). Then, the provider-dispatch-control system 106 can analyze the historical data corresponding to the similar conditions to determine a behavior of provider devices corresponding to a prioritized-dispatch mode and/or a basic-dispatch mode within the historical time periods. Utilizing the analysis of the historical data, the provider-dispatch-control system 106 can determine an expected transportation-mode-surplus value for a target time period (and based on a selected number of prioritized-dispatch-provider devices in the target time period). To illustrate, in some instances, the provider-dispatch-control system 106 can determine an expected transportation-mode-surplus value $\hat{S}$ for a number of prioritized-dispatch-provider devices N using expected prioritized-value metrics $w_\pi$ and expected counterfactual-value metrics $\overline{w}$ in accordance with the following function:

$$\hat{S}(N_\pi) = E[N_\pi(w_\pi(N_\pi) - \overline{w}(N))] \quad (22)$$

Then, the provider-dispatch-control system 106 can utilize the expected transportation-mode-surplus value $\hat{S}$ and the maximum achievable transportation-mode-surplus value $\hat{S}^*$ to determine a lower-target limit and an upper-target limit for a range of prioritized-dispatch-mode slots. For instance, the provider-dispatch-control system 106 can determine a minimum desired capture of the maximum achievable transportation-mode-surplus value $\hat{S}^*$ as $\omega$. Subsequently, the provider-dispatch-control system 106 can determine a lower-target limit $\delta_{lb}$ (based on an infimum) and an upper-target limit $\delta_{ub}$ (based on a supremum) for a range of prioritized-dispatch-mode slots in accordance with the following functions:

$$\delta_{lb} = inf\left\{N_\pi \in [0, N] : \frac{\hat{S}(N_\pi)}{\hat{S}^*} \geq \omega\right\} \text{ and } \delta_{lb} = \quad (23)$$

$$sup\left\{N_\pi \in [0, N] : \frac{\hat{S}(N_\pi)}{\hat{S}^*} \geq \omega\right\}$$

As further indicated by FIG. 4B, in one or more embodiments, the provider-dispatch-control system 106 can utilize a maximum limit, a lower-target limit, and an upper-target limit (as described above) to determine one or more regions within a range of prioritized-dispatch-mode slots. For instance, the provider-dispatch-control system 106 can define a region in which to indicate to enter a prioritized-dispatch mode, a target region in which to take no action, a region in which to indicate to not enter the prioritized-dispatch mode, and a region in which to prohibit entrance into the prioritized-dispatch mode within a range of prioritized-dispatch-mode slots. Indeed, in one or more embodiments, the provider-dispatch-control system 106 utilizes these regions to determine a range of prioritized-dispatch-mode slots and the varying actions to take depending on the range of prioritized-dispatch-mode slots in comparison to a current prioritized-dispatch-provider device population in a target time period at a geographic area.

For example, the provider-dispatch-control system 106 can define a region of slots (e.g., as shown in FIG. 4B) in which to transmit a prioritized-mode-availability indicator indicating to enter the prioritized-dispatch mode as the region that approaches (or satisfies) a lower-target limit $\delta_{lb}$ (e.g., a region of slots $[0, \delta_{lb}]$). In addition, the provider-dispatch-control system 106 can define a target region of slots in which to take no action as the region between the lower-target limit and the upper-target limit $\delta_{ub}$ (or a maximum limit $\delta_w$) (e.g., a region of slots $[\delta_{ub}, \min(\delta_{ub}, \delta_w)]$).

Furthermore, the provider-dispatch-control system 106 can define a region of slots in which to transmit a prioritized-mode-availability indicator indicating to not enter the prioritized-dispatch mode as the region that exceeds (or satisfies) an upper-target limit $\delta_{ub}$ (e.g., a region of slots $[\min (\delta_{ub}, \delta_w), \max (\delta_{ub}, \delta_w)]$). Finally, the provider-dispatch-control system 106 can define a region of slots in which transmit a prioritized-mode-availability indicator to deactivate or prohibit entrance into the prioritized-dispatch mode as the region that exceeds (or satisfies) a maximum limit $\delta_w$ (or upper-target limit $\delta_{ub}$) and is bound by a total number of provider devices N (e.g., $[\max(\delta_{ub}, \delta_w), N]$).

In one or more additional embodiments, the provider-dispatch-control system 106 can determine a range of prioritized-dispatch-mode slots by utilizing a theoretical-queuing model approach. In particular, the provider-dispatch-control system 106 can model the queuing behavior of provider devices within a geographic area while utilizing a prioritized-dispatch mode and a basic-dispatch mode. More specifically, the provider-dispatch-control system 106 can model the queuing behavior of prioritized-dispatch-provider devices and basic-dispatch-provider devices to determine a transportation-mode-surplus value between a prioritized-dispatch mode and a basic-dispatch mode. For instance, the provider-dispatch-control system 106 can utilize a varying number of prioritized-dispatch-provider devices to identify a number of prioritized-dispatch-provider devices that maximizes the transportation-mode-surplus value within the queuing model. Then, the provider-dispatch-control system 106 can utilize the identified number of prioritized-dispatch-provider devices to determine a range of prioritized-dispatch-mode slots (e.g., as a maximum limit of slots).

Figure 5:
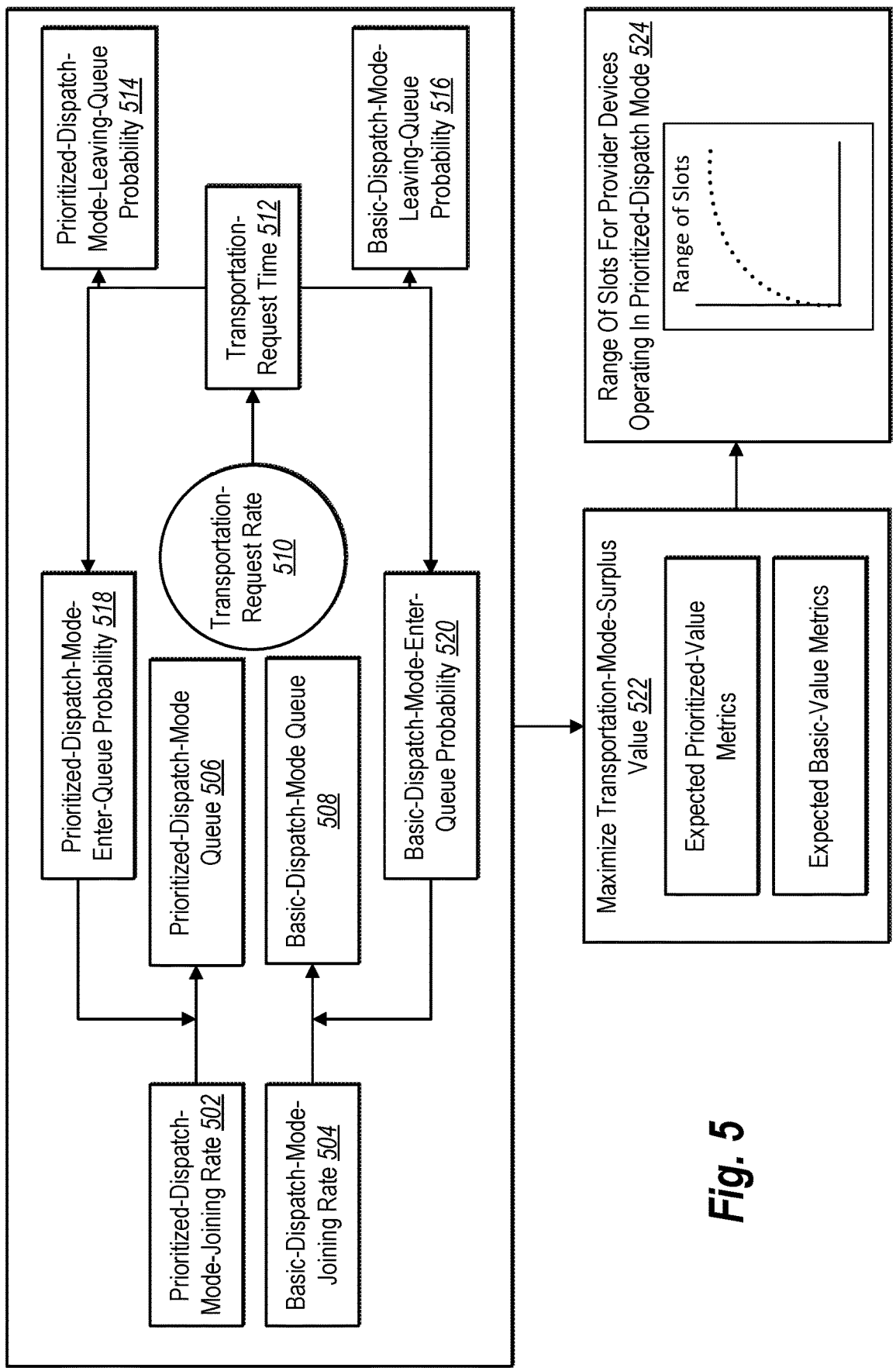
FIG. 5 illustrates a diagram of a provider-dispatch-control system determining a range of prioritized-dispatch-mode slots utilizing a theoretical-queuing model approach in accordance with one or more embodiments.

As an example, FIG. 5 illustrates the provider-dispatch-control system 106 determining a range of prioritized-dispatch-mode slots by utilizing a theoretical-queuing model approach. As shown in FIG. 5, the provider-dispatch-control system 106 determines a prioritized-dispatch-mode-joining rate 502 indicating a rate at which provider devices join within a prioritized-dispatch mode. Furthermore, the provider-dispatch-control system 106 determines a basic-dispatch-mode-joining rate 504 indicating a rate at which provider devices join within a basic-dispatch mode.

In order to determine the prioritized-dispatch-mode-joining rate 502 and the basic-dispatch-mode-joining rate 504, the provider-dispatch-control system 106 utilizes an admission rate, a distribution of value metrics corresponding to the dispatch modes, and a provider-device-activity rate. For instance, the provider-dispatch-control system 106 can determine an admission rate that indicates the number of provider devices that attempt to join the prioritized-dispatch mode over the number of provider devices that will be able to join the prioritized-dispatch mode. In some instance, the provider-dispatch-control system 106 can set the admission rate based on user configuration (or historical data for the prioritized-dispatch mode).

Furthermore, the provider-dispatch-control system 106 can utilize expected prioritized-value metrics (e.g., total, hourly, minutely value metrics) and basic-value metrics to determine the admission rate. To illustrate, the provider-dispatch-control system 106 can determine that the expected prioritized-value metric is greater than the expected basic-value metrics during a target time period and, as a result, can predict a request to join the prioritized-dispatch mode. Then, the provider-dispatch-control system 106 can decide to admit or reject the request to join the prioritized-dispatch mode. The provider-dispatch-control system 106 can determine an admission rate based on a comparison of the number of admitted requests and the number of rejected requests.

In addition, the provider-dispatch-control system 106 can determine a provider-device-activity rate as a rate at which provider devices access a dynamic-transportation-matching application (e.g., to join a dispatch mode). For instance, the provider-dispatch-control system 106 can identify, during a target time period, activity from provider devices with the dynamic-transportation-matching application. Moreover, the provider-dispatch-control system 106 can determine whether a provider device is interacting with the dynamic-transportation-matching application to join a prioritized-dispatch mode and utilize the determination to identify a provider-device-activity rate.

As explained in the following paragraphs, the provider-dispatch-control system 106 can identify a number of prioritized-dispatch-provider devices $N_\pi$ that maximize transportation-mode-surplus value Sin function (35) for the range of prioritized-dispatch-mode slots using a theoretical-queuing model approach, as further defined in the functions (24)-(35) below. More specifically, the provider-dispatch-control system 106 can determine a prioritized-dispatch-mode-joining rate and a basic-dispatch-mode-joining rate $\lambda_{\phi,in}$ (for a queue) as defined by functions (24)-(25). Moreover, the provider-dispatch-control system 106 can also determine an expected prioritized-value metric $w_\pi$ as defined by functions (26)-(29). Similarly, the provider-dispatch-control system 106 can determine an expected basic-value metric $w_\phi$ as defined by functions (26) and (30)-(32). In some cases, the provider-dispatch-control system 106 utilizes an expected basic-value metric $w_\phi$ (as defined by function (32)) when an admission rate $\alpha=0$ to determine an expected counterfactual-value metric $\overline{w}$. Subsequently, the provider-dispatch-control system 106 utilizes the expected prioritized-value metric $w_\pi$, the expected counterfactual-value metric $\overline{w}$ with a total-value metric R and the total-counterfactual-value metric $\overline{R}$ (as defined by function (34)) to determine a transportation-mode-surplus value S as defined by function (35). Finally, the provider-dispatch-control system 106 can identify a number of prioritized-dispatch-provider devices $N_\pi$ that maximize transportation-mode-surplus value S (in function (35)) for the range of prioritized-dispatch-mode slots.

As just mentioned, the provider-dispatch-control system 106 can determine a prioritized-dispatch-mode-joining rate 502 by utilizing the queueing model (as shown in FIG. 5). For instance, the provider-dispatch-control system 106 can determine the prioritized-dispatch-mode-joining rate $\lambda_{\pi,in}$ based on an admission rate $\alpha$ (as described above), a provider-device-activity rate $\Lambda_0$ (as described above), and a distribution $F^d$ of prioritized-value metrics $w_\pi$ by using the following function:

$$\lambda_{\pi,in} = \alpha \Lambda_0 F^d(w_\pi) \qquad (24)$$

In addition to determining the prioritized-dispatch-mode-joining rate 502, as shown in FIG. 5, the provider-dispatch-control system 106 can also determine a basic-dispatch-mode-joining rate 504 by utilizing the queueing model. For example, the provider-dispatch-control system 106 can determine the basic-dispatch-mode-joining rate $\Lambda_{\phi,in}$ based on an admission rate $\alpha$, a provider-device-activity rate $\Lambda_0$, and a distribution $F^d$ of basic-value metrics $w_\phi$ by using the following function:

$$\iota_{\phi,in} = (1-\alpha)\Lambda_0 F^d(w_\phi) \qquad (25)$$

As further indicated by FIG. 5, the provider-dispatch-control system 106 can utilize a transportation-request rate 510 to determine a rate at which a transportation request is received during a target time period of a geographic area. For instance, to determine the transportation-request rate 510, the provider-dispatch-control system 106 can determine a requester device activity rate ($M_0$) indicating a rate at which requester devices access the dynamic-transportation-matching application to request a transportation request. Furthermore, the provider-dispatch-control system 106 can determine a distribution $F^p$ of transportation request values p (e.g., a price or cost). Subsequently, the provider-dispatch-control system 106 can determine the transportation-request rate $\mu$ using the following function:

$$\mu = M_0 F^p(p) \qquad (26)$$

In order to determine expected prioritized-value metrics $w_\pi$ and to determine expected basic-value metrics $w_\phi$ from functions (24)-(26) above, the provider-dispatch-control system 106 can utilize the queuing model illustrated in FIG. 5. For instance, as shown in FIG. 5, the provider-dispatch-control system 106 can identify prioritized-dispatch-provider devices within a prioritized-dispatch-mode queue 506 and can identify basic-dispatch-provider devices within a basic-dispatch-mode queue 508 waiting to be dispatched for a transportation request. In one or more embodiments, the provider-dispatch-control system 106 prioritizes provider devices from the prioritized-dispatch-mode queue 506 over the basic-dispatch-mode queue 508 for a transportation request. As an example, upon selecting a provider device from the prioritized-dispatch-mode queue 506 or the basic-dispatch-mode queue 508 for a received transportation request, a vehicle corresponding to the provider device travels for a transportation-request time 512 (e.g., a time T) and either rejoins the queue or leaves the queue.

For example, when a prioritized-dispatch-provider device is selected, the provider-dispatch-control system 106 identifies whether the prioritized-dispatch-provider device rejoins the queue or leaves the queue by utilizing a prioritized-dispatch-mode-leaving-queue probability 514 and a prioritized-dispatch-mode-enter-queue probability 518. Likewise, when a basic-dispatch-provider device is selected, the provider-dispatch-control system 106 identifies whether the basic-dispatch-provider device rejoins the queue or leaves the queue by utilizing a basic-dispatch-mode-leaving-queue probability 516 and a basic-dispatch-mode-enter-queue probability 520. As explained below, the provider-dispatch-control system 106 can utilize these probabilities of the queueing model to determine estimated prioritized-value metrics $w_\pi$ and to determine estimated basic-value metrics $w_\phi$.

For example, the provider-dispatch-control system 106 can characterize a received value metric for provider device $\eta$ based on a transportation request value p and a value-share rate of the dynamic transportation matching system 104 $\gamma$ in accordance with the following function: $\eta=(1-\gamma)p$. For each transportation request, the provider-dispatch-control system 106 can utilize the transportation-request time 512 ($\tau$) which corresponds to an active-transport-status time (P3 time) and an idle-status time (P1 time) to determine the expected prioritized-value metrics in the queuing model. To determine the idle-status time of a prioritized-dispatch-provider device, the provider-dispatch-control system 106 models an M/M/1 queuing model for the prioritized-dispatch-provider device in which the idle-status time t, is based on the transportation-request rate 510 ($\mu$) and a rate at which prioritized-dispatch-provider devices arrive into the prioritized-dispatch-mode queue 506 ($\lambda_\pi$) (as described below in function (28) by using the following function:

$$l_\pi = \frac{1}{\mu - \lambda_\pi} \qquad (27)$$

In some embodiments, the provider-dispatch-control system 106 determines the rate at which prioritized-dispatch-provider devices arrive into the prioritized-dispatch-mode queue 506 ($\lambda_\pi$) based on the prioritized-dispatch-mode-joining rate 502 ($\lambda_{\pi,in}$) from the function (24) and the prioritized-dispatch-mode-leaving-queue probability 514 ($\lambda_\pi q_{out}$) by using the following function:

$$\lambda_\pi = \frac{\lambda_{\pi,in}}{\lambda_\pi q_{out}} \qquad (28)$$

Furthermore, the provider-dispatch-control system 106 can determine a prioritized-dispatch-mode-enter-queue probability 518 in accordance with the following function: $\lambda_\pi(1-q_{out})$. Then, the provider-dispatch-control system 106 can utilize the above-mentioned received value metric for a provider device η, prioritized-dispatch-provider device idle time $t_\pi$ (from the function (27)) that is based on function (28), and the transportation-request time 512 (τ) to determine an expected prioritized-value metric $w_\pi$ by using the following function:

$$w_\pi = \frac{\eta}{l_\pi + \tau} \qquad (29)$$

Furthermore, the provider-dispatch-control system 106 can determine expected basic-value metrics $w_\phi$ based on a rate at which prioritized-dispatch-provider devices arrive into the prioritized-dispatch-mode queue 506 ($\lambda_\pi$) and a rate at which basic-dispatch-provider devices arrive into the basic-dispatch-mode queue 508 ($\lambda_\phi$). For example, the provider-dispatch-control system 106 can determine the rate at which basic-dispatch-provider devices arrive into the basic-dispatch-mode queue 508 ($\lambda_\phi$) based on a basic-dispatch-mode-leaving-queue probability 516 (e.g., $\lambda_\phi q_{out}$), a basic-dispatch-mode-enter-queue probability 520 (e.g., $\lambda_\phi(1-q_{out})$), and the basic-dispatch-mode-joining rate 504 (e.g., $\lambda_{\phi,in}$) from the function (25). In particular, the provider-dispatch-control system 106 can determine the rate at which basic-dispatch-provider devices arrive into the basic-dispatch-mode queue 508 ($\lambda_\phi$) in accordance with the following function:

$$\lambda_\phi = \frac{\lambda_{\phi,in}}{\lambda_\phi q_{out}} \qquad (30)$$

Then, using the rate at which prioritized-dispatch-provider devices arrive into the prioritized-dispatch-mode queue 506 ($\lambda_\pi$) from the function (28), the rate at which basic-dispatch-provider devices arrive into the basic-dispatch-mode queue 508 ($\lambda_\phi$) from function (30), and the transportation-request rate 510 (μ), the provider-dispatch-control system 106 can determine an idle time ($t_\phi$) of a basic-dispatch-provider device by using the following function:

$$l_\phi = \frac{1}{\mu\left(1 - \frac{\lambda_\phi}{\mu}\right)\left(1 - \frac{\lambda_\phi}{\mu} - \frac{\lambda_\pi}{\mu}\right)} \qquad (31)$$

Moreover, the provider-dispatch-control system 106 can utilize the above-mentioned received value metric for provider devices η, idle time $t_\phi$ (from function (31)), and the transportation-request time 512 (τ) to determine an expected basic-value metric $w_\phi$ by using the following function:

$$w_\phi = \frac{\eta}{l_\phi + \tau} \qquad (32)$$

In some instances, in reference to FIG. 5 (e.g., for the prioritized-dispatch-mode-joining rate 502 and the basic-dispatch-mode-joining rate 504), the provider-dispatch-control system 106 utilizes the expected basic-value metric $w_\phi$ in function (32) to determine an expected counterfactual-value metric w (as described below) when the admission rate α=0 for the prioritized-dispatch-mode-joining rate $\lambda_{\pi,in}$ (in function (24)) and the basic-dispatch-mode-joining rate $\lambda_{\phi,in}$ (in function (25)).

As further shown in FIG. 5, the provider-dispatch-control system 106 can utilize the expected prioritized-value metric $w_\pi$ and the expected basic-value metric $w_\phi$ functions of the queuing model with a varying number of prioritized-dispatch-provider devices to maximize a transportation-mode-surplus value in an act 522. More specifically, the provider-dispatch-control system 106 can determine a number of prioritized-dispatch-provider devices $N_\pi$ based on the rate at which prioritized-dispatch-provider devices arrive into the prioritized-dispatch-mode queue 506 ($\lambda_\pi$) (from the function (28)), prioritized-dispatch-provide device idle time $t_\pi$ (from the function (27)), and the transportation-request time 512 (τ) by using the following function:

$$N_\pi = \lambda_\pi(t_\pi + \tau) \qquad (33)$$

Furthermore, the provider-dispatch-control system 106 can also utilize a total-value metric R and a counterfactual-value metric $\overline{R}$ to define a transportation-mode-surplus value (as shown below in function (35)). For instance, the provider-dispatch-control system 106 can determine a total-value metric R (e.g., revenue) collected by the dynamic transportation matching system 104 (from the rates at which the provider devices arrive into dispatch modes $\lambda_\pi$ and $\lambda_\phi$), and a total-counterfactual-value metric $\overline{R}$ (e.g., counterfactual revenue). For instance, the provider-dispatch-control system 106 can determine the total-value metric R based on the rates $\lambda_\pi$ and $\lambda_\phi$ (from the functions (28) and (30)), the above-mentioned transportation request value p, and the above-mentioned value-share rate of the dynamic transportation matching system 104 γ by using the following function:

$$R = \gamma(\lambda_\pi + \lambda_\phi)p \qquad (34)$$

Moreover, the provider-dispatch-control system 106 can determine the total-counterfactual-value metric $\overline{R}$ by utilizing the rates at which the provider devices arrive into dispatch modes $\lambda_\pi$ and $\lambda_\phi$ when an admission rate α=0. For instance, the provider-dispatch-control system 106 can utilize an admission rate α=0 when no provider devices are admitted into the prioritized-dispatch mode such that the prioritized-dispatch-mode-joining rate 502 is 0. Likewise, the provider-dispatch-control system 106 can also utilize an admission rate $\alpha=0$ to determine an expected counterfactual-value metric $\overline{w}$. For instance, the provider-dispatch-control system 106 can determine the expected basic-value metric $w_\phi$ (using the function (32)) when the admission rate $\alpha=0$ as the expected counterfactual-value metric $\overline{w}$.

Subsequently, the provider-dispatch-control system 106 can utilize the varying number of prioritized-dispatch-provider devices $N_\pi$, the expected prioritized-value metric $w_\pi$ (from function (29)), the expected counterfactual-value metric $\overline{w}$, the total-value metric R (from function (34)), and the counterfactual-value metric $\overline{R}$ described above to define a transportation-mode-surplus value. More specifically, the provider-dispatch-control system 106 can define the transportation-mode-surplus value S under the queuing model illustrated in FIG. 5 by using the following function:

$$S=N_\pi(w_\pi-\overline{w})+R+\overline{R} \quad (35)$$

In accordance with one or more embodiments, the provider-dispatch-control system 106 utilizes an objective function that identifies a number of prioritized-dispatch-provider devices $N_\pi$ that maximizes the transportation-mode-surplus value S (e.g., in the act 522 of FIG. 5).

In some instances, the provider-dispatch-control system 106 can also maximize a total-value metric (received by the dynamic transportation matching system 104) to determine an admission rate $\alpha$ to utilize in accordance with one or more embodiments. For instance, the provider-dispatch-control system 106 can determine a rate $(\lambda_\phi)$ at which basic-dispatch-provider devices arrive into basic-dispatch-mode queue (as described in function (30)) and a rate $(\lambda_\pi)$ at which prioritized-dispatch-provider devices arrive into a prioritized-dispatch-mode queue (as described in function (28)). Furthermore, the provider-dispatch-control system 106 can determine value-share rates of the dynamic transportation matching system 104 in each of the dispatch modes. For instance, the provider-dispatch-control system 106 can identify a value-share rate $\gamma_\pi$ of the dynamic transportation matching system 104 for the prioritized-dispatch mode and a value-share rate $\gamma_\phi$ of the dynamic transportation matching system 104 for the based-dispatch mode. Then, the provider-dispatch-control system 106 can identify an admission rate $\alpha$ that maximizes the total-value metric R based on a transportation request values p utilizing the following function:

$$R(\alpha)=+p(\gamma_\pi\lambda_\pi+\gamma_\phi\lambda_\phi) \quad (36)$$

As further shown in FIG. 5, based on a maximized transportation-mode-surplus value, the provider-dispatch-control system 106 can determine a range of slots for provider devices operating in a prioritized-dispatch mode 524 from the queuing model. Specifically, the provider-dispatch-control system 106 can utilize the identified number of prioritized-dispatch-provider devices $N_\pi$ that maximizes the transportation-mode-surplus value S (e.g., from the act 522 and as described in function (35)) as a maximum limit of slots. Then, the provider-dispatch-control system 106 can determine one or more slot limits (e.g., a lower-target limit, an upper-target limit) in accordance with one or more embodiments. Moreover, the provider-dispatch-control system 106 can utilize the maximum limit of slots (and the one or more other slot limits) to determine the range of prioritized-dispatch-mode slots 524.

Figure 6:
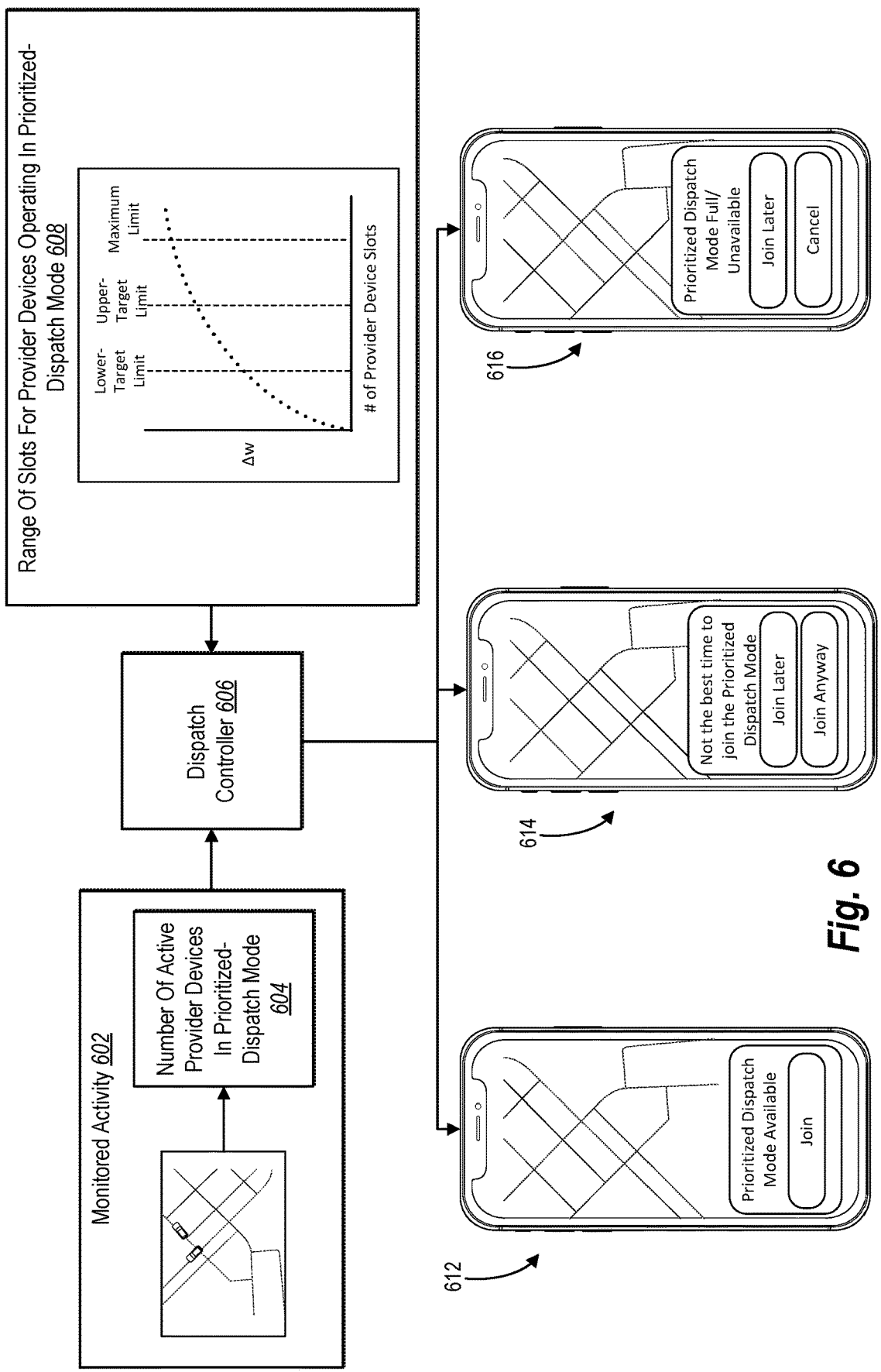
FIG. 6 illustrates a diagram of a provider-dispatch-control system transmitting a prioritized-mode-availability indicator to provider devices based on a range of prioritized-dispatch-mode slots in accordance with one or more embodiments.

As mentioned above, the provider-dispatch-control system 106 can transmit prioritized-mode-availability indicators based on a determined range of prioritized-dispatch-mode slots. For instance, FIG. 6 illustrates an example of the provider-dispatch-control system 106 transmitting such prioritized-mode-availability indicators. Specifically, as shown in FIG. 6, the provider-dispatch-control system 106 utilizes a dispatch controller 606 to identify monitored activity 602 (e.g., in real time) within a geographic area to identify a number of active provider devices in a prioritized-dispatch mode 604. Furthermore, the provider-dispatch-control system 106 utilizes the dispatch controller 606 to check the number of active provider devices in the prioritized-dispatch mode 604 against a range of prioritized-dispatch-mode slots 608 to determine a prioritized-mode-availability indicator to transmit.

As previously mentioned, the provider-dispatch-control system 106 can utilize the dispatch controller 606 to monitor activity within a geographic area for a target time period. In one or more embodiments, the provider-dispatch-control system 106 utilizes the dispatch controller 606 to identify a number of active prioritized-dispatch-provider devices, in a sliding window of time intervals (e.g., once per 2 seconds, once per 10 seconds, once per minute). In some instances, the provider-dispatch-control system 106 utilizes the dispatch controller 606 to identify the active prioritized-dispatch-provider devices within a geographic area. Moreover, the provider-dispatch-control system 106 can utilize the dispatch controller 606 to compare the number of active prioritized-dispatch-provider devices with a range of prioritized-dispatch-mode slots. Then, the provider-dispatch-control system 106 can determine a prioritized-mode-availability indicator to transmit within the sliding window of time interval (based on the comparison between number of active prioritized-dispatch provider devices and a current range of prioritized-dispatch-mode slots).

For instance, as shown in FIG. 6, the provider-dispatch-control system 106 can transmit, to a provider device 612, a prioritized-mode-availability indicator as an indication advising to enter a prioritized-dispatch mode (during a target time period and in a given geographic area). In particular, the provider-dispatch-control system 106 can determine (via the dispatch controller 606) that the number of active provider devices in the prioritized-dispatch mode 604 does not satisfy the lower-target limit of provider-device slots within the range of prioritized-dispatch-mode slots 608. As a result, the provider-dispatch-control system 106 can actively invite provider devices to join the prioritized-dispatch mode within the geographic area.

To illustrate, when the provider-dispatch-control system 106 determines that there are 98 active provider devices within a prioritized-dispatch mode corresponding to a geographic area and the lower-target limit of slots is 110 provider devices, the provider-dispatch-control system 106 can transmit a prioritized-mode-availability indicator to one or more provider devices indicating to enter a prioritized-dispatch mode. In some cases, for instance, the provider-dispatch-control system 106 can provide, for display within the provider device, a selectable option to join the prioritized-dispatch mode (as shown on the provider device 612 on FIG. 6). In some instances, upon receiving a user interaction with a selectable option to join the prioritized-dispatch mode from a provider device, the provider-dispatch-control system 106 can assign the provider device to a slot of the prioritized-dispatch mode in the geographic area. Indeed, upon assigning the provider device to the prioritized-dispatch mode, the provider-dispatch-control system 106 can dispatch the provider device utilizing rules and/or heuristics corresponding to the prioritized-dispatch mode within the geographic area.

As shown in FIG. 6, the provider-dispatch-control system 106 transmits the prioritized-mode-availability indicator to a provider device 612 indicating to enter a prioritized-dispatch mode with various information. In particular, the provider-dispatch-control system 106 can provide, for display within a provider device, information corresponding to the indication to enter the prioritized-dispatch mode, such as the prioritized-dispatch-mode rate corresponding to the geographic area and the target time period. In certain embodiments, the provider-dispatch-control system 106 provides, for display, a relative dispatch-mode rate by comparing between the prioritized-dispatch-mode rate and a basic-dispatch-mode rate (e.g., via subtraction). More specifically, the provider-dispatch-control system 106 can provide, for display, the increase in rate a provider device will receive upon joining the prioritized-dispatch mode in comparison to operating in a basic-dispatch mode (e.g., a dispatch-mode rate based transportation-mode-surplus value).

Furthermore, the provider-dispatch-control system 106 can also provide, for display within the provider device, a prioritized-value metric corresponding to the geographic area and the target time period as information for the indication to enter a prioritized-dispatch mode. In one or more embodiments, the provider-dispatch-control system 106 provides, for display, a relative value metric by comparing between a prioritized-value metric received by operating in a prioritized-dispatch mode compared to a basic-value metric received by operating in a basic-dispatch mode. To illustrate, the provider-dispatch-control system 106 can provide, for display, the increase in value metric achieved by prioritized-dispatch-provider devices in comparison to basic-dispatch-provider devices during a target time period in a geographic area.

Additionally, the provider-dispatch-control system 106 can also provide, for display within the provider device, an increase in a number of transportation request matches received within the prioritized-dispatch mode as information for the indication to enter a prioritized-dispatch mode. For instance, the provider-dispatch-control system 106 can provide, for display, the increase in transportation request matches received by prioritized-dispatch-provider devices in comparison to basic-dispatch-provider devices during a target time period in a geographic area. Indeed, the provider-dispatch-control system 106 can transmit the prioritized-mode-availability indicator to a provider device indicating to enter a prioritized-dispatch mode with various information corresponding to a variety of determined transportation-mode-surplus values (e.g., differences in utilization metric efficiencies, value metrics, rates, number of transportation requests) between the prioritized-dispatch mode and the basic-dispatch mode.

As indicated above, in certain embodiments, the provider-dispatch-control system 106 transmits the prioritized-mode-availability indicator indicating to enter a prioritized-dispatch mode within a given geographic area to provider devices in other geographic areas. In particular, the provider-dispatch-control system 106 can transmit the prioritized-mode-availability indicator having a selectable option to join a prioritized-dispatch mode in a given geographic area to provider devices in one or more additional geographic areas (e.g., different from the given geographic area). Indeed, upon receiving (or detecting) a user interaction with the selectable option from a provider device in the one or more additional geographic areas, the provider-dispatch-control system 106 can assign the provider device to the prioritized-dispatch mode within the given geographic area. In some instances, the provider-dispatch-control system 106 transmits such a prioritized-mode-availability indicator to provider devices in other geographic areas (e.g., neighboring geographic areas) when the number of active provider devices in the prioritized-dispatch mode within a given geographic area does not satisfy the lower-target limit of slots within the range of prioritized-dispatch-mode slots—but there are no additional provider devices within the given geographic area.

Moreover, in some embodiments, the provider-dispatch-control system 106 can utilize positioning signals to inform provider devices as to which geographic areas a prioritized-mode slot is available. For instance, upon identifying that a number of active provider devices in the prioritized-dispatch mode does not satisfy a lower-target limit of slots within a range of prioritized-dispatch-mode slots in a geographic area, the provider-dispatch-control system 106 can provide for display to provider devices, an indicator indicating available prioritized-dispatch-mode slots, in the geographic area. For instance, the provider-dispatch-control system 106 can utilize color coding for geographic areas, a direction arrow to a geographic area, or another positioning signal to indicate the available prioritized-dispatch-mode slots on a map-based user interface and/or transmit an indicator (in accordance with one or more embodiments) to inform provider devices of the available prioritized-dispatch-mode slots in the geographic area.

In addition to a positioning signal, in one or more embodiments, the provider-dispatch-control system 106 reserves one or more prioritized-dispatch-mode slots upon transmitting a prioritized-mode-availability indicator indicating to enter a prioritized-dispatch mode. For instance, the provider-dispatch-control system 106 can reserve a prioritized-dispatch-mode slot for each provider device that receives the prioritized-mode-availability indicator. In particular, the reserved prioritized-dispatch-mode slot can be guaranteed to the provider device receiving the prioritized-mode-availability indicator such that the slot is not filled (and made unavailable to the provider device). In some instances, the provider-dispatch-control system 106 also reserves the prioritized-dispatch-mode slot for a threshold reservation time (e.g., the slot is reserved for 5 minutes). Additionally, the provider-dispatch-control system 106 can provide, for display on a provider device, the reserved prioritized-dispatch-mode slot with the threshold reservation time (e.g., to display the amount of time a prioritized-dispatch-mode slot is guaranteed or reserved).

As further shown in FIG. 6, the provider-dispatch-control system 106 can also transmit, to a provider device 614, a prioritized-mode-availability indicator advising a provider device not to enter a prioritized-dispatch mode (during a target time period and in a given geographic area). More specifically, the provider-dispatch-control system 106 can determine (via a dispatch controller 606) that the number of active provider devices in the prioritized-dispatch mode 604 satisfies the upper-target limit of provider-device slots within the range of prioritized-dispatch-mode slots 608. Subsequently, the provider-dispatch-control system 106 can actively advise provider devices against joining the prioritized-dispatch mode within the geographic area to maintain a threshold-noticeable-value difference (or transportation-mode-surplus value) for the prioritized-dispatch mode within the geographic area.

To illustrate, when the provider-dispatch-control system 106 determines that there are 241 active provider devices within a prioritized-dispatch mode corresponding to a geographic area and the upper-target limit of slots is 237 provider devices, the provider-dispatch-control system 106 can transmit a prioritized-mode-availability indicator to one or more provider devices indicating to not enter the prioritized-dispatch mode. For instance, the provider-dispatch-control system 106 can provide, for display within the provider device, a selectable option to join the prioritized-dispatch mode at a later time (as shown on the provider device 614 on FIG. 6). In particular, as shown in FIG. 6, the provider-dispatch-control system 106 can provide, for display, a selectable option to navigate a user utilizing the provider device away from joining the prioritized-dispatch mode when transmitting a prioritized-mode-availability indicator with indications advising to not enter a prioritized-dispatch mode (e.g., "join later"). In some instances, as shown in FIG. 6, the provider-dispatch-control system 106 can also provide, for display, a selectable option to join the prioritized-dispatch mode in addition to a prioritized-mode-availability indicator advising a provider device to not enter a prioritized-dispatch mode.

As shown in FIG. 6, the provider-dispatch-control system 106 transmits a prioritized-mode-availability indicator to a provider device 614 indicating to not enter a prioritized-dispatch mode with various information. More specifically, the provider-dispatch-control system 106 can provide, for display on the provider device 614, (i) a relative dispatch-mode rate, (ii) a relative value metric, (iii) a number of transportation request matches, and/or (iv) transportation-mode-surplus values between a prioritized-dispatch mode and a basic-dispatch mode (as described above) to indicate suboptimal benefits of joining a prioritized-dispatch mode during a target time period when the upper-target limit is already satisfied. In some cases, the provider-dispatch-control system 106 can provide, for display, a relative value metric that is suboptimal (e.g., a lower gain for joining the prioritized-dispatch mode) during the target time period.

In some embodiments, the provider-dispatch-control system 106 can utilize a variable (or dynamic) prioritized-dispatch-mode rate while transmitting a prioritized-mode-availability indicator advising the provider devices to not enter the prioritized-dispatch mode. More specifically, the provider-dispatch-control system 106 can reduce a prioritized-dispatch-mode rate corresponding to the prioritized-dispatch mode and transmit an indication of the reduced prioritized-dispatch-mode rate to one or more provider devices while advising not to enter the prioritized-dispatch mode. For example, the provider-dispatch-control system 106 can reduce the prioritized-dispatch-mode rate based on a difference between a maximum limit of slots from a range of prioritized-dispatch-mode slots and a number of active provider devices within the prioritized-dispatch mode (during a target time period). Indeed, as the number of active provider devices within the prioritized-dispatch mode increases, the provider-dispatch-control system 106 can decrease the prioritized-dispatch-mode rate. By doing so, the provider-dispatch-control system 106 can communicate to provider devices the diminished effectiveness of joining a prioritized-dispatch mode during a target time (e.g., when the upper-target limit is satisfied) while transmitting a prioritized-mode-availability indicator advising the provider devices to not enter the prioritized-dispatch mode.

In one or more embodiments and in reference to FIG. 6, the provider-dispatch-control system 106 can utilize the dispatch controller 606 to determine that the number of active provider devices in the prioritized-dispatch mode 604 is within a target region of slots (between the lower-target limit and the upper-target limit) in the range of prioritized-dispatch-mode slots 608. Indeed, when the number of active prioritized-dispatch-provider devices is within the target region of slots, in certain embodiments, the provider-dispatch-control system 106 withholds transmission of prioritized-mode-availability indicators. In particular, the provider-dispatch-control system 106 can take no actions for the prioritized-mode-availability indicators (e.g., not invite or not advise to not enter the prioritized-dispatch mode) to maintain the number of active prioritized-dispatch-provider devices within the target region of slots. In some instances, the target-region of slots indicates an optimal number of prioritized-dispatch-mode slots that maximizes a value-metric difference between dispatch modes (or a transportation-mode-surplus value) in accordance with one or more embodiments.

As indicated above and further shown in FIG. 6, the provider-dispatch-control system 106 can transmit, to a provider device 616, a prioritized-mode-availability indicator to deactivate the prioritized-dispatch mode on additional provider devices during a target time period for a geographic area. More specifically, the provider-dispatch-control system 106 can determine (via the dispatch controller 606) that the number of active provider devices in the prioritized-dispatch mode 604 satisfies the maximum limit of provider-device slots within the range of prioritized-dispatch-mode slots 608. As a result, the provider-dispatch-control system 106 can prohibit additional provider devices from entering the prioritized-dispatch mode during the target time period. To illustrate, when the provider-dispatch-control system 106 determines that there are 295 active provider devices within a prioritized-dispatch mode corresponding to a geographic area and the maximum limit of slots is 291, the provider-dispatch-control system 106 can transmit a prioritized-mode-availability indicator to one or more provider devices to deactivate the prioritized-dispatch mode on additional provider devices.

For example, as shown in FIG. 6, the provider-dispatch-control system 106 can transmit a prioritized-mode-availability indicator to the provider device 616 indicating that a prioritized-dispatch mode is at capacity (full) or unavailable. In addition, as shown in FIG. 6, the provider-dispatch-control system 106 can also provide, for display on the provider device 616, a selectable option to join the prioritized-dispatch mode at a later time due to the prioritized-dispatch mode being deactivated for the provider device 616. Additionally, the provider-dispatch-control system 106 can also provide, for display on the provider device 616, a selectable option to cancel (e.g., close the prioritized-dispatch mode interface) when the prioritized-dispatch mode is deactivated on the provider device 616.

As further shown in FIG. 6, the provider-dispatch-control system 106 can transmit the prioritized-mode-availability indicator to one or more provider devices to deactivate the prioritized-dispatch mode on additional provider devices by configuring selectable options displayed on graphical user interfaces of the provider devices. For instance, the provider-dispatch-control system 106 can configure the graphical user interface of a provider device by removing a selectable option to join a prioritized-dispatch mode upon transmitting the prioritized-mode-availability indicator to one or more provider devices to deactivate the prioritized-dispatch mode. Moreover, upon determining that the number of active provider devices no longer satisfies the maximum limit via the dispatch controller 606, the provider-dispatch-control system 106 can transmit a prioritized-mode-availability indicator to one or more provider devices to activate (or reactivate) the prioritized-dispatch mode on additional provider devices. In addition, the provider-dispatch-control system 106 can configure the graphical user interface of a provider device by introducing (for display) a selectable option to join a prioritized-dispatch mode upon transmitting the prioritized-mode-availability indicator to one or more provider devices to activate (or reactivate) the prioritized-dispatch mode.

Furthermore, in some instances, the provider-dispatch-control system 106 prohibits access into a prioritized-dispatch mode when the dispatch controller 606 identifies a number of provider devices does not satisfy a sparse-device-quantity threshold. In one or more embodiments, the provider-dispatch-control system 106 utilizes a sparse-device-quantity threshold to define a number of provider devices that would result in nonconsequential improvements in efficiency when utilizing a prioritized-dispatch mode. For instance, the provider-dispatch-control system 106 can utilize a dispatch controller to identify a number of active provider devices (e.g., in both prioritized and/or basic dispatch modes). Then, the provider-dispatch-control system 106 can utilize the dispatch controller to compare the number of active provider devices with a sparse-device-quantity threshold. In cases where the number of active provider devices does not satisfy (e.g., is less than or equal to) the sparse-device-quantity threshold, the provider-dispatch-control system 106 can utilize the dispatch controller to prohibit access the prioritized-dispatch mode. When the number of active provider devices does satisfy (e.g., is greater than) the sparse-device-quantity threshold, the provider-dispatch-control system 106 can utilize the dispatch controller to decide entry into to the prioritized-dispatch mode using a determine range of prioritized-dispatch-mode slots in accordance with one or more embodiments.

The provider-dispatch-control system 106 can utilize a variety of graphical user interface elements to transmit (and display) prioritized-mode-availability indicators in accordance with one or more embodiments. For instance, the provider-dispatch-control system 106 can transmit the prioritized-mode-availability indicators for display as (i) notifications on a provider device (e.g., push notifications), (ii) an overlay or element within a dynamic-transportation-matching application, or (iii) an electronic communication (e.g., an SMS message, an instant message, an e-mail).

Moreover, in some embodiments, the provider-dispatch-control system 106 transmits an acceptance or rejection to a provider device upon receiving a request to join a prioritized-dispatch mode from the provider device. For instance, the provider-dispatch-control system 106 can receive a request to join a prioritized-dispatch mode in a geographic area. The provider-dispatch-control system 106 can utilize a dispatch controller to reference a number of active prioritized-dispatch-provider devices and a determined range of prioritized-dispatch-mode slots to determine a prioritized-mode-availability indicator for the requesting provider device. As an example, the provider-dispatch-control system 106 can reject the request and/or admit the requesting provider device into the prioritized-dispatch mode within the geographic area.

In addition to the prioritized-mode-availability indicators, the provider-dispatch-control system 106 can also track a number of times a provider device accesses or attempts to join a prioritized-dispatch mode accesses for a provider device. In particular, the provider-dispatch-control system 106 can identify a number of times a provider device has accessed (or operated) within a prioritized-dispatch mode (e.g., within a geographic area). The provider-dispatch-control system 106 can utilize a threshold number of access permissions to determine whether the provider device can access the prioritized-dispatch mode in a given time period. More specifically, the provider-dispatch-control system 106 can deactivate the prioritized-dispatch mode on the provider device when the provider device has accessed the prioritized-dispatch mode a number of times that satisfies (e.g., meets or exceeds) the threshold number of access permissions.

In some cases, when dispatch data is unavailable for one or more time intervals, the provider-dispatch-control system 106 can utilize the dispatch controller 606 to transmit prioritized-mode-availability indicators based a range of prioritized-dispatch-mode slots determined from previously obtained dispatch data. For example, as previously mentioned, the provider-dispatch-control system 106 can receive (or collect) dispatch data. In one or more embodiments, the provider-dispatch-control system 106 utilizes a variety of approaches to collect dispatch data to determine a range of slots in accordance with one or more embodiments. For instance, to increase the likelihood of availability of dispatch data, the provider-dispatch-control system 106 can utilize multiple area clusters within geographic areas to collect dispatch data for each area cluster and separately analyze each of the area clusters if dispatch data from one of the area clusters is unavailable. Moreover, when dispatch data is unavailable for one or more time intervals, the provider-dispatch-control system 106 can utilize a dispatch controller to transmit prioritized-mode-availability indicators based a range of prioritized-dispatch-mode slots determined from previously obtained dispatch data or one of the separately analyzed area clusters.

Figure 7:
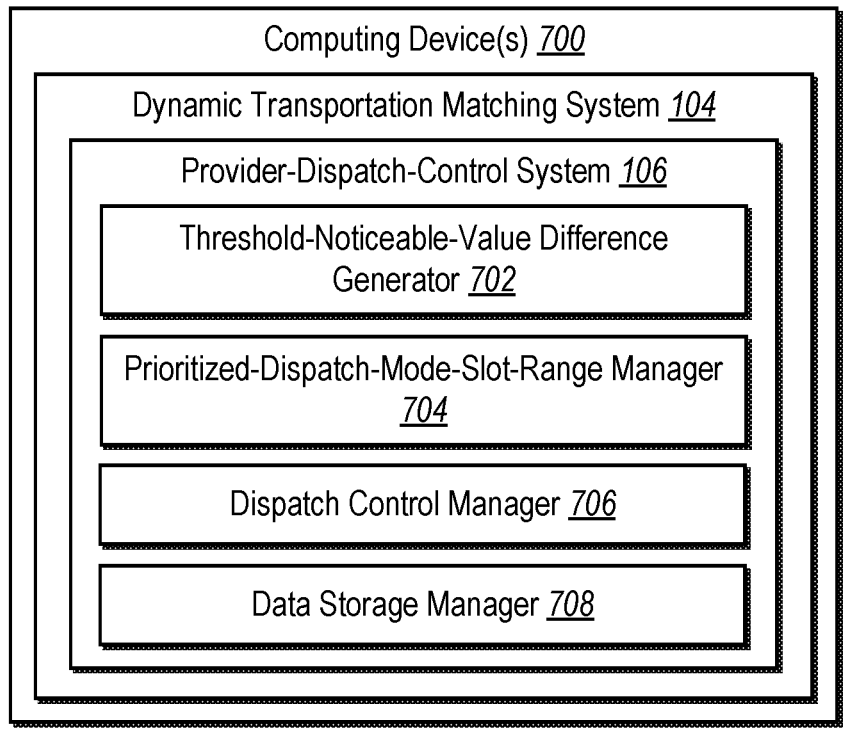
FIG. 7 illustrates a block diagram of a provider-dispatch-control system in accordance with one or more embodiments.

Turning now to FIG. 7, additional detail will be provided regarding components and capabilities of the provider-dispatch-control system in accordance with one or more embodiments. In particular, FIG. 7 illustrates the provider-dispatch-control system 106 executed by computing device(s) 700 (e.g., server device(s) 102, provider devices 112*a*-112*n*, provider devices 118*a*-118*n*, and requester devices 122*a*-122*n*). As shown in FIG. 7, the computing device(s) 700 includes or hosts the dynamic transportation matching system 104 and the provider-dispatch-control system 106. The provider-dispatch-control system 106 includes a threshold-noticeable-value difference generator 702, a prioritized-dispatch-mode-slot-range manager 704, a dispatch control manager 706, and a data storage manager 708.

As just mentioned and as illustrated in FIG. 7, the provider-dispatch-control system 106 includes the threshold-noticeable-value difference generator 702. For instance, the threshold-noticeable-value difference generator 702 can receive (or obtain) historical data related to a prioritized-dispatch mode and a basic-dispatch mode, such as historical prioritized-value metrics and historical basic-value metrics as described above (e.g., in relation to FIG. 3). In addition, the threshold-noticeable-value difference generator 702 can utilize historical prioritized-value metrics and historical basic-value metrics to generate a threshold-noticeable-value difference based on a distribution of value-metric differences between the historical prioritized-value metrics and the historical basic-value metrics as described above (e.g., in relation to FIG. 3).

Moreover, as shown in FIG. 7, the provider-dispatch-control system 106 includes the prioritized-dispatch-mode-slot-range manager 704. In certain instances, the prioritized-dispatch-mode-slot-range manager 704 determines estimated (or modelled) prioritized-value metrics and estimated (or modelled) counterfactual-value metrics during a target time period of a geographic area as described above (e.g., in relation to FIG. 4A). Furthermore, the prioritized-dispatch-mode-slot-range manager 704 can also utilize a threshold-noticeable-value difference preservation approach to determine a number of prioritized-dispatch-provider devices that result in estimated-value-metric differences (between estimated prioritized-value metrics and estimated counterfactual-value metrics) that still preserve a threshold-noticeable-value difference as described above (e.g., in relation to FIG. 4A).

In some embodiments, the prioritized-dispatch-mode-slot-range manager 704 can also utilize a provider-device-metrics maximization approach and/or a theoretical-queuing approach to determine a number of prioritized-dispatch-provider devices that maximize a transportation-mode-surplus value as described above (e.g., in relation to FIGS. 4A and 5). Indeed, the prioritized-dispatch-mode-slot-range manager 704 can utilize a number of prioritized-dispatch-provider devices determined under one or more of the various approaches described above to determine a range of slots for provider devices operating in a prioritized-dispatch mode (e.g., a maximum limit of slots, a lower-target limit, and/or an upper-target limit) as described above (e.g., in relation to FIGS. 4A, 4B, and 5).

Furthermore, as shown in FIG. 7, the provider-dispatch-control system 106 includes the dispatch control manager 706. In certain instances, the dispatch control manager 706 can transmit a prioritized-mode-availability indicator to one or more provider devices indicating availability of a prioritized-dispatch mode during a target time period based on a range of prioritized-dispatch-mode slots as described above (e.g., in relation to FIG. 6). In some embodiments, the dispatch control manager 706 determines that a number of active provider devices operating in the prioritized-dispatch mode satisfies an upper-target-limit within a range of prioritized-dispatch-mode slots and transmits a prioritized-mode-availability indicator that advises provider devices to not enter the prioritized-dispatch mode as described above (e.g., in relation to FIG. 6). Additionally, in certain embodiments, the dispatch control manager 706 determines that a number of active provider devices does not satisfy a lower-target-limit within a range of prioritized-dispatch-mode slots and transmits a prioritized-mode-availability indicator that advises provider devices to enter the prioritized-dispatch mode as described above (e.g., in relation to FIG. 6). Moreover, in one or more embodiments, the dispatch control manager 706 determines that a number of active provider devices satisfies a maximum limit within a range of prioritized-dispatch-mode slots and transmits a prioritized-mode-availability indicator to deactivate the prioritized-dispatch mode on additional provider devices as described above (e.g., in relation to FIG. 6).

Additionally, as shown in FIG. 7, the provider-dispatch-control system 106 can include the data storage manager 708. The data storage manager 708 can communicate with any of the other components of the provider-dispatch-control system 106 to obtain and/or provide data. For instance, the data storage manager 708 can include data such as utilization metrics data (e.g., an idle-status time, an in-transit-to-pickup-status time, or an active-transport-status time) for prioritized-provider devices and/or basic-provider devices (historical and/or monitored). In addition, the data storage manager 708 can include data such as threshold-noticeable-value difference, prioritized-value metric, basic-value metric, counterfactual-value metric, cannibalization factor, ranges of prioritized-dispatch-mode slots, transportation-mode-surplus value, and active provider device count data for various time periods and/or geographic areas (e.g., geohashes). In addition, the data storage manager 708 can include data such as prioritized-mode-availability indicators (to transmit to provider devices) indicating a variety of informational data and selectable graphical user interface elements (e.g., indicating to enter or not enter a prioritized-dispatch mode and/or deactivating a prioritized-dispatch mode).

In one or more embodiments, each of the components of the provider-dispatch-control system 106 are in communication with other components using any suitable communication technologies. Additionally, the components of the provider-dispatch-control system 106 can be in communication with one or more other devices including other computing devices of a user, server devices (e.g., cloud storage devices), licensing servers, or other devices/systems. It will be recognized that although the components of the provider-dispatch-control system 106 are shown to be separate in FIG. 7, any of the subcomponents may be combined into fewer components, such as into a single component, or divided into more components as may serve a particular implementation. Furthermore, although the components of FIG. 7 are described in connection with the provider-dispatch-control system 106, at least some of the components for performing operations in conjunction with the provider-dispatch-control system 106 described herein may be implemented on other devices within the environment.

The components of the provider-dispatch-control system 106 can include software, hardware, or both. For example, the components of the provider-dispatch-control system 106 can include one or more instructions stored on a computer-readable storage medium and executable by processors of one or more computing (or computer) devices (e.g., the computing device(s) 700). When executed by the one or more processors, the computer-executable instructions of the provider-dispatch-control system 106 can cause the computing device(s) 700 to perform the operations described herein. Alternatively, the components of the provider-dispatch-control system 106 can include hardware, such as a special purpose processing device to perform a certain function or group of functions. Additionally, or alternatively, the components of the provider-dispatch-control system 106 can include a combination of computer-executable instructions and hardware.

Furthermore, the components of the provider-dispatch-control system 106 performing the functions described herein with respect to the provider-dispatch-control system 106 may, for example, be implemented as part of a stand-alone application, as a module of an application, as a plug-in for applications, as a library function or functions that may be called by other applications, and/or as a cloud-computing model. Thus, the components of the provider-dispatch-control system 106 may be implemented as part of a stand-alone application on a personal computing device or a mobile device.

Figure 8:
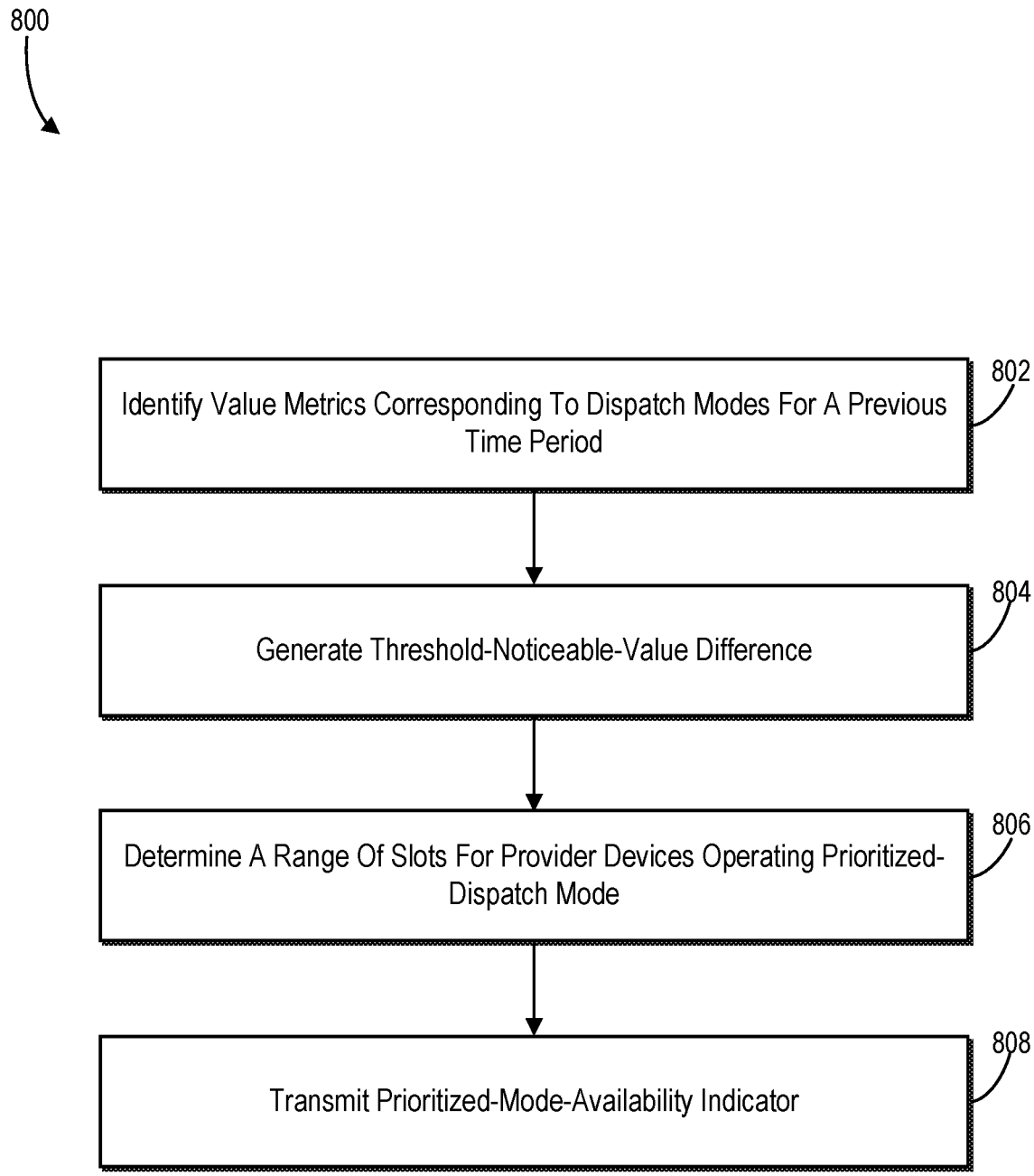
FIG. 8 illustrates a flowchart of a series of acts for transmitting prioritized-mode-availability indicators based on a determined range of prioritized-dispatch-mode slots in accordance with one or more embodiments.

Turning now to FIG. 8, this figure shows a flowchart of a series of acts 800 for transmitting prioritized-mode-availability indicators based on a determined range of prioritized-dispatch-mode slots in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the series of acts 800 include an act 802 of identifying value metrics corresponding to dispatch mode for a previous time period. In particular, the act 802 can include identifying, for one or more previous time periods, a set of prioritized-dispatch-provider devices receiving prioritized-value metric while operating in a prioritized-dispatch mode. Furthermore, the act 802 can include identifying, for one or more previous time periods, a set of basic-dispatch-provider devices receiving basic-value metrics while operating in a basic-dispatch mode.

As shown in FIG. 8, the series of acts 800 include an act 804 of generating a threshold-noticeable-value difference. In particular, the act 804 can include generating, for a target time period, a threshold-noticeable-value difference for value metrics between a prioritized-dispatch mode and a basic-dispatch mode based on prioritized-value metrics received by a set of prioritized-dispatch-provider devices and basic-value metrics received by a set of basic-dispatch-provider devices (for one or more previous time periods). Furthermore, the act 804 can include generating, for a target time period, a threshold-noticeable-value difference by identifying a set of value-metric differences between prioritized-value metrics received by a set of prioritized-dispatch-provider devices and basic-value metrics received by a set of basic-dispatch-provider devices (for one or more previous time periods). In addition, the act 804 can include determining a minimum-detectable-effect value as a threshold-noticeable-value difference based on a distribution of value-metric differences from a set of value-metric differences (identified as described above).

As shown in FIG. 8, the series of acts 800 include an act 806 of determining a range of slots for provider devices operating in a prioritized-dispatch mode. In particular, the act 806 can include determining a range of slots for provider devices operating in a prioritized-dispatch mode during a target time period based on a threshold-noticeable-value difference. Furthermore, the act 806 can include estimating a prioritized-value metric to be received by a prioritized-dispatch-provider device operating in a prioritized-dispatch mode during a target time period based on a predicted number of prioritized-dispatch-provider devices operating in the prioritized-dispatch mode during the target time period. In addition, the act 806 can include estimating a counterfactual-value metric representing a value metric that would be received by a provider device if each provider device were to operate in a basic-dispatch mode during a target time period.

Additionally, the act 806 can include determining a range of slots for provider devices operating in a prioritized-dispatch mode based on an estimated prioritized-value metric, an estimated counterfactual-value metric, and a threshold-noticeable-value difference. In certain instances, the act 806 can include determining a maximum limit of provider-device slots for provider devices operating in a prioritized-dispatch mode for a range of slots by determining a value-metric difference between an estimated prioritized-value metric and an estimated counterfactual-value metric and comparing the value-metric difference to the threshold-noticeable-value difference. Furthermore, the act 806 can include determining a cannibalization factor reflecting a probability of a provider device operating in a prioritized-dispatch mode being selected for a transportation request over a provider device operating in a basic-dispatch mode and determining, for a target time period, an estimated prioritized-value metric based on the cannibalization factor.

As shown in FIG. 8, the series of acts 800 include an act 808 of transmitting a prioritized-mode-availability indicator.

In particular, the act 808 can include transmitting a prioritized-mode-availability indicator to one or more provider devices indicating availability of a prioritized-dispatch mode during a target time period based on a range of slots for provider devices operating in the prioritized-dispatch mode. In certain instances, the act 808 can include determining, within a range of slots for provider devices, an upper-target-limit of provider-device slots at which to send provider-device indications to not enter a prioritized-dispatch mode during a target time period. Furthermore, the act 808 can include determining that a number of active provider devices operating in a prioritized-dispatch mode in a geographic area satisfies an upper-target-limit of provider-device slots. Moreover, the act 808 can include, based on a number of active provider devices in a geographic area satisfying an upper-target-limit of provider-device slots, transmitting a prioritized-mode-availability indicator to one or more provider devices by transmitting an indication advising provider devices to not enter a prioritized-dispatch mode during a target time period for the geographic area.

Furthermore, the act 808 can include determining, within a range of slots for provider devices, a lower-target-limit of provider-device slots at which to send provider-device indications to enter a prioritized-dispatch mode during a target time period. Moreover, the act 808 can include determining that a number of active provider devices operating in a prioritized-dispatch mode in a geographic area does not satisfy a lower-target-limit of provider-device slots. In addition, the act 808 can include, based on a number of active provider devices in a geographic area not satisfying a lower-target-limit of provider-device slots, transmitting a prioritized-mode-availability indicator to one or more provider devices by transmitting an indication advising provider devices to enter the prioritized-dispatch mode during a target time period for the geographic area.

Additionally, the act 808 can include determining, within a range of slots for provider devices, a maximum limit of provider-device slots at which to prohibit provider devices from entering a prioritized-dispatch mode during a target time period. Moreover, the act 808 can include determining that a number of active provider devices operating in a prioritized-dispatch mode in a geographic area satisfies a maximum limit of provider-device slots. Furthermore, the act 808 can include based on a number of active provider devices in a geographic area satisfying a maximum limit of provider-device slots, transmitting a prioritized-mode-availability indicator to one or more provider devices to deactivate a prioritized-dispatch mode on additional provider devices during a target time period for the geographic area.

In addition, the act 808 can include identifying, for a target time period, a number of active provider devices operating in a prioritized-dispatch mode in a geographic area. Furthermore, the act 808 can include reducing, for a target time period, a prioritized-dispatch-mode rate corresponding to a prioritized-dispatch mode based on a difference between a maximum limit of provider-device slots for provider devices operating in the prioritized-dispatch mode and a number of active provider devices within the prioritized-dispatch mode. Moreover, the act 808 can include transmitting an indication of a reduced prioritized-dispatch-mode rate to one or more provider devices.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
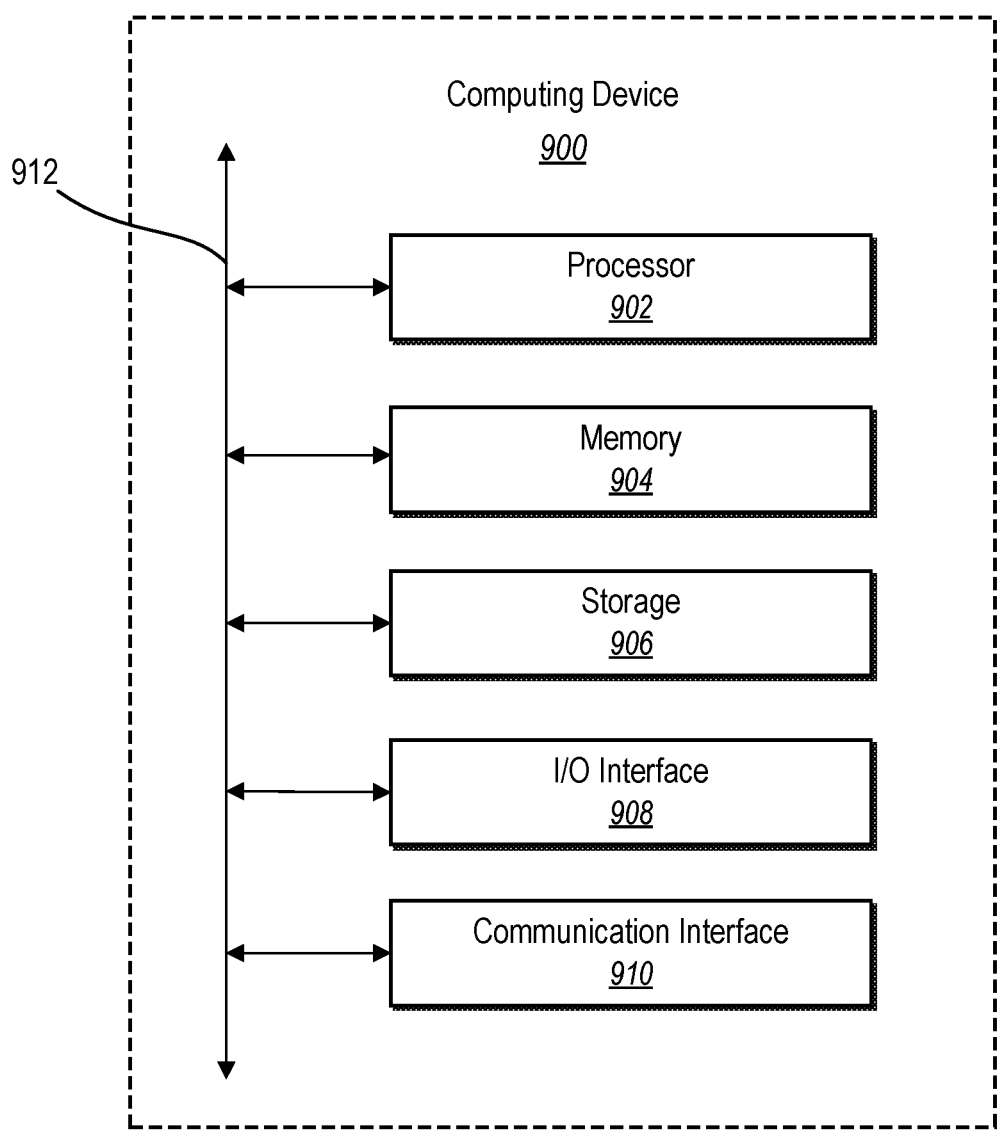
FIG. 9 illustrates a block diagram of a computing device in accordance with one or more embodiments.

FIG. 9 illustrates, in block diagram form, an exemplary computing device 900 that may be configured to perform one or more of the processes described above. One will appreciate that the provider-dispatch-control system 106 (or the dynamic transportation matching system 104) can comprise implementations of the computing device 900, including, but not limited to, the devices or systems illustrated in the previous figures. As shown by FIG. 9, the computing device can comprise a processor 902, memory 904, a storage device 906, an I/O interface 908, and a communication interface 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, storage device 906 can comprise a non-transitory storage medium described above. The storage device 906 may include a hard disk drive ("HDD"), flash memory, a Universal Serial Bus ("USB") drive or a combination of these or other storage devices.

The computing device 900 also includes one or more input or output ("I/O") interface 908, which are provided to allow a user (e.g., requester or provider) to provide input to (such as user strokes), receive output from, and otherwise transfer data to and from the computing device 900. These I/O interface 908 may include a mouse, keypad or a keyboard, a touch screen, camera, optical scanner, network interface, modem, other known I/O devices or a combination of such I/O interface 908. The touch screen may be activated with a stylus or a finger.

The I/O interface 908 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 908 is configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 can provide one or more interfaces for communication (such as, for example, packet-based communication) between the computing device and one or more other computing devices 900 or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that couples components of computing device 900 to each other.

Figure 10:
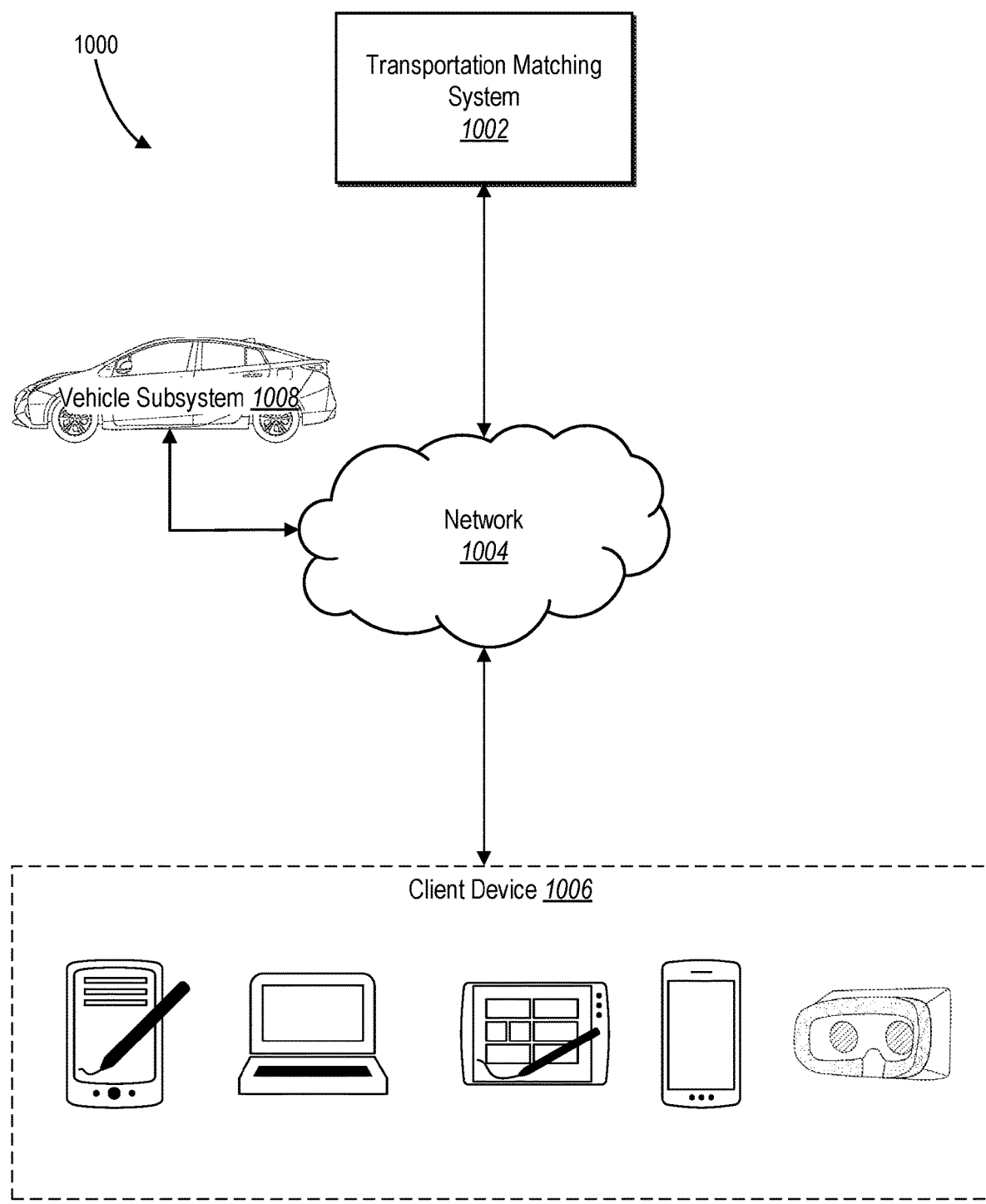
FIG. 10 illustrates an example environment for a transportation matching system in accordance with one or more embodiments.

FIG. 10 illustrates an example network environment 1000 of a transportation matching system 1002 (e.g., the dynamic transportation matching system 104). The network environment 1000 includes a client device 1006, a transportation matching system 1002, and a vehicle subsystem 1008 connected to each other by a network 1004. Although FIG. 10 illustrates a particular arrangement of the client device 1006, transportation matching system 1002, vehicle subsystem 1008, and network 1004, this disclosure contemplates any suitable arrangement of client device 1006, transportation matching system 1002, vehicle subsystem 1008, and network 1004. As an example, and not by way of limitation, two or more of client device 1006, transportation matching system 1002, and vehicle subsystem 1008 communicate directly, bypassing network 1004. As another example, two or more of client device 1006, transportation matching system 1002, and vehicle subsystem 1008 may be physically or logically co-located with each other in whole or in part. Moreover, although FIG. 10 illustrates a particular number of client devices 1006, transportation matching systems 1002, vehicle subsystems 1008, and networks 1004, this disclosure contemplates any suitable number of client devices 1006, transportation matching systems 1002, vehicle subsystems 1008, and networks 1004. As an example, and not by way of limitation, network environment 1000 may include multiple client device 1006, transportation matching systems 1002, vehicle subsystems 1008, and networks 1004.

This disclosure contemplates any suitable network 1004. As an example, and not by way of limitation, one or more portions of network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1004 may include one or more networks 1004.

Links may connect client device 1006, transportation matching system 1002, and vehicle subsystem 1008 to network 1004 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example, and not by way of limitation, a client device 1006 may include any of the computing devices discussed above in relation to FIG. 9. A client device 1006 may enable a network user at client device 1006 to access network 1004. A client device 1006 may enable its user to communicate with other users at other client devices 1006.

In particular embodiments, client device 1006 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1006 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 1006 one or more Hyper Text Markup Language ("HTML") files responsive to the HTTP request. Client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, transportation matching system 1002 may be a network-addressable computing system that can host a transportation matching network. Transportation matching system 1002 may generate, store, receive, and send data, such as, for example, user-profile data, concept-profile data, text data, transportation request data, GPS location data, provider data, requester data, vehicle data, or other suitable data related to the transportation matching network. This may include authenticating the identity of providers and/or vehicles who are authorized to provide transportation services through the transportation matching system 1002. In addition, the transportation matching system may manage identities of service requesters such as users/requesters. In particular, the transportation matching system 1002 may maintain requester data such as driving/riding histories, personal data, or other user data in addition to navigation and/or traffic management services or other location services (e.g., GPS services).

In particular embodiments, the transportation matching system 1002 may manage transportation matching services to connect a user/requester with a vehicle and/or provider. By managing the transportation matching services, the transportation matching system 1002 can manage the distribution and allocation of resources from the vehicle subsystem 1008 and user resources such as GPS location and availability indicators, as described herein.

Transportation matching system 1002 may be accessed by the other components of network environment 1000 either directly or via network 1004. In particular embodiments, transportation matching system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, transportation matching system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, or a transportation matching system 1002 to manage, retrieve, modify, add, or delete, the information stored in data store.

In particular embodiments, transportation matching system 1002 may provide users with the ability to take actions on various types of items or objects, supported by transportation matching system 1002. As an example, and not by way of limitation, the items and objects may include transportation matching networks to which users of transportation matching system 1002 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in transportation matching system 1002 or by an external system of a third-party system, which is separate from transportation matching system 1002 and coupled to transportation matching system 1002 via a network 1004.

In particular embodiments, transportation matching system 1002 may be capable of linking a variety of entities. As an example, and not by way of limitation, transportation matching system 1002 may enable users to interact with each other or other entities, or to allow users to interact with these entities through an application programming interfaces ("API") or other communication channels.

In particular embodiments, transportation matching system 1002 may include a variety of servers, sub-systems, programs, modules, logs, and data stores. In particular embodiments, transportation matching system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Transportation matching system 1002 may also include suitable components such as network interfaces, security mechanisms, load balancers, failover servers, management-and-network-operations consoles, other suitable components, or any suitable combination thereof. In particular embodiments, transportation matching system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between transportation matching system 1002 and one or more client devices 1006. An action logger may be used to receive communications from a web server about a user's actions on or off transportation matching system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of transportation matching system 1002. A privacy setting of a user determines how particular information associated with a user can be shared. The authorization server may allow users to opt in to or opt out of having their actions logged by transportation matching system 1002 or shared with other systems, such as, for example, by setting appropriate privacy settings. Third-party-content-object stores may be used to store content objects received from third parties. Location stores may be used for storing location information received from client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—i.e., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 1002. For example, the vehicle subsystem 1008 can include an on-board computing device communicatively linked to the network 1004 to transmit and receive data such as GPS location information, sensor-related information, requester location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   identifying, for one or more previous time periods, a set of prioritized-dispatch-provider devices receiving prioritized-value metrics while operating in a prioritized-dispatch mode and a set of basic-dispatch-provider devices receiving basic-value metrics while operating in a basic-dispatch mode;
   generating, for a target time period, a threshold-noticeable-value difference for value metrics between the prioritized-dispatch mode and the basic-dispatch mode based on the prioritized-value metrics received by the set of prioritized-dispatch-provider devices and the basic-value metrics received by the set of basic-dispatch-provider devices;
   monitoring, for a network of provider devices in a geographic area, a plurality of provider devices operating in the prioritized-dispatch mode within a dynamic transportation matching software application to receive a real-time snapshot of prioritized-dispatch-mode data from the plurality of provider devices in the geographic area;
   determining a range of slots with multiple target limits for provider devices operating in the prioritized-dispatch mode during the target time period based on the threshold-noticeable-value difference and the real-time snapshot of prioritized-dispatch-mode data;
   selecting a dynamic prioritized-mode-availability indicator that causes provider devices to display a dynamic graphical user interface (GUI) within the dynamic transportation matching software application based on the range of slots with the multiple target limits by selecting between:
   a first set of GUI selectable options to join the prioritized-dispatch mode within the geographic area based on a number of the plurality of provider devices operating in the prioritized-dispatch mode not satisfying a first target limit of the range of slots;
   a second set of GUI selectable options to delay joining the prioritized-dispatch mode within the geographic area based on the number of the plurality of provider devices operating in the prioritized-dispatch mode satisfying the first target limit of the range of slots and satisfying a second target limit of the range of slots, wherein the second target limit is greater than the first target limit; and
   a third set of GUI selectable options prohibiting joining the prioritized-dispatch mode within the geographic area based on the number of the plurality of provider devices operating in the prioritized-dispatch mode satisfying the first target limit of the range of slots, satisfying the second target limit of range of slot, and satisfying a third target limit of the range of slots, wherein the third target limit is greater than the second target limit;
   transmitting the dynamic prioritized-mode-availability indicator to one or more provider devices indicating availability of the prioritized-dispatch mode during the target time period to cause the one or more provider devices to display the first set of GUI selectable options to join the prioritized-dispatch mode within the geographic area; and
   based on receiving a user interaction with a GUI selectable option, from the first set of GUI selectable options, to join the prioritized-dispatch mode corresponding to the dynamic prioritized-mode-availability indicator from a particular provider device of the one or more provider devices:
   selecting a transportation request from the geographic area of the prioritized-dispatch mode for the particular provider device based on a prioritized-value metric corresponding to the transportation request; and dispatching the particular provider device to fulfill the transportation request by transmitting, for display on a graphical user interface of the particular provider device, a pickup location for the transportation request.

2. The computer-implemented method of claim 1, further comprising:
determining, within the range of slots for provider devices, the second target limit by determining an upper-target-limit of provider-device slots at which to send provider-device indications to not enter the prioritized-dispatch mode;
determining that a number of active provider devices operating in the prioritized-dispatch mode in the geographic area, from an updated real-time snapshot of the prioritized-dispatch-mode data, satisfies the upper-target-limit of provider-device slots and the first target limit; and
based on the number of active provider devices in the geographic area satisfying the upper-target-limit of provider-device slots and the first target limit:
selecting the second set of GUI selectable options to delay joining the prioritized-dispatch mode within the geographic area for an updated dynamic prioritized-mode-availability indicator; and
transmitting the updated dynamic prioritized-mode-availability indicator to the one or more provider devices to display an indication advising provider devices to not enter the prioritized-dispatch mode for the geographic area to display, from the second set of GUI selectable options, an additional GUI selectable option to delay joining the prioritized-dispatch mode and the GUI selectable option to join the prioritized-dispatch mode.

3. The computer-implemented method of claim 1, further comprising:
determining, within the range of slots for provider devices, the first target limit by determining a lower-target-limit of provider-device slots at which to send provider-device indications to enter the prioritized-dispatch mode;
determining that a number of active provider devices operating in the prioritized-dispatch mode in the geographic area, from the real-time snapshot of the prioritized-dispatch-mode data, does not satisfy the lower-target-limit of provider-device slots; and
based on the number of active provider devices in the geographic area not satisfying the lower-target-limit of provider-device slots, selecting the first set of GUI selectable options to join the prioritized-dispatch mode to transmitting the dynamic prioritized-mode-availability indicator to the one or more provider devices.

4. The computer-implemented method of claim 1, further comprising:
determining, within the range of slots for provider devices, the third target limit by determining a maximum limit of provider-device slots at which to prohibit provider devices from entering the prioritized-dispatch mode;
determining that a number of active provider devices operating in the prioritized-dispatch mode in the geographic area, from an updated real-time snapshot of the prioritized-dispatch-mode data, satisfies the maximum limit of provider-device slots and the second target limit; and
based on the number of active provider devices in the geographic area satisfying the maximum limit of provider-device slots and the second target limit:
selecting the third set of GUI selectable options prohibiting joining the prioritized-dispatch mode within the geographic area for an updated dynamic prioritized-mode-availability indicator; and
transmitting the updated dynamic prioritized-mode-availability indicator to the one or more provider devices to display, from the third set of GUI selectable options, a deactivation of a displayed selectable option to join the prioritized-dispatch mode on additional provider devices for the geographic area.

5. The computer-implemented method of claim 1, further comprising generating, for the target time period, the threshold-noticeable-value difference indicating a gap between value metrics received by provider devices operating in the prioritized-dispatch mode over the basic-dispatch mode by:
identifying a set of value-metric differences between the prioritized-value metrics received by the set of prioritized-dispatch-provider devices and the basic-value metrics received by the set of basic-dispatch-provider devices; and
determining a minimum-detectable-effect value as the threshold-noticeable-value difference based on a distribution of value-metric differences from the set of value-metric differences.

6. The computer-implemented method of claim 1, further comprising:
estimating a prioritized-value metric to be received by a prioritized-dispatch-provider device operating in the prioritized-dispatch mode during the target time period based on a predicted number of prioritized-dispatch-provider devices operating in the prioritized-dispatch mode during the target time period based on the real-time snapshot of prioritized-dispatch-mode data;
estimating a counterfactual-value metric representing a value metric that would be received by a provider device if each provider device were to operate in the basic-dispatch mode during the target time period; and
determining the range of slots for provider devices operating in the prioritized-dispatch mode based on the estimated prioritized-value metric, the estimated counterfactual-value metric, and the threshold-noticeable-value difference.

7. The computer-implemented method of claim 1, further comprising transmitting the dynamic prioritized-mode-availability indicator to cause the particular provider device to display, within a graphical map user interface, an indication of:
an available prioritized-dispatch-mode slot within the geographic area; and
an additional available prioritized-dispatch-mode slot within an additional geographic area.

8. The computer-implemented method of claim 6, further comprising:
determining a cannibalization factor reflecting a probability of a provider device operating in the prioritized-dispatch mode being selected for a transportation request over a provider device operating in the basic-dispatch mode; and
determining, for the target time period, the estimated prioritized-value metric based on the cannibalization factor.

9. The computer-implemented method of claim 1, further comprising:
identifying, for the target time period, a number of active provider devices operating in the prioritized-dispatch mode in the geographic area from the real-time snapshot of prioritized-dispatch-mode data;
reducing, for the target time period, a prioritized-dispatch-mode rate corresponding to the prioritized-dispatch mode based on a difference between a third target limit of the range of slots for provider devices operating in the prioritized-dispatch mode and the number of active provider devices within the prioritized-dispatch mode; and
transmitting an indication of the reduced prioritized-dispatch-mode rate to the one or more provider devices to cause the one or more provider devices to display the reduced prioritized-dispatch-mode rate with the first set of GUI selectable options, the second set of GUI selectable options, or the third set of GUI selectable options.

10. A system comprising:
at least one processor; and
at least one non-transitory computer-readable storage medium storing instructions that, when executed by the at least one processor, cause the system to:
identify, for one or more previous time periods, a set of prioritized-dispatch- provider devices receiving prioritized-value metrics while operating in a prioritized- dispatch mode and a set of basic-dispatch-provider devices receiving basic-value metrics while operating in a basic-dispatch mode;
generate, for a target time period, a threshold-noticeable-value difference for value metrics between the prioritized-dispatch mode and the basic-dispatch mode based on the prioritized-value metrics received by the set of prioritized-dispatch-provider devices and the basic-value metrics received by the set of basic-dispatch-provider devices;
monitor, for a network of provider devices in a geographic area, a plurality of provider devices operating in the prioritized-dispatch mode within a dynamic transportation matching software application to receive a real-time snapshot of prioritized-dispatch-mode data from the plurality of provider devices in the geographic area;
determine a range of slots with multiple target limits for provider devices operating in the prioritized-dispatch mode during the target time period based on the threshold-noticeable-value difference and the real-time snapshot of prioritized-dispatch-mode data;
select a dynamic prioritized-mode-availability indicator that causes provider devices to display a dynamic graphical user interface (GUI) within the dynamic transportation matching software application based on the range of slots with the multiple target limits by selecting between:
a first set of GUI selectable options to join the prioritized-dispatch mode within the geographic area based on a number of the plurality of provider devices operating in the prioritized-dispatch mode not satisfying a first target limit of the range of slots;
a second set of GUI selectable options to delay joining the prioritized-dispatch mode within the geographic area based on the number of the plurality of provider devices operating in the prioritized-dispatch mode satisfying the first target limit of the range of slots and satisfying a second target limit of the range of slots, wherein the second target limit is greater than the first target limit; and
a third set of GUI selectable options prohibiting joining the prioritized-dispatch mode within the geographic area based on the number of the plurality of provider devices operating in the prioritized-dispatch mode satisfying the first target limit of the range of slots, satisfying the second target limit of range of slot, and satisfying a third target limit of the range of slots, wherein the third target limit is greater than the second target limit;
transmit the dynamic prioritized-mode-availability indicator to one or more provider devices indicating availability of the prioritized-dispatch mode during the target time period to cause the one or more provider devices to display the first set of GUI selectable options to join the prioritized-dispatch mode within the geographic area; and
based on receiving a user interaction with a GUI selectable option, from the first set of GUI selectable options, to join the prioritized-dispatch mode corresponding to the dynamic prioritized-mode-availability indicator from a particular provider device of the one or more provider devices:
select a transportation request from the geographic area of the prioritized-dispatch mode for the particular provider device based on a prioritized-value metric corresponding to the transportation request; and
dispatch the particular provider device to fulfill the transportation request by transmitting, for display on a graphical user interface of the particular provider device, a pickup location for the transportation request.

11. The system of claim 10, further comprising instructions that, when executed by the at least one processor, cause the system to:
determine, within the range of slots for provider devices, the second target limit by determining an upper-target-limit of provider-device slots at which to send provider-device indications to not enter the prioritized-dispatch mode;
determine that a number of active provider devices operating in the prioritized-dispatch mode in a geographic area, from an updated real-time snapshot of the prioritized-dispatch-mode data, satisfies the upper-target-limit of provider-device slots and the first target limit; and
based on the number of active provider devices in the geographic area satisfying the upper-target-limit of provider-device slots and the first target limit:
select the second set of GUI selectable options to delay joining the prioritized-dispatch mode within the geographic area for an updated dynamic prioritized-mode-availability indicator; and
transmit the updated dynamic prioritized-mode-availability indicator to the one or more provider devices to display an indication advising provider devices to not enter the prioritized-dispatch mode for the geographic area to display, from the second set of GUI selectable options, an additional GUI selectable option to delay joining the prioritized-dispatch mode and the GUI selectable option to join the prioritized-dispatch mode.

12. The system of claim 11, further comprising instructions that, when executed by the at least one processor, cause the system to, based on receiving an additional user interaction with the GUI selectable option, from the second set of GUI selectable options, to join the prioritized-dispatch mode from an additional provider device of the one or more provider devices:
  selecting an additional transportation request from the geographic area of the prioritized-dispatch mode for the additional provider device based on an additional prioritized-value metric corresponding to the additional transportation request; and
  dispatching the additional provider device to fulfill the additional transportation request by transmitting, for display on an additional graphical user interface of the additional provider device, an additional pickup location for the additional transportation request.

13. The system of claim 10, further comprising instructions that, when executed by the at least one processor, cause the system to prioritize a selection of the transportation request to the particular provider device operating in the prioritized-dispatch mode over additional provider devices operating in the basic-dispatch mode to utilize a first set of dispatch conditions corresponding to the prioritized-dispatch mode to select the transportation request over a second set of dispatch conditions corresponding to the basic-dispatch mode.

14. The system of claim 10, further comprising instructions that, when executed by the at least one processor, cause the system to generate, for the target time period, the threshold-noticeable-value difference by:
  identifying a set of value-metric differences between the prioritized-value metrics received by the set of prioritized-dispatch-provider devices and the basic-value metrics received by the set of basic-dispatch-provider devices; and
  determining a minimum-detectable-effect value as the threshold-noticeable-value difference based on a distribution of value-metric differences from the set of value-metric differences.

15. The system of claim 10, further comprising instructions that, when executed by the at least one processor, cause the system to generate the prioritized-value metrics received by the set of prioritized-dispatch-provider devices and the basic-value metrics received by the set of basic-dispatch-provider devices for the threshold-noticeable-value difference utilizing a machine learning model.

16. A non-transitory computer-readable medium comprising instructions that, when executed by at least one processor, cause a computing device to:
  identify, for one or more previous time periods, a set of prioritized-dispatch-provider devices receiving prioritized-value metrics while operating in a prioritized-dispatch mode and a set of basic-dispatch-provider devices receiving basic-value metrics while operating in a basic-dispatch mode;
  generate, for a target time period, a threshold-noticeable-value difference for value metrics between the prioritized-dispatch mode and the basic-dispatch mode based on the prioritized-value metrics received by the set of prioritized-dispatch-provider devices and the basic-value metrics received by the set of basic-dispatch-provider devices;
  monitor, for a network of provider devices in a geographic area, a plurality of provider devices operating in the prioritized-dispatch mode within a dynamic transportation matching software application to receive a real-time snapshot of prioritized-dispatch-mode data from the plurality of provider devices in the geographic area;
  determine a range of slots with multiple target limits for provider devices operating in the prioritized-dispatch mode during the target time period based on the threshold-noticeable-value difference and the real-time snapshot of prioritized-dispatch-mode data;
  select a dynamic prioritized-mode-availability indicator that causes provider devices to display a dynamic graphical user interface (GUI) within the dynamic transportation matching software application based on the range of slots with the multiple target limits by selecting between:
    a first set of GUI selectable options to join the prioritized-dispatch mode within the geographic area based on a number of the plurality of provider devices operating in the prioritized-dispatch mode not satisfying a first target limit of the range of slots;
    a second set of GUI selectable options to delay joining the prioritized-dispatch mode within the geographic area based on the number of the plurality of provider devices operating in the prioritized-dispatch mode satisfying the first target limit of the range of slots and satisfying a second target limit of the range of slots, wherein the second target limit is greater than the first target limit; and
    a third set of GUI selectable options prohibiting joining the prioritized-dispatch mode within the geographic area based on the number of the plurality of provider devices operating in the prioritized-dispatch mode satisfying the first target limit of the range of slots, satisfying the second target limit of range of slot, and satisfying a third target limit of the range of slots, wherein the third target limit is greater than the second target limit;
  transmit the dynamic prioritized-mode-availability indicator to one or more provider devices indicating availability of the prioritized-dispatch mode during the target time period to cause the one or more provider devices to display the first set of GUI selectable options to join the prioritized-dispatch mode within the geographic area; and
  based on receiving a user interaction with a GUI selectable option, from the first set of GUI selectable options, to join the prioritized-dispatch mode corresponding to the dynamic prioritized-mode-availability indicator from a particular provider device of the one or more provider devices:
    select a transportation request from the geographic area of the prioritized-dispatch mode for the particular provider device based on a prioritized-value metric corresponding to the transportation request; and
    dispatch the particular provider device to fulfill the transportation request by transmitting, for display on a graphical user interface of the particular provider device, a pickup location for the transportation request.

17. The non-transitory computer-readable medium of claim 16, further comprising instructions that, when executed by the at least one processor, cause the computing device to generate, for the target time period, the threshold-noticeable-value difference by:
  identifying a set of value-metric differences between the prioritized-value metrics received by the set of prioritized-dispatch-provider devices and the basic-value metrics received by the set of basic-dispatch-provider devices; and
  determining a minimum-detectable-effect value as the threshold-noticeable-value difference based on a distribution of value-metric differences from the set of value-metric differences.

18. The non-transitory computer-readable medium of claim 16, further comprising instructions that, when executed by the at least one processor, cause the computing device to:

estimate a prioritized-value metric to be received by a prioritized-dispatch-provider device operating in the prioritized-dispatch mode during the target time period based on a predicted number of prioritized-dispatch-provider devices operating in the prioritized-dispatch mode during the target time period based on the real-time snapshot of prioritized-dispatch-mode data;

estimate a counterfactual-value metric representing a value metric that would be received by a provider device if each provider device were to operate in the basic-dispatch mode during the target time period; and determine the range of slots for provider devices operating in the prioritized-dispatch mode based on the estimated prioritized-value metric, the estimated counterfactual-value metric, and the threshold-noticeable-value difference.

19. The non-transitory computer-readable medium of claim 18, further comprising instructions that, when executed by the at least one processor, cause the computing device to:

determine a cannibalization factor reflecting a probability of a provider device operating in the prioritized-dispatch mode being selected for a transportation request over a provider device operating in the basic-dispatch mode; and determine, for the target time period, the estimated prioritized-value metric based on the cannibalization factor.

20. The non-transitory computer-readable medium of claim 16, further comprising instructions that, when executed by the at least one processor, cause the computing device to:

identify, for the target time period, a number of active provider devices operating in the prioritized-dispatch mode in the geographic area based on the real-time snapshot of prioritized-dispatch-mode data;

reduce, for the target time period, a prioritized-dispatch-mode rate corresponding to the prioritized-dispatch mode based on a difference between a maximum limit of provider-device slots for provider devices operating in the prioritized-dispatch mode and the number of active provider devices within the prioritized-dispatch mode; and transmit an indication of the reduced prioritized-dispatch-mode rate to the one or more provider devices to cause the one or more provider devices to display the reduced prioritized-dispatch-mode rate with the first set of GUI selectable options, the second set of GUI selectable options, or the third set of GUI selectable options.

* * * * *